United States Patent
Ochenas et al.

(10) Patent No.: US 11,054,980 B2
(45) Date of Patent: Jul. 6, 2021

(54) USER INTERFACE DEVICE FOR INDUSTRIAL VEHICLE

(71) Applicant: Crown Equipment Corporation, New Bremen, OH (US)

(72) Inventors: Jonathan Ochenas, Mooresville, NC (US); Katharine Neubert, Vancouver, WA (US)

(73) Assignee: Crown Equipment Corporation, New Bremen, OH (US)

( * ) Notice: Subject to any disclaimer, the term of this patent is extended or adjusted under 35 U.S.C. 154(b) by 232 days.

(21) Appl. No.: 15/815,778

(22) Filed: Nov. 17, 2017

(65) Prior Publication Data

US 2018/0143731 A1 May 24, 2018

Related U.S. Application Data

(60) Provisional application No. 62/425,099, filed on Nov. 22, 2016.

(51) Int. Cl.
*G06F 3/0488* (2013.01)
*G06F 3/0482* (2013.01)
(Continued)

(52) U.S. Cl.
CPC .......... *G06F 3/0488* (2013.01); *B66F 9/0755* (2013.01); *B66F 9/0759* (2013.01);
(Continued)

(58) Field of Classification Search
CPC ...... H04W 4/90; B60W 30/143; B60K 35/00; G06F 3/02; B60R 25/245; B60R 3/0482
See application file for complete search history.

(56) References Cited

U.S. PATENT DOCUMENTS 3,010,595 A   11/1961 Stone
3,319,816 A   5/1967 Christenson
(Continued)

FOREIGN PATENT DOCUMENTS

CN   103631423 A   3/2014
DE   10144751 A1   3/2003
(Continued)

OTHER PUBLICATIONS

"Mazda3 Navigation System-Information Guide", Maple Shade Mazda; https://www.youtube.com/watch?v=CzSW38Uu_5s; published on Oct. 9, 2013.
(Continued)

*Primary Examiner* — Toan H Vu
(74) *Attorney, Agent, or Firm* — Stevens & Showalter LLP

(57) ABSTRACT

A processing device comprising a graphical user interface in an industrial vehicle is provided. The processing device comprises a touch screen display that receives touch gesture commands from a vehicle operator, memory storing executable instructions, and a processor in communication with the memory. The processor when executing the executable instructions: defines a plurality of widgets, wherein each widget comprises a visual representation of a current state of an associated function of the vehicle, displays a subset of the plurality of widgets on a portion of the touch screen display defining a plurality of widget spaces, and displays an icon tray on the touch screen display comprising one or more icons, in which at least one of the one or more icons corresponds to a respective one of the plurality of widgets.

20 Claims, 21 Drawing Sheets

(51) Int. Cl.
*G06F 3/02* (2006.01)
*B66F 9/075* (2006.01)
*B66F 17/00* (2006.01)
*H04L 12/40* (2006.01)
*G06F 3/041* (2006.01)
*G06F 3/048* (2013.01)
*G06F 3/0481* (2013.01)
*B66F 9/24* (2006.01)

(52) U.S. Cl.
CPC .............. *B66F 9/24* (2013.01); *B66F 17/003* (2013.01); *G06F 3/02* (2013.01); *G06F 3/041* (2013.01); *G06F 3/048* (2013.01); *G06F 3/0482* (2013.01); *G06F 3/04817* (2013.01); *G06F 3/04883* (2013.01); *H04L 12/40* (2013.01); *B60K 2370/1438* (2019.05)

(56) References Cited

U.S. PATENT DOCUMENTS

| | | | |
|---|---|---|---|
| 3,410,433 A | 11/1968 | Brown |
| 3,542,161 A | 11/1970 | Ulinski |
| 3,854,820 A | 12/1974 | Hansen |
| 3,937,339 A | 2/1976 | Geis et al. |
| 4,062,269 A | 12/1977 | Chichester et al. |
| 4,074,794 A | 2/1978 | Scholl |
| 4,122,957 A | 10/1978 | Allen et al. |
| 4,130,183 A | 12/1978 | Tjörnemark |
| 4,162,869 A | 7/1979 | Hitomi et al. |
| 4,212,375 A | 7/1980 | Peterson et al. |
| 4,235,308 A | 11/1980 | Davis |
| 4,279,328 A | 7/1981 | Ahlbom |
| 4,411,582 A | 10/1983 | Nakada |
| 4,439,102 A | 3/1984 | Allen |
| 4,491,918 A | 1/1985 | Yuki et al. |
| 4,499,541 A | 2/1985 | Yuki et al. |
| 4,509,127 A | 4/1985 | Yuki et al. |
| 4,511,974 A | 4/1985 | Nakane et al. |
| 4,517,645 A | 5/1985 | Yuki et al. |
| 4,520,443 A | 5/1985 | Yuki et al. |
| 4,547,844 A | 10/1985 | Adams |
| 4,598,797 A | 7/1986 | Schultz |
| 4,612,623 A | 9/1986 | Bazarnik |
| 4,634,332 A | 1/1987 | Kamide et al. |
| 4,708,577 A | 11/1987 | Fratzke |
| 4,782,920 A | 11/1988 | Gaibler et al. |
| 4,957,408 A | 9/1990 | Ohkura |
| 5,006,829 A | 4/1991 | Miyamoto |
| 5,011,358 A | 4/1991 | Andersen et al. |
| 5,056,437 A | 10/1991 | Maddock |
| 5,088,879 A | 2/1992 | Ranly |
| 5,208,753 A | 5/1993 | Acuff |
| 5,224,815 A | 7/1993 | Abels et al. |
| 5,238,086 A | 8/1993 | Aoki et al. |
| 5,555,957 A | 9/1996 | Dreher et al. |
| 5,586,620 A | 12/1996 | Dammeyer et al. |
| 5,704,051 A | 12/1997 | Lane et al. |
| 5,734,377 A | 3/1998 | Fukuzaki |
| 5,749,696 A | 5/1998 | Johnson |
| 5,791,440 A | 8/1998 | Lonzinski et al. |
| 5,880,684 A | 3/1999 | Diekhans et al. |
| 5,890,086 A | 3/1999 | Wellman et al. |
| 5,956,255 A | 9/1999 | Flamme |
| 5,994,650 A | 11/1999 | Eriksson et al. |
| 5,995,001 A | 11/1999 | Wellman et al. |
| 6,005,299 A | 12/1999 | Hengst |
| 6,039,141 A | 3/2000 | Denny |
| 6,049,813 A | 4/2000 | Danielson et al. |
| 6,073,069 A | 6/2000 | Kim |
| 6,100,476 A | 8/2000 | Adamietz et al. |
| 6,128,007 A | 10/2000 | Seybold |
| 6,128,553 A | 10/2000 | Gordon et al. |
| 6,138,795 A | 10/2000 | Kamiya |
| 6,164,415 A | 12/2000 | Takeuchi et al. |
| 6,209,913 B1 | 4/2001 | Ishikawa et al. |
| 6,282,464 B1 | 8/2001 | Obradovich |
| 6,331,866 B1 | 12/2001 | Eisenberg |
| 6,343,237 B1 | 1/2002 | Rossow et al. |
| 6,345,694 B1 | 2/2002 | Volker |
| 6,369,717 B1 | 4/2002 | Damiani et al. |
| 6,429,773 B1 | 8/2002 | Schuyler |
| 6,437,701 B1 | 8/2002 | Muller |
| 6,494,527 B1 | 12/2002 | Bischoff |
| 6,539,289 B2 | 3/2003 | Ogino et al. |
| 6,600,418 B2 | 7/2003 | Francis et al. |
| 6,640,114 B2 | 10/2003 | Bae |
| 6,648,581 B2 | 11/2003 | Gibson |
| 6,667,726 B1 | 12/2003 | Damiani et al. |
| 6,686,911 B1 | 2/2004 | Levin et al. |
| 6,724,403 B1 | 4/2004 | Santoro et al. |
| 6,817,824 B2 | 11/2004 | Winkler |
| 7,010,404 B2 | 3/2006 | Ichijo et al. |
| 7,028,264 B2 | 4/2006 | Santoro et al. |
| 7,089,098 B2 | 8/2006 | Rogg et al. |
| 7,154,480 B2 | 12/2006 | Iesaka |
| 7,165,643 B2 | 1/2007 | Bozem et al. |
| D537,374 S | 2/2007 | Smiley |
| 7,172,050 B2 | 2/2007 | Amamiya |
| 7,192,236 B1 | 3/2007 | Upmeyer |
| 7,216,024 B1 | 5/2007 | Abels et al. |
| 7,219,769 B2 | 5/2007 | Yamanouchi et al. |
| 7,225,413 B1 | 5/2007 | Kuenzner et al. |
| 7,237,203 B1 | 6/2007 | Kuenzner |
| 7,274,970 B2 | 9/2007 | Schuchard |
| 7,287,625 B1 | 10/2007 | Harris |
| 7,322,444 B2 | 1/2008 | Allerding et al. |
| 7,360,175 B2 | 4/2008 | Gardner et al. |
| 7,372,473 B2 | 5/2008 | Venolia |
| 7,376,907 B2 | 5/2008 | Santoro et al. |
| 7,415,352 B2 | 8/2008 | Olcott |
| 7,418,670 B2 | 8/2008 | Goldsmith |
| 7,477,268 B2 | 1/2009 | Venolia |
| 7,595,722 B2 | 9/2009 | Heimermann et al. |
| 7,599,776 B2 | 10/2009 | Sonderegger et al. |
| 7,612,673 B2 | 11/2009 | Onderko et al. |
| 7,672,768 B2 | 3/2010 | Narisawa et al. |
| 7,683,771 B1 | 3/2010 | Loeb |
| 7,706,947 B2 | 4/2010 | Bozem et al. |
| 7,806,470 B2 | 10/2010 | Steege et al. |
| 7,822,513 B2 | 10/2010 | Wulff |
| 7,857,090 B2 | 12/2010 | Ruhter et al. |
| 7,872,587 B2 | 1/2011 | Hindryckx et al. |
| 7,896,358 B2 | 3/2011 | Hoff |
| 7,909,561 B2 | 3/2011 | Addleman et al. |
| 7,922,899 B2 | 4/2011 | Vasta et al. |
| 7,987,431 B2 | 7/2011 | Santoro et al. |
| 7,992,686 B2 | 8/2011 | McCabe |
| 8,001,483 B2 | 8/2011 | de Souza et al. |
| 8,055,405 B2 | 11/2011 | Baginski et al. |
| 8,083,034 B2 | 12/2011 | Bordwell et al. |
| 8,108,090 B2 | 1/2012 | Bauer |
| 8,125,457 B2 | 2/2012 | Lawson et al. |
| 8,201,097 B2 | 6/2012 | Kondo et al. |
| 8,207,841 B2 | 6/2012 | Watson et al. |
| 8,230,976 B2 | 7/2012 | Baldini |
| 8,239,251 B2 | 8/2012 | Wellman |
| 8,265,836 B2 | 9/2012 | Yamada et al. |
| 8,340,873 B2 | 12/2012 | Finley et al. |
| 8,362,893 B2 | 1/2013 | Ishikawa |
| 8,443,943 B2 | 5/2013 | McCabe et al. |
| 8,482,534 B2 | 7/2013 | Pryor |
| 8,515,629 B2 | 8/2013 | Medwin et al. |
| 8,521,373 B2 | 8/2013 | Behncke et al. |
| 8,536,996 B2 | 9/2013 | Watson et al. |
| 8,549,432 B2 | 10/2013 | Warner |
| 8,565,913 B2 | 10/2013 | Emanuel et al. |
| 8,583,314 B2 | 11/2013 | de Oliveira et al. |
| 8,627,073 B2 | 1/2014 | Kherani et al. |
| 8,632,082 B2 | 1/2014 | Lantz et al. |
| 8,649,964 B2 | 2/2014 | Kizaki |
| 8,682,401 B2 | 3/2014 | Ebner et al. |
| 8,694,194 B2 | 4/2014 | Waltz et al. |
| 8,701,044 B2 | 4/2014 | Kolletzki |

(56) References Cited

U.S. PATENT DOCUMENTS

| | | |
|---|---|---|
| 8,706,920 B2 | 4/2014 | Fleizach et al. |
| 8,713,467 B1 | 4/2014 | Goldenberg et al. |
| 8,731,785 B2 | 5/2014 | McCabe et al. |
| 8,756,002 B2 | 6/2014 | Sathish |
| 8,763,759 B2 | 7/2014 | Viereck et al. |
| 8,781,642 B2 | 7/2014 | Tarasinski et al. |
| 8,799,799 B1 | 8/2014 | Cervelli et al. |
| 8,811,265 B2 | 8/2014 | Horvath |
| 8,836,545 B2 | 9/2014 | Eckstein et al. |
| 8,849,510 B2 | 9/2014 | Tanaka |
| 8,892,241 B2 | 11/2014 | Weiss |
| 8,892,294 B2 | 11/2014 | Waltz et al. |
| 8,907,778 B2 | 12/2014 | Wller et al. |
| 8,977,441 B2 | 3/2015 | Grimes et al. |
| 9,002,626 B2 | 4/2015 | Waltz et al. |
| 9,008,856 B2 | 4/2015 | Ricci et al. |
| 9,025,827 B2 | 5/2015 | Holeva et al. |
| 9,057,221 B2 | 6/2015 | Warr |
| 9,075,468 B2 | 7/2015 | Becker et al. |
| 9,080,319 B2 | 7/2015 | Oates, Jr. et al. |
| 9,128,575 B2 | 9/2015 | Lee |
| 9,160,854 B1 | 10/2015 | Daddi et al. |
| 9,181,965 B2 | 11/2015 | Pirotais |
| 9,235,553 B2 | 1/2016 | Fitch et al. |
| 9,278,839 B2 | 3/2016 | Gilbride et al. |
| 9,361,000 B2 | 6/2016 | Furue et al. |
| 9,434,585 B2 | 9/2016 | Gilbride et al. |
| 9,448,692 B1 | 9/2016 | Mierau et al. |
| 9,575,628 B2 | 2/2017 | Meegan et al. |
| 9,658,738 B1 | 5/2017 | Park et al. |
| 9,723,457 B2 | 8/2017 | Brahmi et al. |
| 9,740,304 B2 | 8/2017 | Chandel et al. |
| 9,760,644 B2 | 9/2017 | Khvostichenko et al. |
| 9,792,013 B2 | 10/2017 | Fleizach et al. |
| 9,952,703 B2 | 4/2018 | Hoen et al. |
| 10,073,708 B2 | 9/2018 | Kardamilas |
| 10,138,101 B2 | 11/2018 | Svensson et al. |
| 10,282,088 B2 | 5/2019 | Kim et al. |
| 2002/0070852 A1 | 6/2002 | Trauner et al. |
| 2002/0084887 A1 | 7/2002 | Arshad et al. |
| 2003/0205433 A1 | 11/2003 | Hagman |
| 2004/0031649 A1 | 2/2004 | Schiebel et al. |
| 2004/0150674 A1 | 8/2004 | Takahashi et al. |
| 2004/0200644 A1 | 10/2004 | Paine et al. |
| 2004/0233234 A1 | 11/2004 | Chaudhry et al. |
| 2004/0249538 A1 | 12/2004 | Osaki et al. |
| 2005/0102081 A1 | 5/2005 | Patterson |
| 2005/0113944 A1 | 5/2005 | Santarossa |
| 2005/0172239 A1 | 8/2005 | Liu et al. |
| 2006/0015818 A1 | 1/2006 | Chaudhri et al. |
| 2006/0182582 A1 | 8/2006 | Sharpton |
| 2006/0224945 A1 | 10/2006 | Khan et al. |
| 2007/0007080 A1 | 1/2007 | Manthey et al. |
| 2007/0111672 A1 | 5/2007 | Saintoyant et al. |
| 2007/0210901 A1 | 9/2007 | Ahrens et al. |
| 2007/0213869 A1 | 9/2007 | Bandringa et al. |
| 2007/0233304 A1 | 10/2007 | Baginski et al. |
| 2007/0236475 A1 | 10/2007 | Wherry |
| 2008/0015955 A1 | 1/2008 | Ehrman et al. |
| 2008/0055273 A1 | 3/2008 | Forstall |
| 2008/0067005 A1 | 3/2008 | Hagman |
| 2008/0154712 A1 | 6/2008 | Wellman |
| 2008/0211779 A1 | 9/2008 | Pryor |
| 2008/0244414 A1 | 10/2008 | Marcoullier et al. |
| 2009/0057065 A1 | 3/2009 | Akaki et al. |
| 2009/0059004 A1 | 3/2009 | Bochicchio |
| 2009/0101447 A1 | 4/2009 | Durham et al. |
| 2009/0125850 A1 | 5/2009 | Karstens |
| 2009/0236183 A1 | 9/2009 | Bordwell et al. |
| 2009/0265059 A1 | 10/2009 | Medwin et al. |
| 2009/0267921 A1 | 10/2009 | Pryor |
| 2009/0271778 A1 | 10/2009 | Mandyam et al. |
| 2009/0326717 A1 | 12/2009 | Vaherto |
| 2010/0005419 A1 | 1/2010 | Miichi et al. |
| 2010/0023865 A1 | 1/2010 | Fulker et al. |
| 2010/0039247 A1 | 2/2010 | Ziegler et al. |
| 2010/0100512 A1 | 4/2010 | Brodin et al. |
| 2010/0223332 A1 | 9/2010 | Maxemchuk et al. |
| 2010/0277438 A1 | 11/2010 | Kawashima et al. |
| 2011/0088979 A1 | 4/2011 | Bandringa et al. |
| 2011/0106294 A1 | 5/2011 | Bebbington |
| 2011/0119614 A1 | 5/2011 | Powell et al. |
| 2011/0234389 A1 | 9/2011 | Mellin |
| 2011/0238259 A1 | 9/2011 | Bai et al. |
| 2011/0252369 A1 | 10/2011 | Chaudhri |
| 2011/0320978 A1 | 12/2011 | Horodezky et al. |
| 2012/0012425 A1 | 1/2012 | Hayase et al. |
| 2012/0053754 A1 | 3/2012 | Pease et al. |
| 2012/0096979 A1 | 4/2012 | Trujillo Linke |
| 2012/0110493 A1 | 5/2012 | Cabral |
| 2012/0229394 A1 | 9/2012 | Ehrl et al. |
| 2012/0229493 A1 | 9/2012 | Kim et al. |
| 2012/0235804 A1 | 9/2012 | Gilbride et al. |
| 2012/0256843 A1 | 10/2012 | Epple et al. |
| 2012/0275892 A1 | 11/2012 | Allerding et al. |
| 2012/0284658 A1 | 11/2012 | Hirvonen |
| 2012/0284673 A1 | 11/2012 | Lamb et al. |
| 2013/0004282 A1 | 1/2013 | Grimes et al. |
| 2013/0050131 A1 | 2/2013 | Lee et al. |
| 2013/0075203 A1 | 3/2013 | Sayles |
| 2013/0081716 A1 | 4/2013 | Pirotais |
| 2013/0093685 A1 | 4/2013 | Kalu et al. |
| 2013/0101173 A1 | 4/2013 | Holeva et al. |
| 2013/0110329 A1 | 5/2013 | Kinoshita et al. |
| 2013/0111410 A1 | 5/2013 | Okada et al. |
| 2013/0132246 A1 | 5/2013 | Amin et al. |
| 2013/0145360 A1* | 6/2013 | Ricci ................ H04W 4/90 717/174 |
| 2013/0152003 A1 | 6/2013 | Ricci et al. |
| 2013/0166146 A1 | 6/2013 | Tanaka |
| 2013/0169549 A1 | 7/2013 | Seymour et al. |
| 2013/0176223 A1 | 7/2013 | Lee et al. |
| 2013/0194228 A1 | 8/2013 | Tuzar |
| 2013/0205258 A1 | 8/2013 | Ecker et al. |
| 2013/0241720 A1 | 9/2013 | Ricci et al. |
| 2013/0254675 A1 | 9/2013 | De Andrade et al. |
| 2013/0285949 A1 | 10/2013 | Manabe et al. |
| 2013/0290887 A1 | 10/2013 | Sun et al. |
| 2013/0305354 A1 | 11/2013 | King et al. |
| 2014/0068477 A1 | 3/2014 | Roh |
| 2014/0081429 A1 | 3/2014 | Miles et al. |
| 2014/0082565 A1 | 3/2014 | Suzuki |
| 2014/0088827 A1* | 3/2014 | Yashiro ................ B60L 53/64 701/36 |
| 2014/0114530 A1 | 4/2014 | Fitch et al. |
| 2014/0123072 A1 | 5/2014 | Bhowmick et al. |
| 2014/0133906 A1 | 5/2014 | Frelich et al. |
| 2014/0139354 A1 | 5/2014 | Miyazaki |
| 2014/0173516 A1 | 6/2014 | Hwang et al. |
| 2014/0188576 A1 | 7/2014 | de Oliveira et al. |
| 2014/0236389 A1 | 8/2014 | Higgins et al. |
| 2014/0258908 A1 | 9/2014 | Miyoshi |
| 2014/0278621 A1 | 9/2014 | Medwin et al. |
| 2014/0302774 A1 | 10/2014 | Burke et al. |
| 2014/0320293 A1 | 10/2014 | Hunter, Jr. et al. |
| 2014/0380243 A1* | 12/2014 | Furue ................ G06F 3/0482 715/835 |
| 2015/0062017 A1* | 3/2015 | Barabas ............ H04M 1/7253 345/169 |
| 2015/0064668 A1 | 3/2015 | Manci et al. |
| 2015/0113462 A1 | 4/2015 | Chen et al. |
| 2015/0130712 A1 | 5/2015 | Hirai |
| 2015/0169077 A1* | 6/2015 | Lee ................ B60K 35/00 345/184 |
| 2015/0175397 A1 | 6/2015 | Lynn et al. |
| 2015/0177362 A1* | 6/2015 | Gutierrez ............ B60R 25/245 701/519 |
| 2015/0225218 A1 | 8/2015 | Strand |
| 2015/0226560 A1 | 8/2015 | Chandrasekar et al. |
| 2015/0243167 A1 | 8/2015 | Stählin |
| 2015/0268746 A1 | 9/2015 | Cuddihy et al. |
| 2015/0298549 A1* | 10/2015 | Tamura ................ B60K 35/00 340/461 |
| 2016/0012707 A1 | 1/2016 | McKinley et al. |

(56) References Cited

U.S. PATENT DOCUMENTS

| | | | |
|---|---|---|---|
| 2016/0026838 A1 | 1/2016 | Gillet et al. | |
| 2016/0041803 A1 | 2/2016 | Markov et al. | |
| 2016/0054849 A1 | 2/2016 | Steiger | |
| 2016/0077688 A1 | 3/2016 | Shim | |
| 2016/0082960 A1* | 3/2016 | Slaton | B60W 30/143 701/93 |
| 2016/0088146 A1* | 3/2016 | Ying | H04M 1/72569 455/550.1 |
| 2016/0196041 A1 | 7/2016 | Lavoie | |
| 2016/0306503 A1 | 10/2016 | Youtsey | |
| 2016/0313875 A1 | 10/2016 | Williams et al. | |
| 2016/0347248 A1 | 12/2016 | Manci et al. | |
| 2016/0374002 A1* | 12/2016 | Tuluca | G01S 19/13 |
| 2017/0017392 A1* | 1/2017 | Castaneda | G06F 3/02 |
| 2017/0024058 A1 | 1/2017 | Aubry | |
| 2017/0091704 A1 | 3/2017 | Wolf et al. | |
| 2017/0120723 A1* | 5/2017 | Sura | B60H 1/00771 |
| 2017/0178536 A1 | 6/2017 | Manci et al. | |
| 2017/0249745 A1 | 8/2017 | Fiala | |
| 2018/0107320 A1 | 4/2018 | Im et al. | |
| 2018/0126507 A1 | 5/2018 | Rivers et al. | |

FOREIGN PATENT DOCUMENTS

| | | |
|---|---|---|
| DE | 10259704 A1 | 8/2003 |
| DE | 10131839 B4 | 2/2004 |
| DE | 102005022476 A1 | 11/2006 |
| DE | 102007023774 A1 | 11/2008 |
| DE | 102008027695 A1 | 10/2009 |
| DE | 102009032492 A1 | 1/2011 |
| DE | 102010005034 A1 | 7/2011 |
| DE | 102010055971 A1 | 6/2012 |
| DE | 102011012415 A1 | 8/2012 |
| DE | 102011012416 A1 | 8/2012 |
| DE | 102011018520 A1 | 9/2012 |
| DE | 102011018802 A1 | 10/2012 |
| DE | 102011103029 A1 | 12/2012 |
| DE | 102011103214 A1 | 12/2012 |
| DE | 102012204694 A1 | 9/2013 |
| DE | 102013006412 A1 | 10/2014 |
| DE | 102014113555 A1 | 3/2016 |
| DE | 102015107260 A1 | 5/2016 |
| DE | 102016117013 A1 | 3/2018 |
| EP | 0416171 A2 | 3/1991 |
| EP | 0376206 B1 | 8/1995 |
| EP | 0712062 B1 | 3/2001 |
| EP | 0812799 B1 | 12/2001 |
| EP | 1203743 B1 | 8/2005 |
| EP | 1247686 B1 | 5/2006 |
| EP | 1468958 B1 | 3/2007 |
| EP | 1179466 B1 | 4/2007 |
| EP | 1447374 B1 | 3/2008 |
| EP | 1553044 B1 | 5/2008 |
| EP | 1604942 B1 | 8/2008 |
| EP | 1714822 B1 | 1/2009 |
| EP | 2272788 A1 | 1/2011 |
| EP | 1350668 B1 | 5/2012 |
| EP | 2123596 B1 | 10/2012 |
| EP | 2439165 B1 | 10/2012 |
| EP | 2511677 A1 | 10/2012 |
| EP | 2512163 A1 | 10/2012 |
| EP | 2518009 A1 | 10/2012 |
| EP | 2527288 B1 | 8/2013 |
| EP | 2631760 A1 | 8/2013 |
| EP | 2412661 B1 | 1/2014 |
| EP | 2518000 B1 | 1/2014 |
| EP | 2649820 B1 | 11/2014 |
| EP | 2799388 A1 | 11/2014 |
| EP | 2647591 B1 | 12/2014 |
| EP | 2470465 B1 | 3/2015 |
| EP | 2653429 B1 | 3/2015 |
| EP | 2653430 B1 | 3/2015 |
| EP | 2848437 A1 | 3/2015 |
| EP | 1655263 B1 | 5/2015 |
| EP | 2172413 B1 | 6/2015 |
| EP | 2886507 A1 | 6/2015 |
| EP | 2574589 B1 | 7/2015 |
| EP | 2889253 A1 | 7/2015 |
| EP | 2889258 A1 | 7/2015 |
| EP | 2924551 A1 | 9/2015 |
| EP | 2930603 A1 | 10/2015 |
| EP | 2848575 B1 | 3/2016 |
| EP | 2916505 B1 | 10/2016 |
| EP | 2889254 B1 | 4/2017 |
| EP | 2889255 B1 | 4/2017 |
| EP | 2889256 B1 | 4/2017 |
| EP | 2338720 B1 | 7/2017 |
| EP | 2518003 B1 | 10/2017 |
| EP | 2993155 B1 | 11/2017 |
| EP | 3023382 B1 | 1/2018 |
| FR | 2975982 A1 | 12/2012 |
| FR | 2975981 B1 | 5/2016 |
| GB | 1387670 A | 3/1975 |
| GB | 2352521 A | 1/2001 |
| GB | 2360500 B | 10/2003 |
| GB | 2460326 A | 12/2009 |
| GB | 2437629 B | 5/2010 |
| JP | 63192398 U | 12/1988 |
| JP | 7002496 A | 1/1995 |
| JP | H07242400 A | 9/1995 |
| JP | 8091794 A | 4/1996 |
| JP | 3166413 B2 | 5/2001 |
| JP | 2003246598 A1 | 9/2003 |
| JP | 2004083273 A | 3/2004 |
| JP | 3572318 B1 | 9/2004 |
| JP | 2005126017 A1 | 5/2005 |
| JP | 2010006601 A | 1/2010 |
| JP | 2012214155 A | 11/2012 |
| JP | 5109964 B2 | 12/2012 |
| JP | 2013091471 A | 5/2013 |
| JP | 5278997 B2 | 9/2013 |
| JP | 6135698 B2 | 5/2017 |
| WO | 1992004693 A1 | 3/1993 |
| WO | 1998034812 A2 | 8/1998 |
| WO | 2002048955 A1 | 6/2002 |
| WO | 2008083982 A1 | 7/2008 |
| WO | 2009026663 A1 | 3/2009 |
| WO | 2009091639 A1 | 7/2009 |
| WO | 2011033015 A1 | 3/2011 |
| WO | 2012110207 A1 | 8/2012 |
| WO | 2013074899 A1 | 5/2013 |
| WO | 2013158079 A1 | 10/2013 |
| WO | 2014120248 A1 | 8/2014 |
| WO | 2015151619 A1 | 10/2015 |
| WO | 2017015046 A1 | 1/2017 |

OTHER PUBLICATIONS

"The Tech Inside, Episode 3: 2014 Mazda 6"; PhoneDog; https://www.youtube.com/watch?v=odpnSuUefNg; published on Aug. 1, 2013.

"2013 and 2014 CX-5 Navigation System Tutorial"; Don Mealey's Sport Mazda; https://www.youtube.com/watch?v=y9v1dvxsfDU; published on Jul. 27, 2013.

"How-To-Use: 2013 Mazda CX-9 Navigation Tutorial Video"; RamseyMazdaNJ; https://www.youtube.com/watch?v=P584CUo8Hno; published on Jul. 10, 2013.

"Mazda CX-5—Navigation System-Information Guide"; Maple Shade Mazda; https://www.youtube.com/watch?v=JLTMeOalaaM; published on Jul. 23, 2013.

"2014 Ford Fiesta MyFord Touch Infotainment Review"; Alex on Autos; https://www.youtube.com/watch?v=p6FM6mwfLGU; published Dec. 4, 2013.

"Navigating Infotainment With a Navigation System"; AutoHow2; https://www.youtube.com/watch?v=zuQ-ZKeu6Fk&feature=youtube; published on Nov. 4, 2013.

"Take a Tour of the Latest BMW iDrive system"; bmwopenroad; https://www.youtube.com/watch?v=XdnOjevfWIE; published on Jul. 30, 2010.

"BMW X5 touchscreen"; Naessenselectronics; https://www.youtube.com/watch?v=VNReXZFKZI4; published on Jul. 11, 2012.

(56) References Cited

OTHER PUBLICATIONS

Joe Bruzek; "Mazda Turns Up Connectivity With New System"; Cars.com; published on Nov. 14, 2013; https://www.cars.com/articles/2013/11/mazda-turns-up-connectivity-with-new-system/; downloaded on Sep. 12, 2018.
"Using Infotainment with a Navigation System—Buick LaCrosse" video transcription; AutoHow2—Informative Automotive Videos; http://www.autohow2.com/video/using-infotainment-with-navigation-buick-lacrosse; downloaded on Sep. 12, 2018.
U.S. Appl. No. 15/815,788; entitled "User Interface Device for Industrial Vehicle," filed Nov. 17, 2017 by Jonathan Ochenas et al.
U.S. Appl. No. 15/815,801; entitled "User Interface Device for Industrial Vehicle," filed Nov. 17, 2017 by Jonathan Ochenas et al.
U.S. Appl. No. 15/815,810; entitled "User Interface Device for Industrial Vehicle," filed Nov. 17, 2017 by Jonathan Ochenas et al.
"INTELLIVIEW™ IV 10.4" Color Touchscreen Display"; Farm with Precision with New Holland; http://newhollandrochester.com/wp-content/uploads/pdf-front/145865207194354078.pdf.
"Winmate's Military Grade Rugged Console Panel PC and Display"; Jun. 25, 2014; http://www.army-technology.com/contractors/computers/winmate-communication/pressreleases/presswinmates-military-grade-rugged-console-panel-pc-and-display.
"Jungheinrich Presents New Reach Truck"; Mar. 19, 2013; Jungheinrich; http://www.jungheinrich.com/en/press/article/nl/310-jungheinrich-presents-new-reach-truck/.
"Linde Safety Pilot: A technical breakthrough"; Industrial Vehicle Technology International report; Apr. 25, 2014; http://www.ivtinternational.com/news.php?NewsID=58313.
Kaiser, Tiffany; "Microsoft Brings Live Tiles to Infotainment Systems with 'Windows in the Car' Concept"; Apr. 7, 2014; http://www.dailytech.com/microsoft+brings+live+tiles+to+infotainment+systems+with+windows+in+the+car+concept/article34667.htm.
Michelangelo, Barba; International Search Report and Written Opinion of the International Searching Authority; International Application No. PCT/US2017/062137; dated Feb. 26, 2018; European Patent Office; Rijswijk, Netherlands.
Bengtsson, Johan; International Search Report and Written Opinion of the International Search Authority; International Application No. PCT/US2016/042230; dated Oct. 10, 2016; European Patent Office; Rijswijk, Netherlands.
Michelangelo, Barba; International Search Report and Written Opinion of the International Searching Authority; International Application No. PCT/US2017/062140; dated Feb. 26, 2018; European Patent Office; Rijswijk, Netherlands.
Michelangelo, Barba; International Search Report and Written Opinion of the International Searching Authority; International Application No. PCT/US2017/062145; dated Feb. 26, 2018; European Patent Office; Rijswijk, Netherlands.
Michelangelo, Barba; International Search Report and Written Opinion of the International Searching Authority; International Application No. PCT/US2017/062130; dated Mar. 1, 2018; European Patent Office; Rijswijk, Netherlands.
Intermec Vehicle-Mount Computers Deliver Next Generation Technology to the Forklift, Boosting Productivity and Performance; Intermic; News Release; Jan. 2, 2012; Everett, Washington; https://www.intermec.com/about_us/newsroom/press_releases/2012-02-01-CV41-CV61-Forklift-Vehicle-Mount-Computers.aspx.
Operator Manual for Crown RM 6000 Series Truck, Document No. PF18574 Rev. 5/17, © 2010, four pages; Crown Equipment Corporation.
"Mastering ease of use with Topcon System 350," Topcon Precision Agriculture; https://www.youtube.com/watch?v=far-XW8qKMY; published on Oct. 19, 2012.
"Topcon X30 and System 350," Topcon Precision Agriculture; https://www.youtube.com/watch?v=mBa_Xk7HjU; published on Nov. 17, 2011.
"Topcon demonstrates iPad-like X30 console," Topcon Precision Agriculture; https://www.youtube.com/watch?v=jISTF8e6UTA; published on Oct. 2, 2011.
"Fendt Variotronic," https://www.youtube.com/watch?v=EEYAnEzennA; published on May 4, 2010.
"Fendt touchscreen overview," https://www.youtube.com/watch?v=idPm92i3cY0; published on Feb. 3, 2013.
"Fendt Teach in," https://www.youtube.com/watch?v=b16uS4SnDEs; published on May 10, 2013.
"Next Generation of Winmate G-Win Series with Intel's® latest quad-core Bay Trail processor," http://www.army-technology.com/contractors/computers/winmate-communication/pressreleases/pressnext-generation-g-win-series; published May 7, 2014.
U.S. Appl. No. 16/562,881; entitled "Processing Device Having a Graphical User Interface for Industrial Vehicle;" filed Sep. 6, 2019 with inventors Anthony T. Castaneda et al.
Bengtsson, Johan, EPC Official Action; European Patent Application No. 16742538.8; dated Jul. 10, 2019; European Patent Office; Munich, Germany.
Levy, Amy; Final Office Action; U.S. Appl. No. 15/210,049; dated Nov. 30, 2018; U.S. Patent and Trademark Office; Alexandria, VA.
Android Developers Blog, "Touch Mode," Dec. 1, 2008, available at https://android-developers.googleblog.com/2008/12/touch-mode.html.
Android Developers, "Optimizing Navigation for TV," Apr. 9, 2012, available at https://stuff.mit.edu/afs/sipb/project/android/docs/training/tv/optimizing-navigation-tv.html.
Android Developers, "View—Android SDK," Jul. 11, 2012, available at http://tool.oschina.net/uploads/apidocs/android/reference/android/view/View.html.
Brochure, "Fendt Variotronic," Variotronic/1.0-EN/06-11/4.5-E, document creation date Jun. 8, 2011, 24 pages.
Operator Manual, FendtTM "VarioDoc—VarioGuide," Nov. 2011, selected pages (16 pages total).
Operator's Manual, Fendt "VarioDoc," Nov. 2015, 128 pages.
Operator's Manual, Fendt "VarioGuide: VarioGuide Novatel and VarioGuide Trimble," Nov. 2015, 158 pages.
Apps4Android, "Implementing Accessibility on Android," Apr. 18, 2012, available at http://www.apps4android.org/?p=3628.
"iEFIS Panel User Manual," Jul. 9, 2012, 44 pages.
Karlson, A.K. and Bederson, B.B., "Direct Versus Indirect Input Methods for One-Handed Touchscreen Mobile Computing," Human-Computer Interaction Lab, University of Maryland, Apr. 2007, 10 pages.
Wyttenbach, Joel; Youtube video; "Fendt 3 point hitch"; published Feb. 1, 2013; https://www.youtube.com/watch?v=Vvdw7InNpWE.
Youtube video; "Aero-TV: Big, Bright and Beautiful—MGL iEFIS Challenger 10.4" Display System"; Aero-News Network; published Nov. 21, 2013; https://www.youtube.com/watch?v=-qZIW4a36ak.
Youtube video; Honeywell; "Bendix King KSN770 FMS Safety Display"; Avweb; published Sep. 10, 2013; https://www.youtube.com/watch?v=iYMZPoGGtms.
Youtube video; Pretorian Technologies Ltd.; "iOS 7 Switch Control—An Introduction"; published Sep. 17, 2013; Ittps://www.youtube.com/watch?v=SnDA2pbBsTQ.
Ogasawara, Todd; Youtube video; "T-Mobile G1 Trackball Demo"; Oct. 22, 2008; https://www.youtube.com/watch?v=Tq3IwVszW4o.
Wyttenbach, Joel; Youtube video; "Driving a Fendt"; published Feb. 2, 2013; https://www.youtube.com/watch?v=tyX5UPYWFR8&t=7s.
Internet video; Fendt.TV; "Operating the new Varioterminal"; Sep. 4, 2010; https://www.fendt.tv/en/home/operating-the-new-varioterminal_1312.aspx.
Internet video; Fendt.TV; "Fendt Variotronic"; Nov. 10, 2013; https://www.fendt.tv/en/home/fendt-variotronic-the-leading-edge-through-integration_1612.aspx.
Levy, Amy; Office Action; U.S. Appl. No. 15/210,049; dated Aug. 7, 2018; U.S. Patent and Trademark Office; Alexandria, VA.
Andrea C. Leggett; Office Action; U.S. Appl. No. 15/815,810; dated Jun. 14, 2019; United States Patent and Trademark Office; Alexandria, Virginia.
Abou El Seoud, Mohamed; Office Action; U.S. Appl. No. 15/815,788; dated Jun. 20, 2019; United States Patent and Trademark Office; Alexandria, Virginia.

(56) References Cited

OTHER PUBLICATIONS

Levy, Amy M.; Notice of Allowance; U.S. Appl. No. 15/210,049; dated May 16, 2019; U.S. Patent and Trademark Office; Alexandria, VA.

Song, Daeho D.; Office Action; U.S. Appl. No. 15/815,801; dated Dec. 23, 2019; United States Patent and Trademark Office; Alexandria, Virginia.

Leggett, Andrea C.; Office Action; U.S. Appl. No. 15/815,810; dated Dec. 30, 2019; United States Patent and Trademark Office; Alexandria, Virginia.

Abou El Seoud, Mohamed; Final Office Action; U.S. Appl. No. 15/815,788; dated Nov. 14, 2019; United States Patent and Trademark Office; Alexandria, Virginia.

Andrea C. Leggett; Notice of Allowance and Fees Due; U.S. Appl. No. 15/815,810; dated Apr. 17, 2020; United States Patent and Trademark Office; Alexandria, Virginia.

Song, Daeho D.; Office Action; U.S. Appl. No. 15/815,801; dated Apr. 22, 2020; United States Patent and Trademark Office; Alexandria, Virginia.

Abou El Seoud, Mohamed; Office Action; U.S. Appl. No. 15/815,788; dated May 14, 2020; United States Patent and Trademark Office; Alexandria, Virginia.

Johan Bengtsson; Communication pursuant to Article 94(3); European Application No. 16742538.8; dated Mar. 16, 2020; European Patent Office; Berlin, Germany.

Song, Daeho D.; Advisory Action; U.S. Appl. No. 15/815,801; dated Jul. 14, 2020; United States Patent and Trademark Office; Alexandria, Virginia.

Weng, Pei Yong.; Office Action; U.S. Appl. No. 16/562,881; dated Jul. 10, 2020; United States Patent and Trademark Office; Alexandria, Virginia.

Final Office Action dated Oct. 1, 2020; U.S. Appl. No. 15/815,788; United States Patent and Trademark Office; Alexandria, Virginia.

Communication Pursuant to Article 94(3) EPC dated Oct. 8, 2020; European Patent Application No. 17812130; European Patent Office; Berlin, Germany.

Communication Under Rule 71(3) EPC dated Oct. 7, 2020; European Patent Application No. 17811772; European Patent Office; Berlin, Germany; p. 8.

Benjamin Mouton; Communication pursuant to Article 94(3); European Application No. 17817363.9; dated Nov. 11, 2020; European Patent Office; Berlin, Germany.

Communication pursuant to Article 94(3) EPC dated Feb. 23, 2021; European Application No. 17825310; European Patent Office; Berlin, Germany.

\* cited by examiner

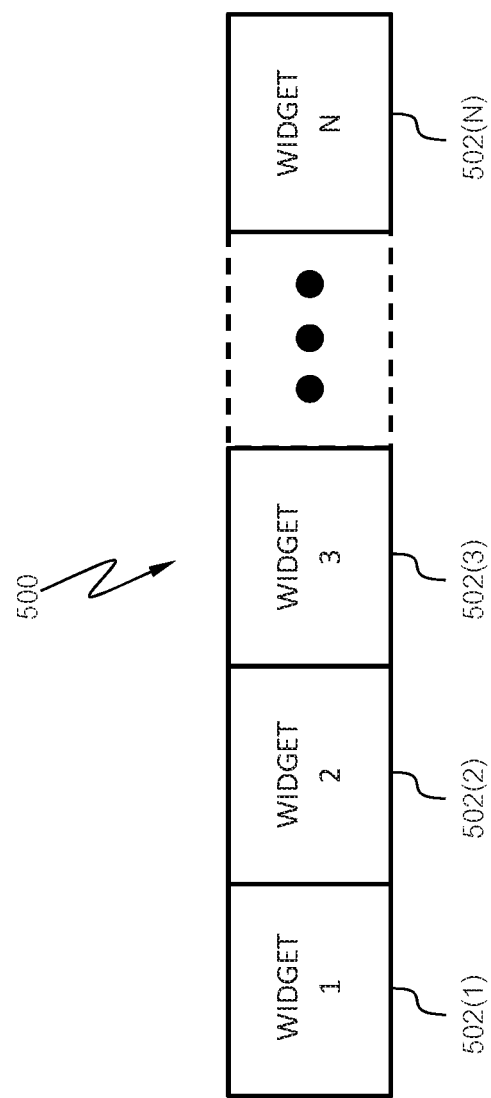

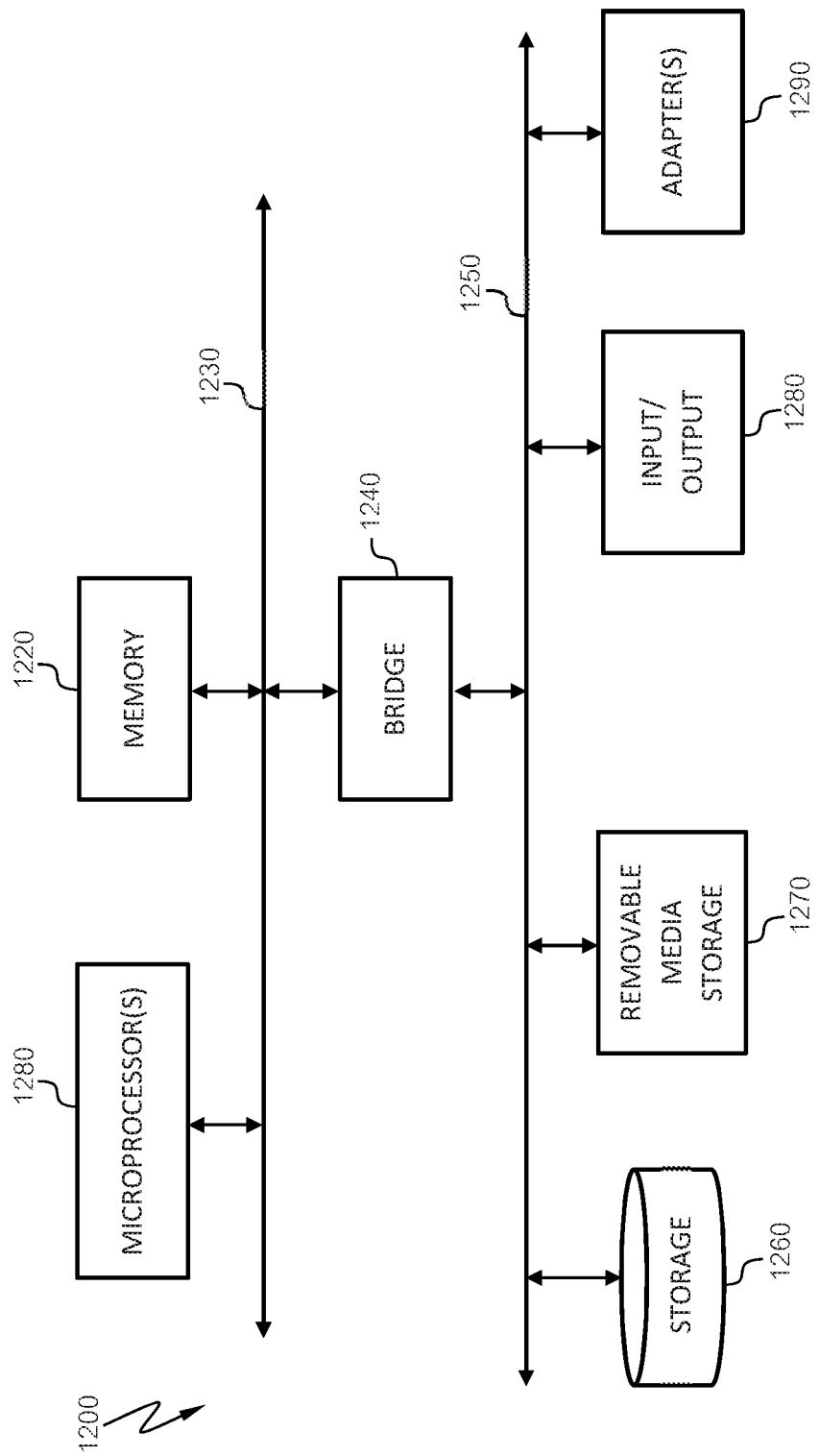

USER INTERFACE DEVICE FOR INDUSTRIAL VEHICLE

RELATED APPLICATIONS

This application claims the benefit of U.S. Provisional Application No. 62/425,099, filed Nov. 22, 2016, which is hereby incorporated by reference in its entirety. This application is related to U.S. patent application Ser. No. 15/210,049, entitled "PROCESSING DEVICE HAVING A GRAPHICAL USER INTERFACE FOR INDUSTRIAL VEHICLE," by Anthony T. Castaneda, et al., filed on Jul. 14, 2016, which claims the benefit of U.S. Provisional Patent Application Ser. No. 62/193,840, filed on Jul. 17, 2015, both of which are hereby incorporated by reference in their entirety. This application is also related to the following applications, all of which are filed concurrently herewith: U.S. patent application Ser. No. 15/815,788, entitled "USER INTERFACE DEVICE FOR INDUSTRIAL VEHICLE," by Jonathan Ochenas, et al.; U.S. patent application Ser. No. 15/815,801, entitled "USER INTERFACE DEVICE FOR INDUSTRIAL VEHICLE," by Jonathan Ochenas, et al.; and U.S. patent application Ser. No. 15/815,810, entitled "USER INTERFACE DEVICE FOR INDUSTRIAL VEHICLE," by Jonathan Ochenas, et al., all of which are hereby incorporated by reference in their entirety.

FIELD OF THE INVENTION

The present invention relates to electronic systems for use in an industrial vehicle that interacts with and presents information to a vehicle operator via a graphical user interface.

BACKGROUND OF THE INVENTION

Industrial vehicles, such as forklift trucks and other materials handling trucks, are often equipped with a user interface that allows a vehicle operator to perform a variety of functions, such as accessing and viewing information programmed into the truck, entering new information, and viewing images from onboard cameras. When entering or accessing information, the operator may be required to scroll or click through large amounts of information across multiple screens or scroll through numerous options within a menu. In addition, operators working in cold environments, such as freezers, typically must wear gloves, which increases the difficulty of navigating through multiple screens and menus.

SUMMARY OF THE INVENTION

Various aspects and embodiments of the present disclosure address various technical problems associated with the need for an operator of a materials handling vehicle to spend excess time scrolling, clicking or reviewing a large amount of information to locate needed information for viewing on a vehicle user interface screen during operation of the vehicle. The present disclosure provides a first technical solution which involves detecting activation of an icon corresponding to a widget and, in response to detecting activation of the one icon, automatically moving the corresponding widget to a designated widget space for operator use. Hence, an operator need not manually search through multiple widgets, find and move the desired widget to a screen display as the desired widget is automatically moved to the screen upon activation of the corresponding icon. Another technical solution involves detecting activation of an icon corresponding to a widget and, in response to detecting the activation of the one icon, allowing a first menu portion of the one widget to be displayed. Hence, an operator may access a menu portion of the one widget when needed and desired upon activation of the corresponding icon and inadvertent access to or appearance of the menu portion is prevented when the corresponding icon is not activated. A further technical solution involves changing a state of a portion of a widget, such as an outline of a widget, upon a vehicle function being completed, e.g., a carriage assembly reaching a desired height, which is advantageous as this provides an operator with quick and clear confirmation that the vehicle function has been successfully executed. Yet another technical solution involves detecting activation of an icon corresponding to a widget and, in response, moving the widget to a predefined widget space, moving the widget from the predefined widget space in response to an operator command to move the widget away from the widget space and automatically moving the widget back to the predefined widget space in response to a command related to a vehicle operation. Such a solution provides a user interface that is flexible so as to allow an operator to move the widget corresponding to an activated icon away from the predefined widget space when the operator wishes to view another widget for additional information yet automatically returns the widget corresponding to the activated icon to the predefined widget space in response to a command related to a vehicle operation, thereby saving the operator time as the operator need not manually look and move the widget corresponding to the activated icon back to the predefined widget space. Other technical problems and corresponding solutions are set out herein.

In accordance with a first aspect of the present disclosure, a processing device comprising a graphical user interface in an industrial vehicle is provided. The processing device comprises a screen display, such as a touch screen display that receives gesture commands from a vehicle operator, memory storing executable instructions, and a processor in communication with the memory. The processor when executing the executable instructions defines a plurality of widgets, in which each widget comprises a visual representation of a current state of an associated function of the industrial vehicle, controls the display of or causes to be displayed a subset of the plurality of widgets on a portion of the screen display defining a plurality of widget spaces, and controls the display of or causes to be displayed an icon tray or icon row on the screen display comprising one or more icons, in which at least one of the one or more icons corresponds to a respective one of the plurality of widgets.

The processor when executing the executable instructions in an example embodiment defines the icon tray as a separate portion of the screen display from the plurality of widget spaces, the icon tray being spaced apart from the plurality of widget spaces. The processor when executing the executable instructions may lock one of the plurality of widgets in position in a locked widget space upon activation of an icon corresponding to the one widget. The widget may be spaced away from its corresponding icon. The processor when executing the executable instructions may detect the activation of the icon corresponding to the one widget, and in response to detecting the activation, automatically move the one widget to the locked widget space and shift the remaining one or more widgets in the subset to the one or more remaining widget spaces. The processor when executing the executable instructions may shift a position of one or more of the widgets of the subset on the touch screen display following detection of a gesture command on the touch screen display.

The processor when executing the executable instructions may control or cause display of a first menu associated with one of the plurality of widgets when the one widget is displayed in one of the plurality of widget spaces on the screen display and a first menu portion of the one widget is activated by the vehicle operator. In some particular embodiments, the first menu may comprise a list, a sidebar, or a scroll wheel, in which a display of options in the first menu may be altered by one of a tap gesture, swipe gesture, a slide gesture, or a rotating gesture on the touch screen display and in which the options within the first menu may be color-coded with a different color. In other particular embodiments, the first menu portion of the one widget may be activated by the vehicle operator touching or selecting the first menu portion. In further particular embodiments, the processor when executing the executable instructions may define a plurality of sub-menus, each sub-menu corresponding to a particular option within the first menu, in which one sub-menu may be displayed on the screen display after the corresponding option within the first menu has been selected and a sub-menu portion of the one widget is activated.

The processor when executing the executable instructions may further color code at least a portion of the one sub-menu using a same color associated with the corresponding option within the first menu. In some embodiments, one or more of the first menu or the sub-menus may be displayed within the one widget. In other embodiments, one or more of the first menu or the sub-menus may be displayed in a separate window that is temporarily superimposed over one or more of the widget spaces. In further embodiments, the processor when executing the executable instructions may define the one widget as a rack height select (RHS) widget, the RHS widget comprising a workspace zone menu defining the first menu, in which the workspace zone menu comprises a plurality of workspace zones, each workspace zone having a corresponding sub-menu comprising a plurality of stored rack heights associated with the workspace zone. It is also contemplated that the first menu may comprise parameters or categories other than the zone. For example, the first menu may comprise a listing of racks designated by type, name and/or number. In some particular embodiments, at least a portion of a visual depiction of each workspace zone comprises a different color, and at least a portion of a visual depiction of each corresponding sub-menu comprises a same color as the associated workspace zone.

The processor when executing the executable instructions may define one of the plurality of widgets as a rack height select (RHS) widget comprising a workspace zone selection portion defining a first menu portion, in which a rack height selection portion defines a sub-menu portion, and a load presence indicator. In some particular embodiments, the processor when executing the executable instructions may control or cause display of the RHS widget in one of the widget spaces, detect a selection of a particular workspace zone and a particular stored rack height related to the particular workspace zone, in which after the selection of the particular workspace zone and the particular stored rack height, the workspace zone selection portion comprises an identifier of the particular workspace zone selected, the rack height selection portion comprises an identifier of the particular stored rack height selected, and the load presence indicator comprises a visual indication of a presence or an absence of a detected load. In other particular embodiments, the processor when executing the executable instructions may override the indication of the absence of a detected load upon activation of the load presence indicator by the vehicle operator.

In some embodiments, the processing device may further comprise a vehicle network system connecting the processor to at least one vehicle network bus, in which the processor extracts a current position of a carriage assembly and a current sensed load weight. The processor when executing the executable instructions may define one of the plurality of widgets as a capacity data monitoring (CDM) widget comprising a visual representation of the current position of the carriage assembly and the current sensed load weight.

The processing device may further comprise a vehicle operator control section comprising one or more physical input control elements, in which the one or more physical input control elements are used to make selections on the screen display. In some particular embodiments, the one or more physical input control elements may comprise at least one of a five-button control, a rotary control knob, a trigger switch on a multifunction control handle, or a trigger switch on an armrest.

The processor when executing the executable instructions may determine if a speed of the vehicle is below a threshold speed, and change one or more of the widgets of the subset on the touch screen display following detection of a gesture command on the touch screen display and if the speed of the vehicle is below the threshold speed.

The processor when executing the executable instructions may move one of the plurality of widgets to a predefined widget space upon activation of an icon corresponding to the one widget.

In accordance with a second aspect of the present disclosure, a processing device comprising a graphical user interface is provided. The processing device comprises a screen display, memory storing executable instructions, and a processor in communication with the memory. The processor when executing the executable instructions defines a plurality of widgets, in which each widget comprises a visual representation of a current state of an associated function, controls or causes display of a subset of the plurality of widgets on a portion of the screen display defining a plurality of widget spaces, controls or causes display of an icon tray on the screen display comprising one or more icons, in which at least one of the one or more icons corresponds to a respective one of the plurality of widgets, detects activation of the one of the one or more icons corresponding to the one widget, and in response to detecting the activation of the one icon, locks the respective one widget in position in one of the widget spaces.

The processor when executing the executable instructions may, in response to detecting the activation of the one icon, automatically move the one widget to the locked widget space and shift the remaining one or more widgets in the subset to the one or more remaining widget spaces.

In accordance with a third aspect of the present disclosure, a processing device comprising a graphical user interface in an industrial vehicle is provided. The processing device comprises a screen display, memory storing executable instructions, and a processor in communication with the memory. The processor when executing the executable instructions defines one or more widgets each comprising a visual representation of a current state of an associated function of the industrial vehicle, controls or causes display of at least one of the one or more widgets on a portion of the screen display defining one or more widget spaces, controls or causes display of an icon tray on the screen display comprising one or more icons, in which at least one of the one or more icons corresponds to a respective one of the one or more widgets, detects activation of the one icon corresponding to the one widget, in response to detecting the activation of the one icon, allows a first menu portion of the one widget to be displayed, controls or causes display of a first menu associated with the one widget.

In an embodiment, the processor when executing the executable instructions may, in response to detecting the activation of the one icon, allow a first menu portion of the one widget to be activated, detect activation of the first menu portion, and, in response to detecting the activation of the first menu portion, control or cause display of the first menu associated with the one widget.

The processor when executing the executable instructions may, further in response to detecting the activation of the one icon, lock the one widget in position in a first widget space on the screen display.

In accordance with a fourth aspect of the present invention, a processing device comprising a graphical user interface in an industrial vehicle is provided. The processing device comprises a screen display, memory storing executable instructions, and a processor in communication with the memory. The processor when executing the executable instructions defines one or more widgets, each widget comprising a visual representation of a current state of an associated function of the industrial vehicle, and controls or causes display of a rack height select (RHS) widget on a portion of the screen display defining one or more widget spaces, in which the RHS widget comprises a portion that changes state upon a related vehicle function being completed, e.g., a carriage assembly reaching a desired height. The outline of the RHS widget, defining the portion, may become one of darker, wider or both darker and wider upon a related vehicle function being completed, e.g., a carriage assembly reaching a desired height.

In accordance with a fifth aspect of the present invention, a processing device comprising a graphical user interface in an industrial vehicle is provided. The processing device comprises a screen display, memory storing executable instructions, and a processor in communication with the memory. The processor when executing the executable instructions defines a plurality of widgets, in which each widget comprises a visual representation of a current state of an associated function of the industrial vehicle, controls or causes display of a subset of the plurality of widgets on a portion of the screen display defining a plurality of widget spaces, controls or causes display of an icon tray on the screen display comprising one or more icons, in which at least one of the one or more icons corresponds to a respective one of the plurality of widgets, detects activation of the one of the one or more icons corresponding to the one widget. The processor when executing the executable instructions, in response to detecting the activation of the one icon, moves the respective one widget to a predefined widget space, moves the respective one widget from the predefined widget space in response to an operator command, and moves the one widget back to the predefined widget space in response to a command related to a vehicle operation.

The command related to a vehicle operation may comprise one of a command to activate a traction motor to effect vehicle movement or a command to lift or lower a carriage assembly.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 5 is a schematic diagram illustrating an array of widgets for display on a display screen of the processing device of FIG. 3 in accordance with principles of the present disclosure;

FIG. 12 is a block diagram of a computer processing system capable of implementing any of the systems, modules, or methods described herein, in accordance with principles of the present disclosure.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1A:
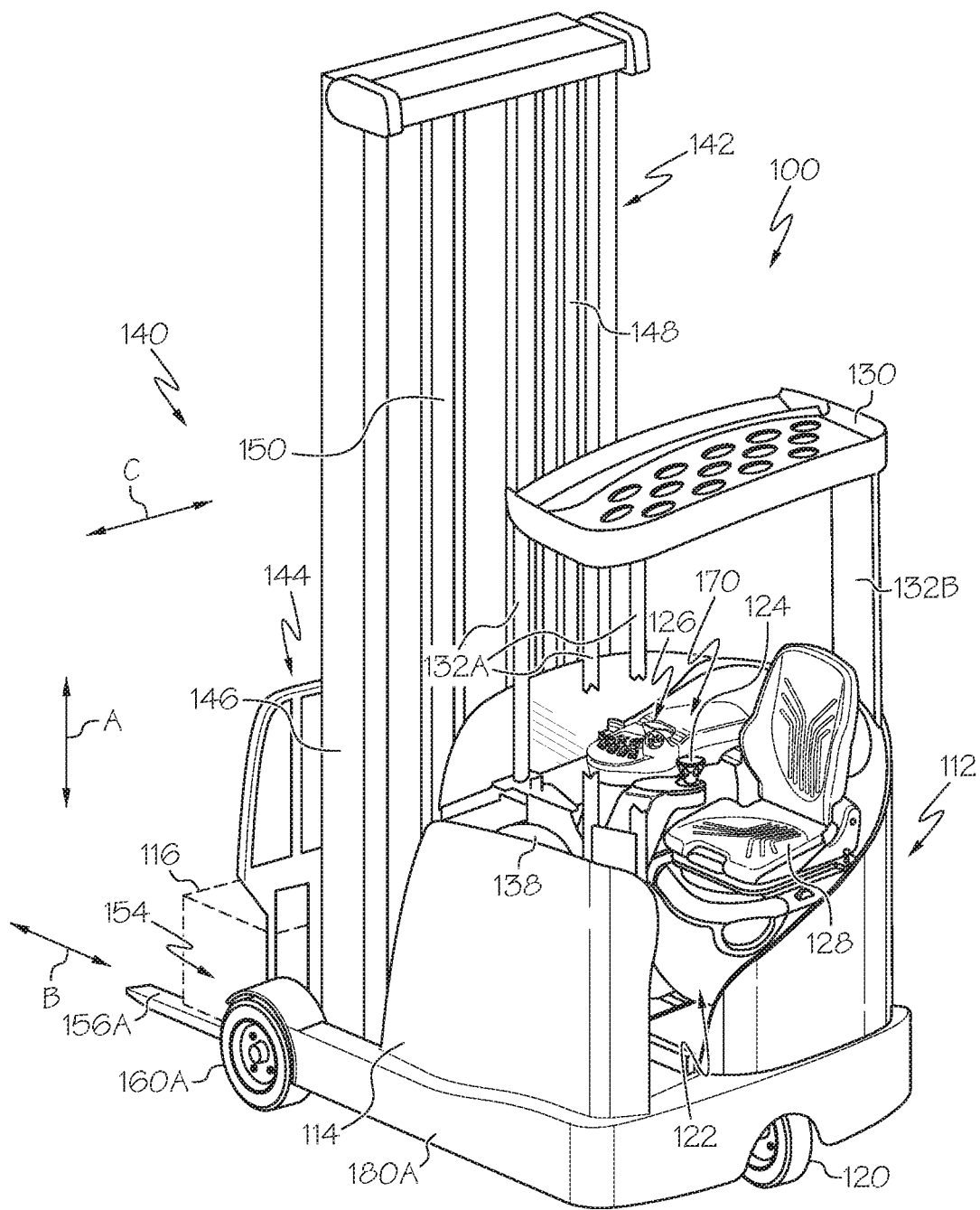
FIG. 1A is a perspective view of an industrial vehicle in accordance with principles of the present disclosure.
Figure 1B:
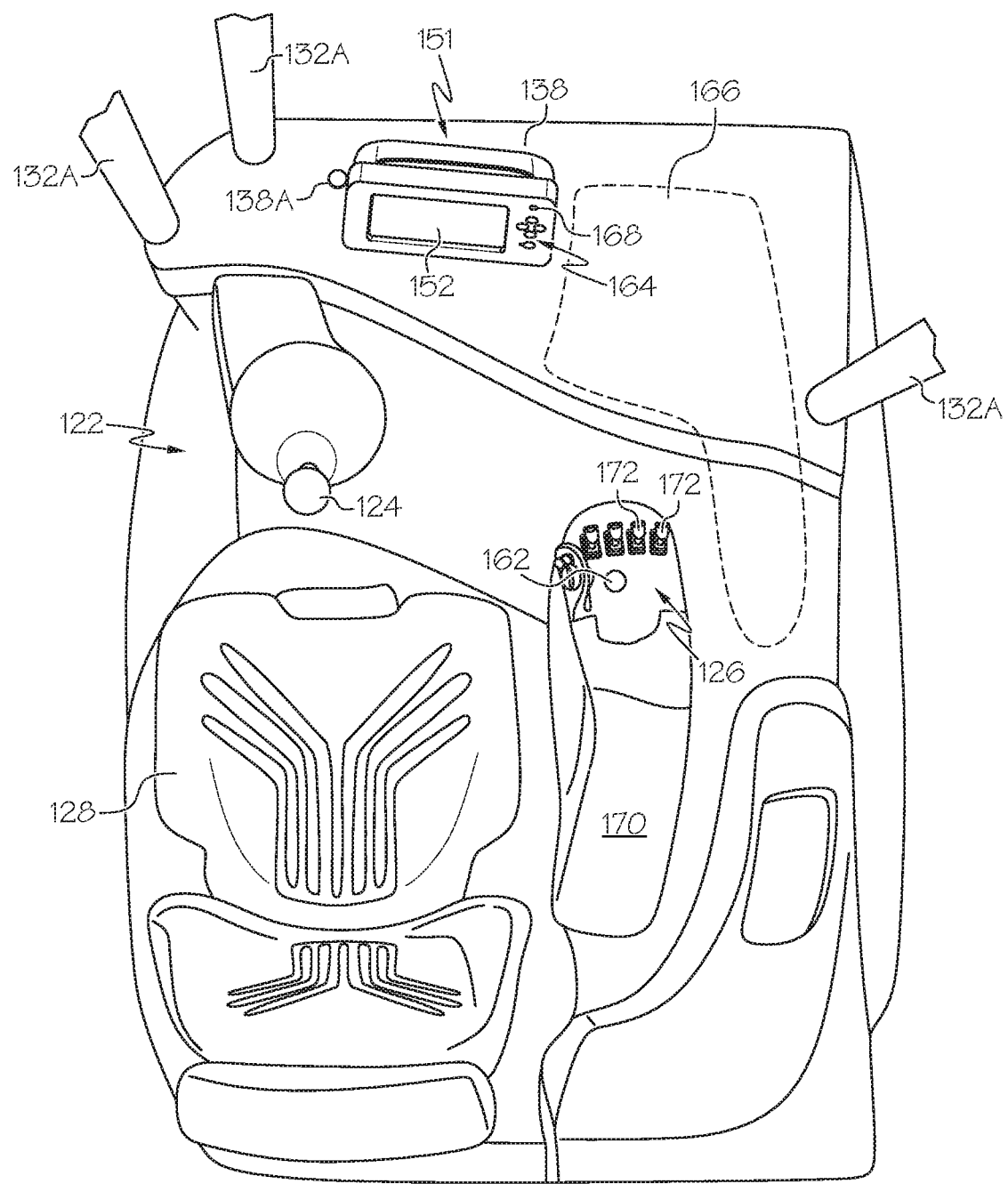
FIG. 1B is a top view of an operator's compartment of an industrial vehicle in accordance with principles of the present disclosure.

With reference to FIGS. 1A and 1B, an exemplary industrial vehicle 100 (hereinafter "vehicle") is shown. While the present disclosure is made with reference to the illustrated vehicle 100, which comprises a reach truck, it will be apparent to those of skill in the art that the vehicle 100 may comprise a variety of other industrial vehicles, such as a stock picker, a turret truck, a tow tractor, a rider pallet truck, a walkie stacker truck, a counterbalance forklift truck, etc. and the following description of the invention with reference to the figures should not be limited to a reach truck unless otherwise specified. The vehicle 100 comprises a main body or power unit 112 and one or more wheels, including a pair of fork-side first wheels 160A, 160B coupled to a pair of outriggers 180A, 180B (only one first wheel 160A and one outrigger 180A are shown in FIG. 1A) and a powered and steered second wheel 120 located underneath a frame 114 of the power unit 112. An overhead guard 130 comprises one or more vertically extending supports, such as support structures 132A, 132B, affixed to the frame 114, see FIG. 1A, structure 132B is not shown in FIG. 1B.

The vehicle 100 further comprises a load handling assembly 140, which generally comprises a mast assembly 142 and a carriage assembly 144. The mast assembly 142 is positioned between the outriggers 180A, 180B and may comprise, for example, a fixed mast member 146 affixed to the frame 114 and nested first and second movable mast members 148, 150. It is noted that the vehicle 100 may comprise additional or fewer movable mast members than the two members 148, 150 shown in FIG. 1A. The carriage assembly 144 may comprise, for example, a lifting carriage (not shown) vertically movable along the mast assembly 142, a fork carriage assembly 154 coupled to the lifting carriage for vertical movement with the lifting carriage and a fork structure coupled to the fork carriage assembly 154 comprising a pair of forks 156A, 156B (only one fork 156A is shown in FIG. 1A) such as for carrying a load 116, such as a loaded pallet. The fork carriage assembly 154 may comprise a base carriage (not shown) coupled to the lifting carriage and a support carriage (not shown) coupled to the base carriage, which is moveable laterally and may also pivot relative to the base carriage. The forks 156A, 156B are coupled to the support carriage. The carriage assembly 144 is movable generally vertically along the mast assembly 142 and may further comprise a reach assembly (not shown) positioned between the lifting carriage and the fork carriage assembly 154 for horizontally extending the fork carriage assembly 154 away from and toward the mast assembly 142.

A battery (not shown), which is housed in a compartment within the frame 114, supplies power to a traction motor (not shown) that is connected to the second wheel 120 and to one or more hydraulic motors (not shown). The hydraulic motor(s) supply power to several different systems, such as one or more hydraulic cylinders (not shown) for effecting generally vertical movement of the movable mast members 148, 150 relative to the fixed mast member 146 and generally vertical movement of the carriage assembly 144 relative to the second movable mast member 150 of the mast assembly 142, as shown by arrow A in FIG. 1A; generally longitudinal movement of the reach assembly (commonly referred to as "reach"), as shown by arrow B; generally transverse or lateral movement of the support carriage and the forks 156A, 156B relative to the base carriage (commonly referred to as "sideshifting"), as shown by arrow C; and pivotable movement of the support carriage and forks 156A, 156B relative to the base carriage. Hence, the carriage assembly 144 moves relative to the second movable mast member 150 and also moves with the first and second movable mast members 148, 150 relative to the fixed mast member 146. The traction motor and the second wheel 120 define a drive mechanism for effecting movement of the vehicle 100 across a floor surface.

An operator's compartment 122 is located within the main body 112 for receiving an operator driving or operating the vehicle 100. The operator's compartment 122 comprises a variety of control elements including one or more handles, knobs, levers, switches, buttons, sliders, encoders, and combinations thereof, along with one or more devices that display information to the operator and/or receive operator input. For example, a tiller knob 124 is provided within the operator's compartment 122 for controlling steering of the vehicle 100. An armrest 170 located adjacent to an operator seat 128 comprises a control panel 126 for receiving input from the operator. In the embodiment shown in FIGS. 1A and 1B, the control panel 126 on the armrest 170 comprises a plurality of fingertip levers 172 which, in the illustrated embodiment, may control carriage assembly (fork) raise/lower, fork tilt, fork sideshifting, fork extend or reach and the like. The control panel 126 may also comprise a switch (not labeled) for controlling a travel direction of the vehicle (forward or backward) and a rotary control knob 162 for controlling a rack height select function, e.g., wherein the vehicle is programmed to define a set of fork stop locations for each of a plurality of rack beam heights in respective storage zones. The control panel 126 may also comprise one or more dual-axis control levers or a multifunction control handle (not shown) in place of, or in addition to, the fingertip levers 172. In embodiments in which the control panel 126 comprises levers, the traction motor may be actuated by depression of a floor pedal (not shown). In a further embodiment, the control panel 126 may include a one-click button or trigger switch (not shown) for controlling a rack height select function. In yet another embodiment, where a multifunction control handle (not shown) is used in place of the fingertip levers 172, a trigger switch may be provided on the multifunction control handle for controlling a rack height select function. In embodiments in which the control panel 126 comprises a multifunction control handle, the traction motor may be actuated by operation of the multifunction control handle.

In the embodiment shown in FIG. 1B, the power unit comprises a console 138 upon which may be mounted a display and processing unit 151 (also referred to herein as a "display unit") comprising a screen display 152 and a five-button keypad 164 comprising up, down, right, left, and enter buttons for entering information and commands, navigating through menus on the screen display 152, making selections, etc., as described herein. As described herein, the screen display 152 may be implemented as a touch screen (also referred to herein as a touch screen display). The rotary control knob 162 may be used in addition to, or in place of, one or more of the functions of the five-button keypad 164. The operator may press a tilt release lever or button 138A located on the console 138 to tilt the display unit 151 toward or away from the operator.

In FIG. 1B, the display and processing unit 151 is depicted as being located in front of the operator's seat 128. However, the display unit 151 may be placed at other locations in the operator's compartment 122, so long as the display unit 151 is easily viewed and accessed by the operator. For example, the display unit 151 may be located in an area 166 (shown with dashed lines), which includes a dashboard area adjacent to the console 138. The area 166 also includes an optional extension of the console 138 along a right side of the operator's compartment 122. Location of the display unit 151 in the area 166, for example, allows the operator easy access to the screen display 152 and the five-button keypad 164 without moving his or her arm from the armrest 170.

In some embodiments, the display unit 151 may be mounted, for example, on one of the support structures 132A, 132B. Some vehicles 100, such as those designed to operate in cold storage, may include an enclosed cabin (not shown) comprising the operator's compartment 122, and the display unit 151 may be mounted elsewhere in the operator's compartment 122, such as on one or more additional support structures (not shown). In other embodiments, the display unit 151 may comprise a separate or standalone device, such as a tablet or laptop computer. In addition, although the rotary control knob 162 is depicted in FIG. 1B as being located on the armrest 170, the rotary control knob 162 in some embodiments may be located elsewhere within the operator's compartment 122, e.g., on the display unit 151 (see FIG. 3).

Figure 2A:
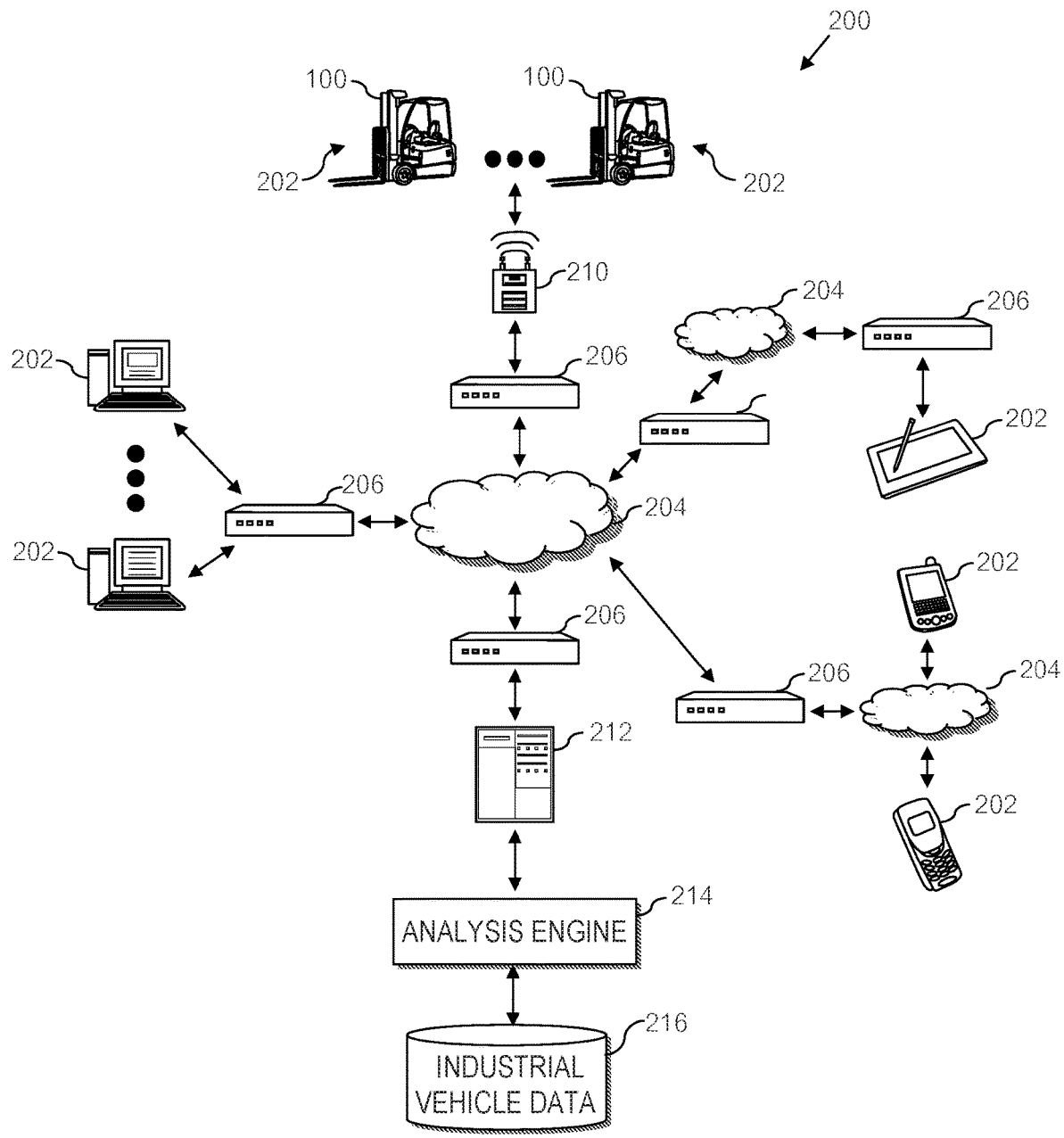
FIG. 2A is a block diagram of an industrial vehicle computing enterprise in accordance with principles of the present disclosure.

Turning now to FIG. 2A, a general diagram of an industrial vehicle computing enterprise comprising a computer system 200 is illustrated in accordance with various aspects of the present disclosure. The illustrated computer system 200 is a special purpose (particular) system that operates in a manner that enables industrial vehicles, e.g., vehicles 100, to communicate wirelessly across a computer enterprise. The computer system 200 comprises a plurality of hardware processing devices (designated generally by reference numeral 202) that are linked together by one or more networks (designated generally by reference numeral 204). The networks 204, which may comprise wired or wireless networks, provide communications links between the various processing devices 202 and may be supported by networking components 206 that interconnect the processing devices 202. The networking components 206 may comprise, for example, routers, hubs, firewalls, network interfaces, wired or wireless communications links and corresponding interconnections, cellular stations and corresponding cellular conversion technologies (e.g., to convert between cellular and TCP/IP), etc.

The processing devices 202 may comprise any device capable of communicating over the respective networks 204. In certain contexts and roles, the processing device 202 is intended to be mobile (e.g., a hardware-based processing device 202 provided on the vehicles 100). In this regard, the vehicles 100 include a processing device 202 that may communicate wirelessly to the network 204 to carry out the features described herein. Under such circumstances, the vehicles 100 may wirelessly communicate through one or more access points 210 to a corresponding networking component 206. The vehicles 100 may also be equipped with WiFi, cellular, or other suitable technology that allows the processing device 202 on the vehicles 100 to communicate directly with a remote device (e.g., over the network(s) 204).

The illustrative computer system 200 also comprises a hardware server 212 (e.g., a web server, a file server, and/or other processing device) that supports an analysis engine 214 and one or more corresponding data sources (designated generally by reference numeral 216). The analysis engine 214 and data sources 216 may provide resources to one or more of the processing devices 202, including the processing devices 202 installed on the vehicles 100.

Figure 2B:
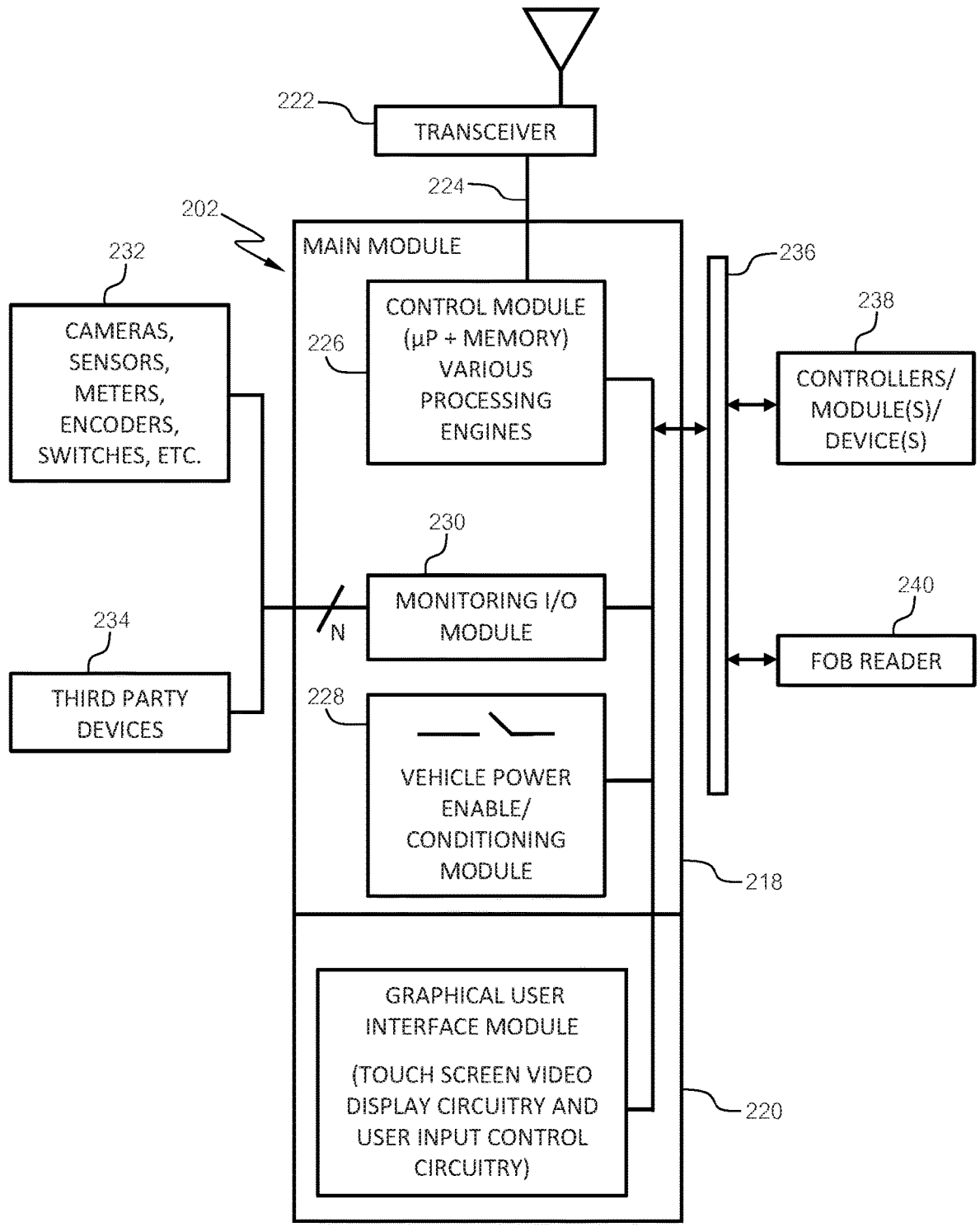
FIG. 2B is a block diagram of a special purpose processing device on an industrial vehicle in accordance with principles of the present disclosure.

With reference to FIG. 2B, an exemplary processing device 202 is described in detail. The processing device 202 is equivalent to, and an exemplary embodiment of, the processing device 202 on the vehicle 100, as shown in FIG. 2A. The processing device 202 in FIG. 2B is a special purpose, particular hardware computer, such as a device that mounts to or is otherwise integrated with the vehicle 100. The processing device 202 may comprise one or more processors coupled to memory to carry out executable instructions stored in the memory. However, the execution environment of the processing device 202 is further tied into the native electronics of the vehicle 100, making it a particular machine different from a general purpose computer.

Figure 3:
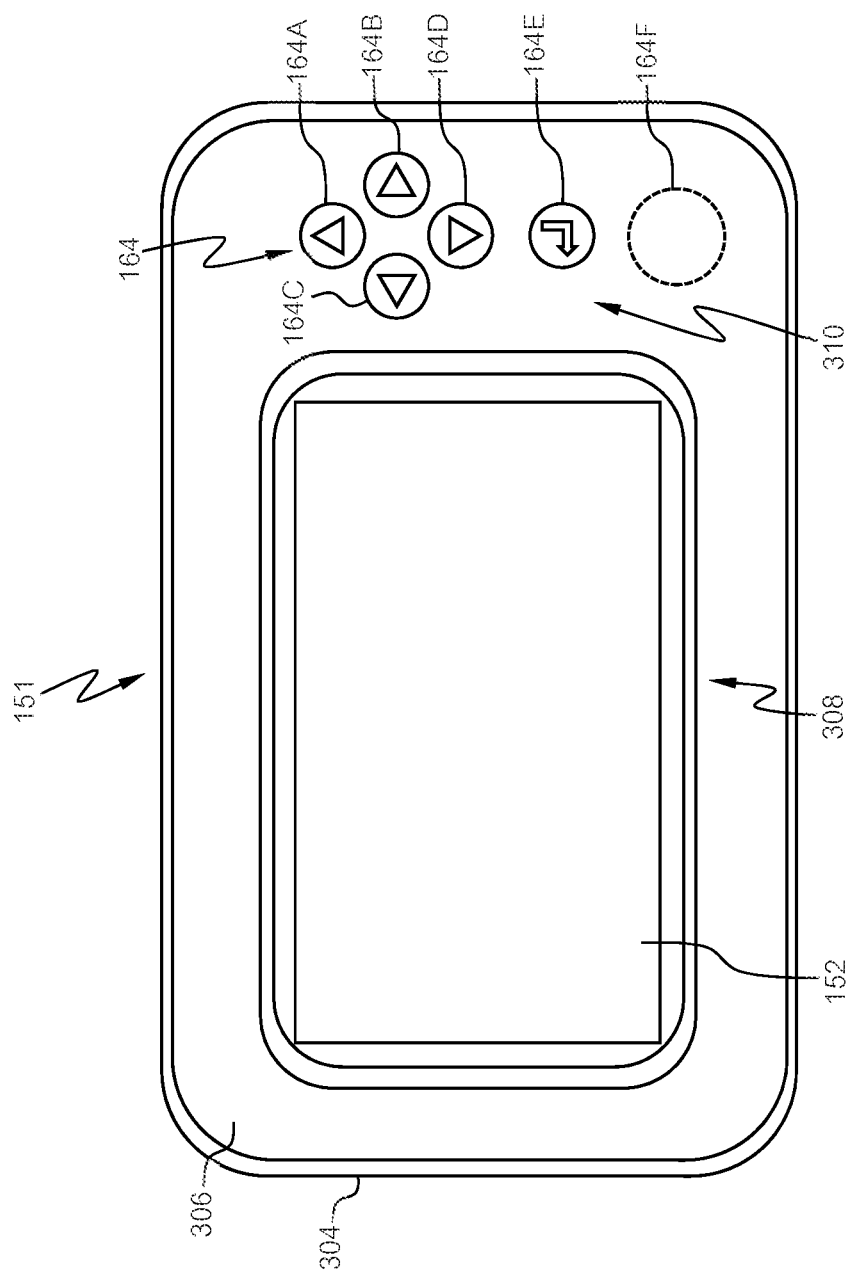
FIG. 3 is an illustration of the processing device of FIG. 2B, implemented as a graphical user interface having a touch screen display and a corresponding vehicle operator control section in accordance with principles of the present disclosure.

The processing device 202 illustrated in FIG. 2B may be implemented as an information linking device that comprises the necessary circuitry to implement communication with a remote server (e.g., server 212 in FIG. 2A), data and information processing for processing vehicle data, and wired (and optionally wireless) communication to components of the corresponding vehicle 100 to which the processing device 202 is mounted. In accordance with aspects of the present disclosure, the processing device 202 (also referred to as a display and processing device) may be implemented as a main module 218 and a service module 220, which couple together to create an integrated processing device 202, e.g., the display and processing unit 151 (FIG. 3). The service module 220 (which also includes a graphical user interface module) is field-replaceable and may comprise part of the display and processing unit 151. The service module 220 comprises the screen display 152, the five-button keypad 164, and the graphical user interface module defining any necessary data processing circuitry. In this regard, the service module 220 in conjunction with a control module 226, discussed below, define a graphical user interface for the processing device 202. It is also contemplated that the main module 218 and the service module 220 may not be integral such that the main module 218 is separate from the display unit 151.

In some embodiments, the processing device 202 is connected to a transceiver 222 for wireless communication. Although a single transceiver 222 is illustrated in FIG. 2B for convenience, in practice, one or more wireless communication technologies may be provided (e.g., WiFi, Bluetooth®, and/or cellular). For example, the transceiver 222 may be able to communicate with a remote server (e.g., server 212 of FIG. 2A) via 802.11 across the access points 210 of FIG. 2A. The transceiver 222 may also optionally support other wireless communication, such as radio frequency (RF), infrared (IR) or any other suitable technology or combination of technologies. For example, using a cellular-to-IP bridge (not shown), the transceiver 222 may be able to use a cellular signal to communicate directly with a remote server, e.g., a manufacturer server (not shown). The transceiver 222 connects to the processing device 202 via a suitable electrical connection 224, e.g., an Ethernet connection. However, the transceiver 222 may connect to the processing device 202 using other suitable connections. Alternatively, the transceiver 222 may be built-in or otherwise integral with the processing device 202.

The processing device 202 also comprises data processing circuitry (illustrated generally as the control module 226) having a processor (µP) coupled to a memory for implementing executable instructions, including the relevant processes, or aspects thereof, as set out and described more fully herein. The control module 226 may also comprise other necessary processing circuitry and software, such as for implementing a display engine, camera processing engine, data processing engine(s), etc. In this regard, the control module 226 may comprise additional support circuitry, e.g., video ports, camera ports, input/output ports, etc. Moreover, the memory may comprise memory that stores processing instructions, as well as memory for data storage, e.g., to implement one or more databases, data stores, registers, arrays, etc. Additionally, the control module 226 implements processes such as operator login, pre-use inspection checklists, data monitoring, and other features, examples of which are described more fully in U.S. Pat. No. 8,060,400, the entirety of which is hereby incorporated by reference herein.

The processing device 202 may also optionally comprise vehicle power enabling circuitry 228 to selectively enable or disable the vehicle 100 and/or to selectively enable or disable select components or functions of the vehicle 100. In some embodiments, the vehicle power enabling circuitry 228 may partially or fully enable the vehicle 100 for operation, e.g., depending upon a proper operator login, a particular vehicle condition, etc. For example, the vehicle power enabling circuitry 228 may selectively provide power to components via a suitable power connection (not shown) or otherwise command certain vehicle components not to respond to vehicle operator control via vehicle messaging, e.g., across one or more vehicle communication busses.

Still further, the processing device 202 comprises a monitoring input/output (I/O) module 230 to communicate via wired or wireless connection between the control module 226 and one or more peripheral devices mounted to or otherwise associated with the vehicle 100, such as one or more cameras, sensors, meters, encoders, switches, etc. (not separately labeled; collectively represented by reference numeral 232). The monitoring I/O module 230 may optionally be connected to other devices, e.g., third party devices 234, such as one or more RFID scanners, displays, meters, bar code scanners, cameras, or other devices to convey information to the control module 226.

The processing device 202 is coupled to and/or communicates with other vehicle system components via a suitable vehicle network system 236. The vehicle network system 236 may comprise at least one wired or wireless network, bus, or other communications capability or combination thereof that allows electronic components of the vehicle 100 to communicate with each other. As an example, the vehicle network system 236 may comprise a controller area network (CAN) bus, ZigBee, Bluetooth®, Local Interconnect Network (LIN), time-triggered data-bus protocol (TTP), RS422 bus, Ethernet, universal serial bus (USB), other suitable communications technology, or combinations thereof.

As will be described more fully herein, utilization of the vehicle network system 236 enables seamless integration of the components of the vehicle 100 with the processing device 202, and in particular, the control module 226. By way of example, the vehicle network system 236 enables communication between the control module 226 and a fob (via a fob reader 240), a keypad, a card reader, or any other suitable device for receiving operator login identification, as well as one or more native vehicle components, such as a vehicle control module, controllers (e.g., traction controller, hydraulics controller, etc.), modules, devices, bus-enabled sensors, displays, lights, light bars, sound generating devices, headsets, microphones, haptic devices, etc. (designated generally by reference numeral 238). The control module 226 may also facilitate the communication of information from any electronic peripheral devices 232 or third party devices 234 associated with the vehicle 100 (e.g., via the monitoring I/O module 230) that integrate with and communicate over the vehicle network system 236.

Referring now to FIG. 3, an example display and processing unit 151 is illustrated. As noted above, the display unit 151 can implement functions and/or features of the display and processing device 202 of FIG. 2B. As described herein, the display unit 151 may be used in or with an industrial vehicle, e.g., vehicle 100, and may be mounted to the power unit console 138, as noted above, or otherwise integrated with the vehicle 100. It will be apparent to those of skill in the art that the display unit 151 may also be used with other types of vehicles, e.g., automobiles, etc., and in other non-vehicular settings.

The display unit 151 comprises a housing 304 having a front face 306 defining a display section 308 comprising the screen display 152 and a vehicle operator control section 310. The screen display 152 within the display section 308 may comprise, for example, an LCD screen, a light emitting diode (LED) screen, a plasma screen, etc. The screen display 152 may comprise any known technology, e.g., a touch screen display, so as to receive and respond to gesture commands, e.g., implemented by the operator directly touching or tapping the touch screen display 152, pressing against or releasing from the touch screen display 152, swiping, sliding, or rotating a finger along or across the touch screen display 152, and performing other touch gesture functions or combinations thereof. The terms "gesture command" and "touch gesture command" also include gesture commands that do not require direct physical contact with the screen display 152 such as when an operator moves a finger adjacent to but spaced a small distance from the touch screen display 152 in a swiping, sliding, rotating or other motion.

The vehicle operator control section 310 may comprise one or more physical input control elements, such as buttons, switches, sliders, encoders, knobs, etc., that are used to receive operator input, e.g., making selections on the touch screen display 152. One or more multifunction control handles, keypads, keyboards (not shown), or combinations thereof may be provided in place of the vehicle operator control section 310. As shown in FIG. 3, the vehicle operator control section 310 comprises the five-button keypad 164 including an up direction button 164A, a right direction button 164B, a left direction button 164C, a down direction button 164D, and an enter button 164E. The vehicle operator control section 310 may optionally comprise one or more additional input elements or devices, such as a rotary control knob 164F, which may be used in conjunction with or in place of the rotary control knob 162 located on the armrest (see FIG. 1B) and may perform similar functions.

Referring generally to FIGS. 2B and 3, the control module 226 comprises a hardware processor coupled to physical memory and is capable of carrying out computer-executed processes in a hardware system. In this regard, the processes, architectures, and organizations described herein may be implemented on computer-readable hardware that stores machine-executable program code, where the program code instructs the processor to implement the described features. The processor of the control module 226 executes the program code stored in the memory to implement a graphical user interface control architecture that transmits information to and receives information from the graphical user interface module of the service module 220. In particular, the control module 226 provides several distinct control functions that impact the manner in which the service module 220 presents and receives information via the touch screen display 152 when interacting with the vehicle operator. For example, as described herein, the processor of the control module 226 may define one or more widgets and/or one or more icons and may control or cause the touch screen display 152 to display one or more of the widgets and/or icons.

Figure 4:
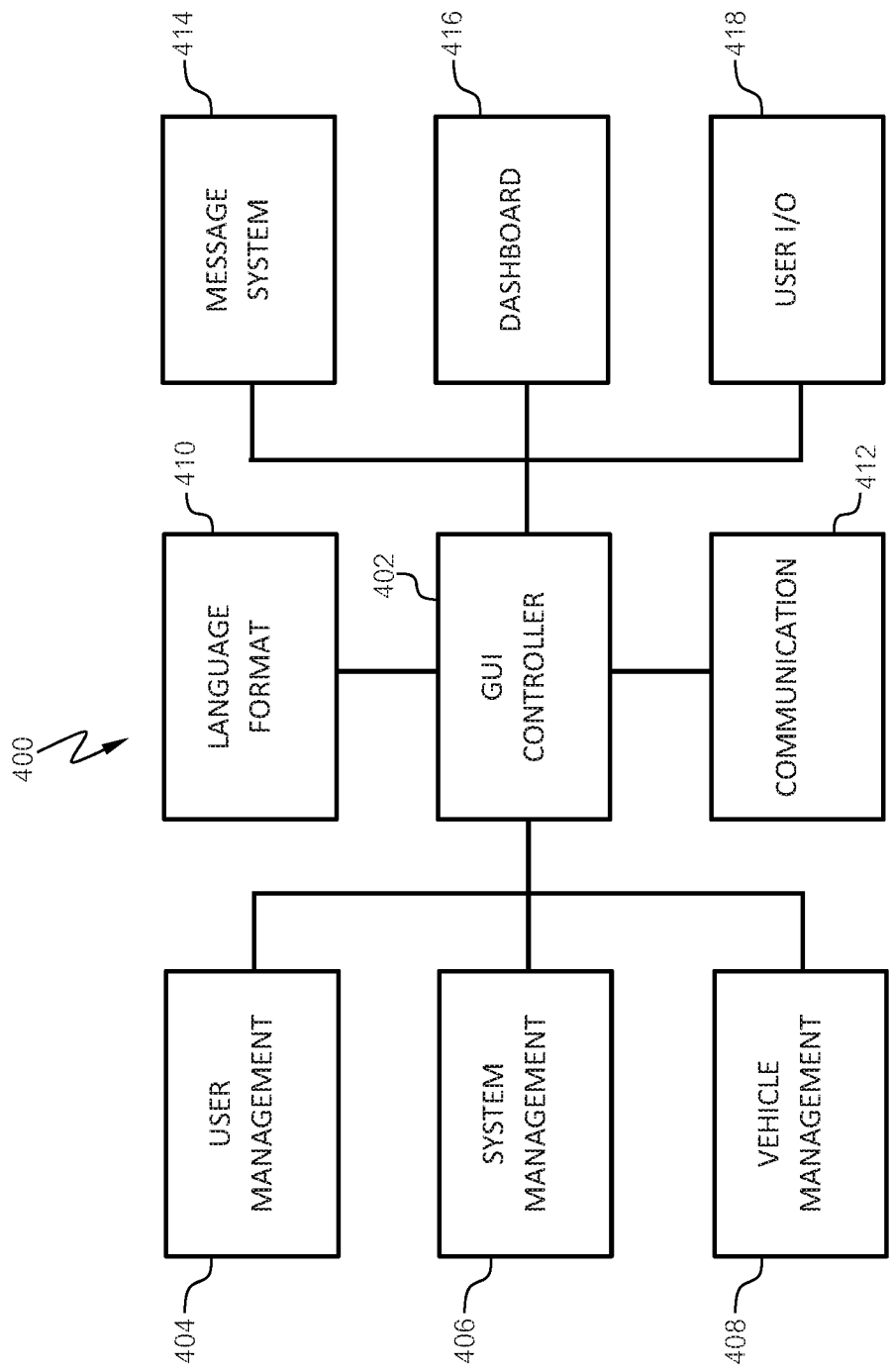
FIG. 4 is a block diagram of operational modules executed by a processor of the special purpose processing device of FIG. 2B in accordance with principles of the present disclosure.

With reference to FIG. 4, a logical organization of software code stored in memory that is controlled, read and manipulated by the control module 226 to effect control of the service module 220 by the control module 226, which modules 220 and 226 define the graphical user interface of the processing device 202, is illustrated. The features in FIG. 4 are set out in simplified block diagram form and may be executed by the control module 226 of FIG. 2B (e.g., a microprocessor coupled to memory), and comprises a graphical user interface (GUI) controller module 402 that controls a plurality of sub-algorithms (modules) that affect the manner in which the processing device 202 (FIG. 2B)

interacts with the operator. In this regard, the GUI controller module 402 communicates with each sub-algorithm/module and further communicates with the graphical user interface module of the service module 220 (FIG. 2B) to present information to the operator via a display screen, e.g., the touch screen display 152 (FIG. 3), and to receive information from the operator, e.g., via touch/gesture controls received through touching the touch screen display 152 and/or interacting with one or more physical control elements in the vehicle operator control section 310 of the display unit 151 (FIG. 3) or the control panel 126 (FIG. 1B).

In embodiments in which the screen display 152 comprises a touch screen, the GUI controller module 402 receives and processes touch gesture commands when the operator touches the touch screen display 152, such as touch, tap, press, release, swipe, scroll, etc. Received touch gesture commands may comprise, for example, a first touch gesture command implemented as an up swipe gesture command, a second touch gesture command implemented as a right swipe gesture command, a third touch gesture command implemented as a left swipe gesture command, a fourth touch gesture command implemented as a down swipe gesture command, and a fifth touch gesture command implemented as a select gesture command (e.g., pressing and releasing, tapping, etc.).

In other embodiments, the GUI controller module 402 receives and processes operator input from one or more of the control elements in the vehicle operator control section 310 of the display unit 151 (FIG. 3). The GUI controller module 402 may implement a set of controls that comprise hardware control equivalents to the touch gesture commands recognized by the touch screen display 152. For example, the GUI controller module 402 may process a first control designated as an "up" control (e.g., via the operator pressing the up direction button 164A of FIG. 3), a second control designated as a "right" control (e.g., via the operator pressing the right direction button 164B), a third control designated as a "left" control (e.g., via the operator pressing the left direction button 164C), a fourth control designated as a "down" control (e.g., via the operator pressing the down direction button 164D), and a fifth control designated as a "select" control (e.g., via the operator pressing the enter button 164E). The various controls may also be implemented on a single input device, e.g., a keypad or a rotary control knob, or via additional separate control elements.

In this regard, the control module 226 (FIG. 2B), e.g., implemented as the GUI controller module 402, is communicably connected to the touch screen display 152 (FIG. 3), as described herein. The control module 226 detects interactions with the touch screen display 152 and/or one or more of the control elements in the vehicle operator control section 310 or the rotary control knob 162, 164F. For example, the control module 226 maps the up swipe gesture command on the touch screen display 152 (e.g., the operator places a finger on the touch screen display 152 and swipes upward) and operation of the down control to a same first graphical user interface command. The control module 226 maps the right swipe gesture command on the touch screen display 152 (e.g., the operator places a finger on the touch screen display and swipes to the right) and operation of the left control to a same second graphical user interface command. The control module 226 likewise maps the left swipe gesture command on the touch screen display 152 (e.g., the operator places a finger on the touch screen display and swipes to the left) and operation of the right control to a same third graphical user interface command. The control module 226 also maps the down swipe gesture command on the touch screen display 152 (e.g., the operator places a finger on the touch screen display 152 and swipes downward) and operation of the up control to a same fourth graphical user interface command. The control module 226 yet further maps the select gesture command on the touch screen display 152 (e.g., touch, press, release, etc.) and operation of the select control to a same fifth graphical user interface command. These graphical user interface commands may vary in function depending upon what is currently being displayed on the display 152, examples of which are described in greater detail herein.

The control module 226 may similarly map operator commands associated with the rotary control knob 162, 164F. For example, the control module 226 maps rotation of the rotary control knob 162, 164F to the left and operation of the left control to a same (second) graphical user interface command. The control module 226 maps rotation of the rotary control knob 162, 164F to the right and operation of the right control to a same (third) graphical user interface command. The control module may map depression of the rotary control knob 162, 164F and operation of the select control to a same (fifth) graphical user interface command.

The up and down commands or controls may be used to navigate vertically, e.g., up and down within various menus provided in the screen display 152 of the display unit 151 (FIG. 3), as described herein in detail. The up and down commands or controls may also be used to scroll up and down in an image that is too large to display in its entirety in the area of the screen display 152, to increment and decrement a value that the operator provides as an input, etc. The right and left commands or controls may be used to navigate laterally, e.g., to scroll across the widgets and to expose additional widgets; scroll through, drill into, and back out of multilayer menus; scroll to the right or left of an image that is too large to fit in the area of the screen display 152; modify data entry values, etc. Moreover, a combination of the up and down commands or controls, as well as the right and left commands or controls, may be used to scroll across text or other data that is too large to fit in the area of the screen display 152. Operation of the "select" command or control enables the operator to, for example, execute an enter command, select or activate a menu option, accept a value, trigger an action, clear a message, set or stop a timer, or otherwise interact with the information displayed via the display unit 151.

The redundancy of the commands and controls generated by touching the touch screen display 152, and using the corresponding control elements (e.g., buttons 164A-164E in FIG. 3) in the vehicle operator control section 310 facilitates operation of the display unit 151, even in harsh environments. For example, some operators must wear gloves, such as during operation in refrigerated areas of a warehouse. Moreover, the positioning of the buttons 164A-164E in close proximity (e.g., on the same housing) to the touch screen display 152 facilitates operator interaction by keeping the operator consistently focused in a common area regardless of interaction with the touch screen display 152 or tactile control elements (e.g., buttons) when interacting with the display unit 151. Thus, in this configuration, the buttons 164A-164E are co-located with, for example, the touch screen display 152.

The GUI controller module 402 also facilitates customization of the user interaction experience. For example, the GUI controller module 402 communicates with a user management module 404 and a system management module 406. A user management module 404 may store personalized settings that are passed from the control module 226 (FIG.

2B), such as in response to an operator logging into a corresponding vehicle 100 using a fob via the fob reader 240 (FIG. 2B), or via logging onto the vehicle 100 using the display unit 151. The system management module 406 may be utilized to control the allowable operator-specific settings, e.g., by limiting, disabling, enabling, etc., features. In an illustrative example, the user management module 404 may be used to store a vehicle operator performance or skill level, a theme preference, a language preference, unit measurement preference (e.g., metric or English), widget arrangement, etc. A generic template may be provided where there is no customization data available for a specific vehicle operator. In a further illustrative example, the system management module 406 limits and controls the ability of the vehicle operator to configure themes, language preference, widget arrangement, widget customization, etc. One or more of these features may be temporarily overridden or permanently locked out, e.g., by a system supervisor, from appearing as a user settable parameter. For example, the available themes may be set or limited based upon a vehicle operator level, truck level, company level, etc., and may be temporarily overridden for certain vehicle-specific functionality, e.g., to provide an inspection checklist, to provide certain diagnostic information, etc.

The GUI controller module 402 further communicates with a vehicle management module 408. The vehicle management module 408 stores and controls information about the specific vehicle 100 on which the processing device 202 (FIG. 2B) is installed. For example, the vehicle management module 408 may comprise information about a maximum fork height, maximum weight, battery charge, or other vehicle-specific characteristics.

The GUI controller module 402 still further communicates with a language format module 410, which may be used to set a preferred language for the display of text on the screen display 152 (FIG. 3). In particular, the language format module 410 manages the strings that are to be translated and pushed to the screen display 152, as well as the font, text alignment, direction, and other features that affect readability of the desired information by the operator. The GUI controller module 402 still further communicates with a communication module 412, which controls the communication of the GUI controller module 402 with other vehicle controllers, modules, devices, sensors, third party devices, etc., as set out in FIGS. 2A and 2B.

The GUI controller module 402 further communicates with a message system module 414. The message system module 414 may control the messaging that is presented to the operator, as well as the manner in which the messaging is presented to the operator. For example, a message may be displayed across a portion of the screen display 152, e.g., across a bottom third, across one widget space (606, 608 in FIG. 6A), or across the entire screen display 152 (FIG. 3). The GUI controller module 402 also communicates with a dashboard module 416. The dashboard module 416 controls icons, the icon order, widgets, the widget order, and the menu systems that are presented on the screen display 152. The dashboard module 416 is also responsible for screen management, e.g., storing the current screen, next screen, previous screen, etc., and for tracking the menus, calibration, checklists, icon display, widget display, messaging, text and video messaging, etc. The GUI controller module 402 further communicates with a user I/O module 418 to translate inputs provided by the operator into instructions that are interpreted to facilitate a vehicle operator interaction experience when interacting with the graphical user interface module of the service module 220 (FIG. 2B), which may be implemented as part of the display unit 151 (FIG. 3). For example, the user I/O module 418 may process input received via touch gesture commands from the operator touching the touch screen display 152, via the physical control elements in the vehicle operator control section 310 or via the control panel 126 (FIG. 1B).

In accordance with aspects of the present disclosure, the screen display 152 may be utilized to display one or more widgets, each of which is defined by an application program forming part of the dashboard module 416 that provides a visual representation on the screen display 152. In an embodiment, computer instructions are provided in the form of an application program stored in memory that instructs the processor of the control module 226 what a particular widget looks like, how it behaves and how it responds to operator actions and/or vehicle-related information. The visual representation provides information to the operator and allows the operator to interface with the control module 226. For example, widgets may provide visual representations of a current state of one or more associated vehicle features, functions, or operations (e.g., a battery charge, a current vehicle speed, etc.) and/or one or more ancillary conditions (e.g., environmental condition such as the current time). In an exemplary embodiment, widgets may be used to represent the current state of the vehicle speed, fork height, load weight, battery charge, clock, stop watch, odometer, trip meter, hour meter, time, and date.

In this regard, the widgets represent "live" or real-time data. With reference to FIGS. 2A and 2B, the current state of data values may be obtained, for example, by the processor of the control module 226 communicating with (e.g., querying, polling, reading from, etc.) one or more vehicle control modules, sensors, etc. (e.g., one or more electronic peripheral devices 232) across the vehicle network system 236, via the monitoring I/O module 230, or a combination thereof. The current state data may also be ascertained by polling or otherwise querying a remote server, e.g., the server 212, which extracts relevant data from the data sources 216, e.g., a vehicle data repository, and communicates that relevant data back to the control module 226. Furthermore, the control module 226 may read the current state from a designated memory on the vehicle 100, e.g., a master state data repository (not labeled). For example, a process on the vehicle 100 (e.g., a process executed by the controller/processor in the control module 226) may be tasked with cyclically collecting and refreshing vehicle state information in the designated memory, e.g., every 100 milliseconds or less. The designated memory thus defines a vehicle state lookup table that may be accessed to make decisions based on a current operating state of the vehicle 100. The current state data may also include data regarding the vehicle operator performance or skill level.

By way of example, by continually data logging operator-based performance and/or vehicle operation data, one or more of the widgets may provide a dashboard view of key vehicle and/or operator performance measures. In this regard, the overall data provided in a widget need not be limited to data collected by or stored in a specific vehicle. In some embodiments, one or more of the widgets may reflect all of the relevant vehicle data associated with the logged in operator, regardless of which vehicle the operator is currently operating. In other embodiments, one or more of the widgets may tie into third party databases to display other information, such as operational information, messages, information from a warehouse management system, feeds (such as from news, sports, and weather), etc. Thus, the processing device 202 is communicably connected to a communications device (e.g., the transceiver 222) such that the processing device 202 receives from a remote server (e.g., the server 212), information that is not extracted from the vehicle 100.

With reference to FIG. 5, the widgets may be organized into an array 500. The array 500 dictates, for example, which widgets will be presented on the screen display 152 (FIG. 3) and the order in which the widgets will be presented. For example, a first widget 502(1) is designated as a leftmost widget, followed by widgets 502(2), 502(3) . . . 502(N), in which N is any reasonable number. The vehicle operator may add as many widgets as are available or as are limited via preferences set in the user management module 404 (FIG. 4). Moreover, the operator may rearrange the order of presentation of the widgets so that the widgets are ordered as desired, as described herein. One or more widgets, e.g., widgets 502(1) and 502(2), may be used to set a "Home Screen," which may be displayed as a default or to which the operator may return. The Home Screen may, for example, display the two widgets representing the most important features for the operator. The widgets may also be configured and ordered from the screen display 152, e.g., via input from the operator, or the widgets may be set or preset by the system supervisor or via a remote computer, which wirelessly sends the widgets and widget order to the vehicle 100, such as through the remote server 212 (FIG. 2A).

Figure 6A:
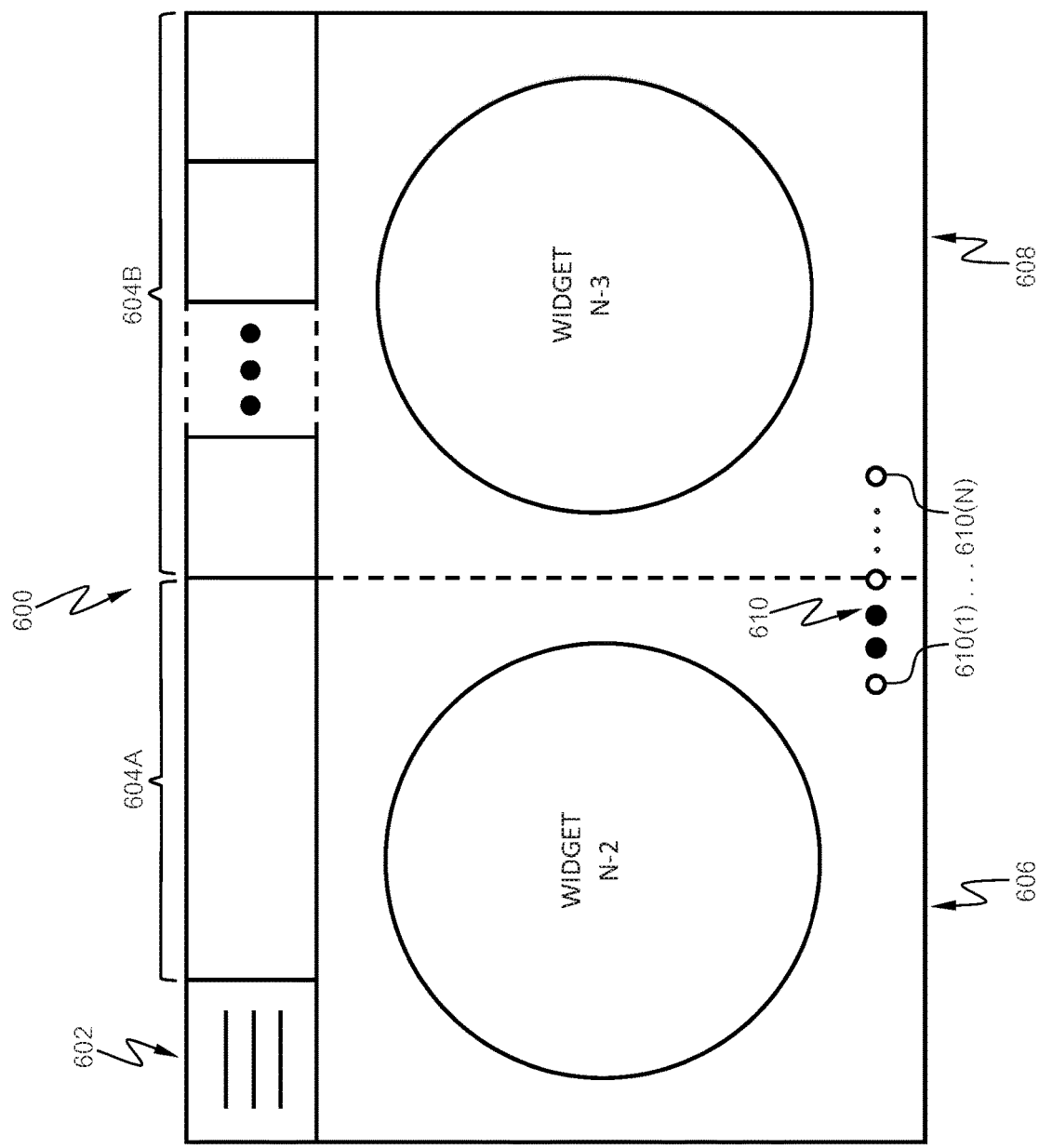
FIGS. 6A and 6B are schematic screen shots of the display screen of the processing device of FIG. 3 in accordance with principles of the present disclosure.
Figure 6B:
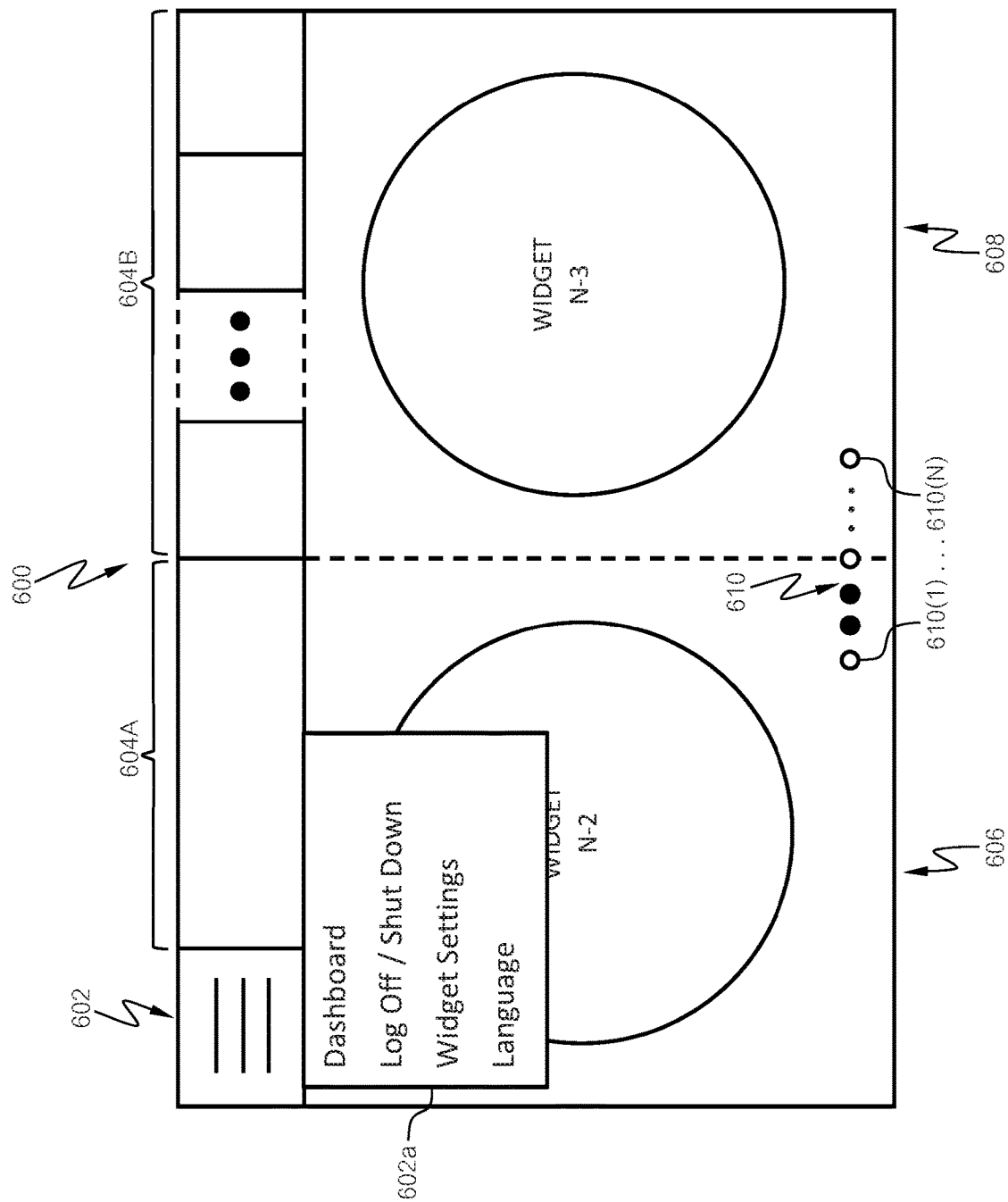

Referring now to FIGS. 6A and 6B, an exemplary display screen 600 is illustrated, which may be implemented as a touch screen. The display screen 600 is an example of a graphical user interface display, which may be presented by the screen display 152 of the display unit 151 (FIG. 3). The display screen 600 may be conceptually broken down into several sections comprising a menu selection section 602, a first docked status tray 604A, a second docked status tray 604B, and one or more widget spaces, which are illustrated as a first widget space 606 and a second widget space 608. Although the display screen 600 is depicted herein as comprising one menu selection section, two status trays, and two widget spaces, it will be apparent to those of skill in the art that different configurations of the display screen 600 are possible. For example, the upper portion of the display screen 600 may comprise only one status tray or three or more status trays. In addition, the display screen 600 may comprise three or more widget spaces. However, a size of the display screen 600 may dictate the number of available widget spaces and/or status trays.

As shown in FIG. 6B, the menu selection section 602 may be used to access a menu, e.g., a drop down menu 602a, relating to one or more general vehicle settings and to the general operation and appearance of the display screen 600. Selection of one of the options in the drop down menu 602a may result in the display of one or more sub-menus (not shown) with additional options related to the selected option. One or more of the options in the drop-down menu 602a and/or sub-menu(s) may comprise an associated number or value (not shown) that may be viewed and/or changed by clicking or selecting on the option. The operator may access the menu 602a or sub-menu(s) and make selections as described herein. In some embodiments (not shown), the menu 602a may be displayed over both widget spaces 606, 608.

One status tray, e.g., the first status tray 604A, or a portion thereof may be used to display information such as one or more identifiers related to the operator, the vehicle, the vehicle owner, etc. One status tray, e.g., the second status tray 604B, or a portion thereof may comprise an icon row or an icon tray that is used to dock a predetermined number of system status icons (730 in FIG. 7A). The first and second widget spaces 606, 608 each display a widget comprising a visual representation of a current state of an associated ancillary condition or vehicle feature or function. The term "a current state of an associated function of a vehicle" is intended to encompass "the current state of an associated ancillary operation, condition or vehicle feature or function." In the exemplary display screen 600 shown in FIGS. 6A and 6B, two widgets N-2, N-3 are displayed, e.g., according to the order set by the array 500 (FIG. 5). Thus, because widget N-2 is displayed in the first widget space 606, widget N-3 is displayed in the second widget space 608. Moving the widgets to the right would shift widget N-2 into the second widget space 608 and a new widget, widget N-1, into the first widget space 606 (not shown). Likewise, moving the widgets to the left would shift the widget N-3 into the first widget space 606 and widget N-4 into the second widget space 608 (not shown). This process may continue so that the operator may scroll through all of the assigned widgets in the array 500. At widget N-1 and N-N, the scrolling may stop or wrap around to the next adjacent widget in the array 500.

An optional widget position indicator 610 may be utilized to illustrate the number and position of the displayed widgets within the array 500. In the embodiment shown, the widget position indicator 610 comprises circles, but in other embodiments (not shown) the widget position indicator 610 may comprise another shape, e.g., squares, triangles, etc. A number of circles 610(1) . . . 610(N) may correspond to a number of widgets available within the array 500, see FIGS. 6A and 6B. For example, as shown in FIG. 7B, there are nine widgets available for display, as indicated by circles 610(1) to 610(9). In FIGS. 6A and 6B, a portion or subset of the available widgets, e.g., widgets N-2 and N-3, is displayed on the display screen 600, and the widget position indicator 610 may also indicate a current position of the displayed widgets N-2, N-3 within the array 500. For example, widgets N-2 and N-3 are the second and third widgets in the array, as indicated by the second and third circles 610(2), 610(3) in the widget position indicator 610 being solid. The remaining widgets, i.e., widgets N-1 and N-4 to N-N are off the display screen 600, as indicated by the corresponding first and fourth through Nth circles 610(1), 610(4)-610(N) being open.

Figure 7A:
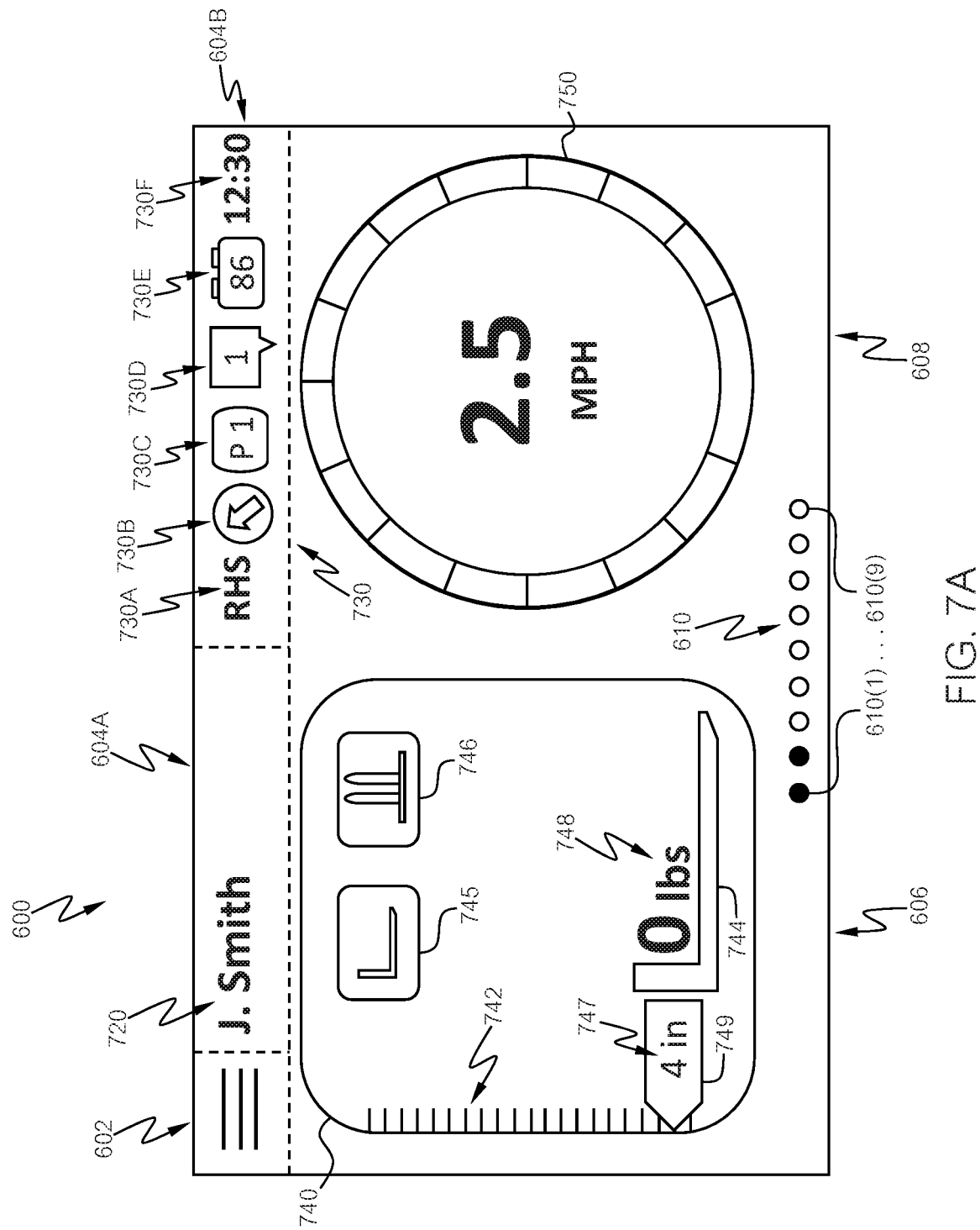
FIGS. 7A-7I are schematic screen shots of the display screen of the processing device of FIG. 3 in accordance with principles of the present disclosure.
Figure 7B:
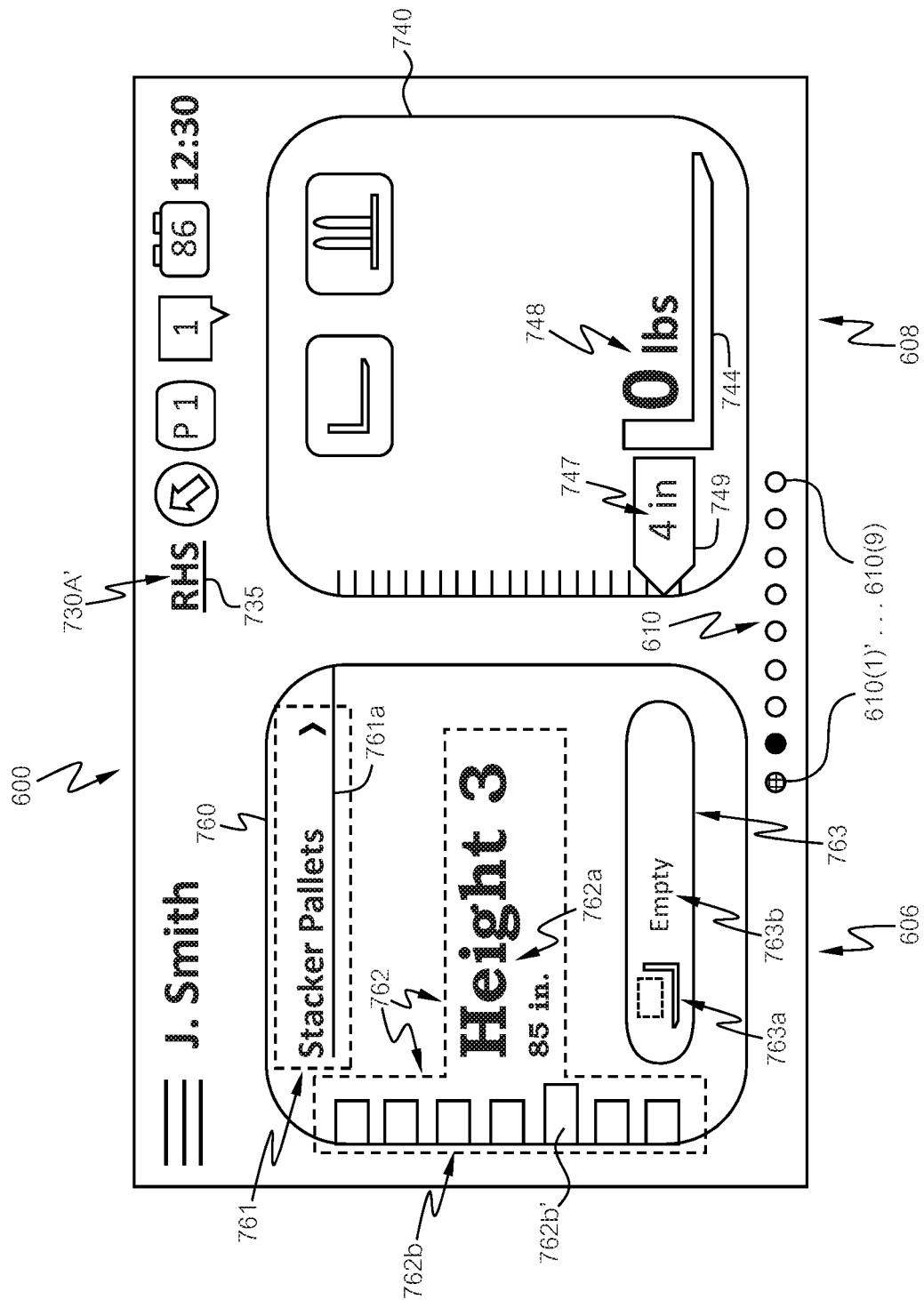
Figure 7C:
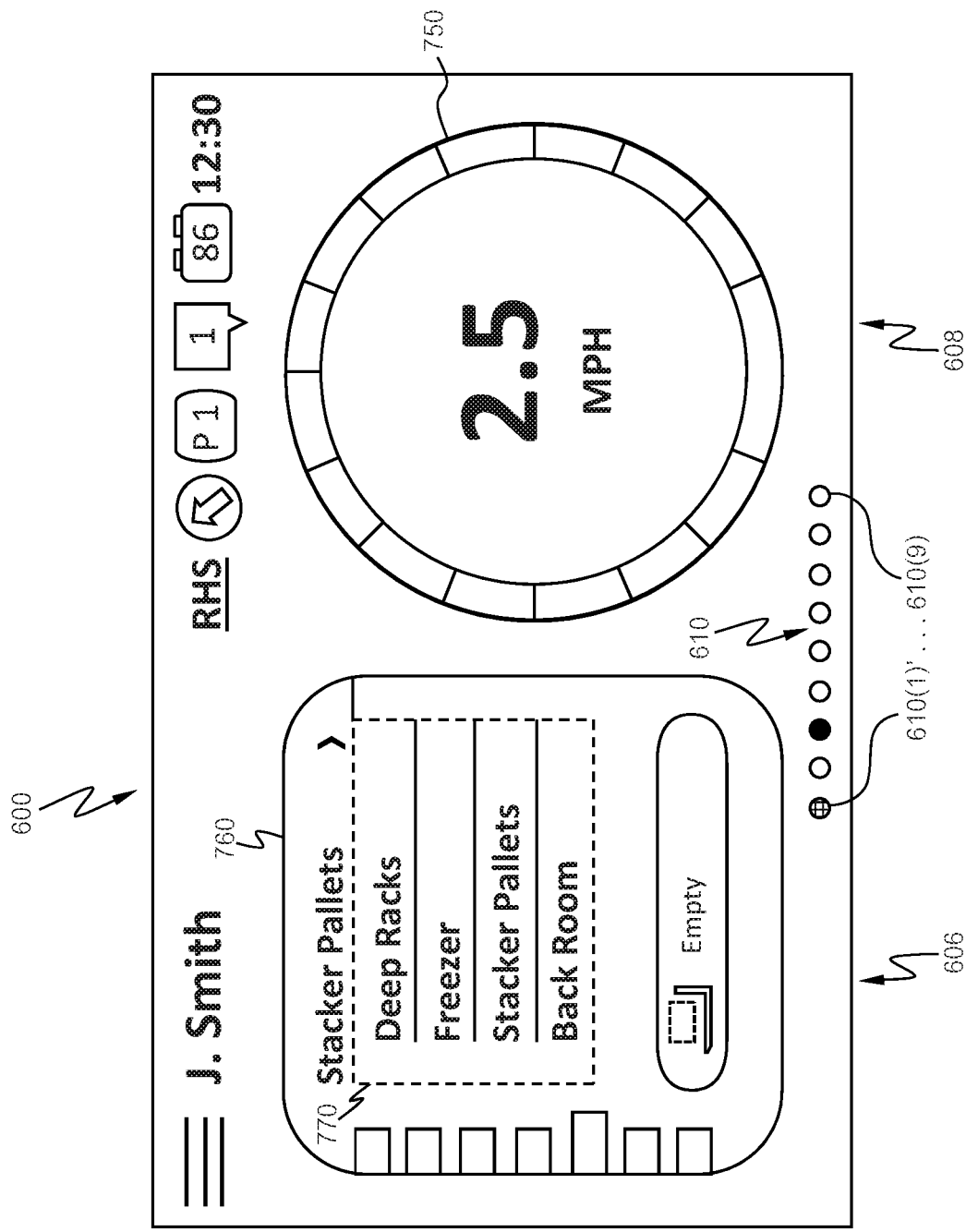

With reference to FIGS. 7A-7C, several aspects of the general functionality of the screen display 152 of the display unit 151 (FIG. 3) will be discussed in detail. An exemplary display screen 600, which may be implemented as a touch screen, is illustrated and may comprise an example of a graphical user interface display, which may be presented by the screen display 152. Although reference is made to elements and features of particular icons and widgets, those of skill in the art will appreciate that the described elements and features are not limited to these particular icons and widgets. In addition, labeling of some elements is omitted for clarity.

As shown in FIG. 7A, display screen 600 is conceptually broken down into a menu selection section 602, a first status tray 604A, and a second status tray 604B, as represented by the dashed lines. The first status tray 604A comprises one or more identifiers 720, such as the operator's name, e.g., "J. SMITH," the name of another person actively logged into the vehicle, a vehicle name, a company name, a location, etc. The second status tray 604B comprises an icon tray with one or more system status icons 730. The first widget space 606 comprises a capacity data monitoring (CDM) widget 740, and the second widget space 608 comprises a speedometer widget 750. The widget position indicator 610 indicates that there are nine widgets available for display and that the CDM and speedometer widgets 740, 750 are widgets N-1 and N-2 in the associated array 500 of widgets (FIG. 5), as indicated by the first and second circles 610(1), 610(2) being solid and the remaining circles 610(3) to 610(9) being open.

Each icon 730 corresponds to a current state of an associated vehicle feature, function, or operation or an ancillary condition. For example, the icons 730 depicted in FIG. 7A comprise a rack height select (RHS) icon 730A, a steer wheel/travel direction indicator icon 730B, a performance icon 730C, a messaging icon 730D, a battery condition icon 730E, and a clock icon 730F. In some embodiments, one or more of the icons 730 displayed in the second status tray 604B may be locked or fixed in position on the display screen 600, e.g., in the icon tray, and may be changed, for example, only by a system supervisor or fleet manager. For example, in some embodiments, the RHS icon 730A may be activated or inactivated by the operator, as described herein, but may be removed or otherwise altered only by the system supervisor or fleet manager. One or more of the icons 730 may comprise an indicator that provides a visual representation of the current state of the associated vehicle feature, function, or operation or ancillary condition. For example, the steer wheel/travel direction indicator icon 730B comprises an arrow within a circle (not separately labeled) indicating a general steer wheel/travel direction within a 360° plane, the messaging icon 730D comprises a message bubble with a "1" to indicate that the operator has one message, the battery icon 730E displays "86" to indicate that the battery charge is currently 86%, etc. Thus, the operator may use the icons 730 to quickly determine the current state of the corresponding vehicle features, functions, or operations or ancillary conditions, without the need to display a corresponding widget in one of the widget spaces 606, 608.

In some embodiments, at least one of the icons 730 corresponds to a respective one of the widgets. The corresponding widget may be displayed in one of the widget spaces 606, 608, or the corresponding widget may be available in the array 500 (FIG. 5) but is currently off the display screen 600. For example, as shown in FIGS. 7A and 7B, the RHS icon 730A corresponds to an RHS widget 760, which is off the screen in FIG. 7A and is displayed in the first widget space 606 in FIG. 7B. Alternatively, the corresponding widget may be installed on the vehicle 100, i.e., stored in memory, but is not currently in the array 500 of widgets available for display. In a particular embodiment, the last widget in the array may comprise an "add" widget (not shown) that, when touched or selected, displays a menu as described herein that lists additional available widgets for selection and insertion into the array 500. In other embodiments, one or more of the icons 730 may not include a corresponding widget. For example, the clock icon 730F may not include a corresponding widget. Each icon may be defined by an application program (similar to the widget application program) forming part of the dashboard module 416 that provides a simple visual representation on the screen display 152. In an embodiment, computer instructions are provided in the form of an application program stored in memory that instructs the processor of the control module 226 what a particular icon looks like, how it behaves and how it responds to operator actions and/or vehicle-related information.

In further embodiments, one or more of the icons 730 may appear only when a particular condition is satisfied or occurs. For example, the messaging icon 730D may appear in the second status tray 604B only upon receipt of a new message, and a maintenance icon (not shown) may appear only upon receipt of an indication of a problem with a vehicle component or system. In yet further embodiments, one or more of the icons 730 may be removed from the second status tray 604B when a particular condition is satisfied or occurs.

The performance icon 730C may be used to set a vehicle mode (e.g., training, economy, or full performance mode).

In some embodiments, selection or activation of one of the icons locks the corresponding widget into place on the display screen 600 in a designated or "locked" widget space. As used herein, "activation" is intended to comprise touching, tapping, clicking, or otherwise selecting a portion of the display screen where the icon is located using one or more touch gestures and/or one or more physical control elements, such as the physical control elements found in the vehicle operator control section 310 (FIG. 3) or the control panel 126 (FIG. 1B), e.g., the rotary control knob 162 or trigger switch (not shown). For example, upon the touch screen 600 sensing an operator touching or tapping the corresponding portion of the touch screen 600 where the icon is located, the icon becomes activated. The activated icon becomes deactivated when an operator touches or taps the corresponding portion of the touch screen 600 where the activated icon is located. The locked widget space may comprise any one of the widget spaces, e.g., the first or the second widget space 606, 608. The widget corresponding to the activated icon may already be located in the locked widget space, in which case the corresponding widget will be locked in place in its current location upon activation of the icon and, in one embodiment, will not move from the locked widget space unless the corresponding icon is deactivated. If three or more widget spaces are provided, the locked widget space may comprise a center widget space. If none of the icons is activated, any widget located in the designated or "locked" widget space is not locked in position.

However, the widget corresponding to the activated icon may be located in one of the other widget spaces or may be off the display screen 600. In some embodiments, the widget corresponding to the activated icon may not be in the array 500 (FIG. 5) of widgets currently available for display on the display screen 600 but is installed on the vehicle 100, i.e., stored in memory. In all cases in which the corresponding widget is not currently displayed in the locked widget space, the remaining widgets may be shifted to the right or left to allow the corresponding widget to move to the locked widget space. In some embodiments, the movement of the corresponding widget and shifting of the remaining widgets may occur automatically upon detecting activation of the icon such that the corresponding widget immediately moves to the locked widget space and becomes locked in position. In other embodiments, the remaining widgets will be shifted only upon detection of a touch gesture or actuation of one or more control elements following activation of the icon. In further embodiments, selection of an icon and movement of the corresponding widget into the locked widget space may automatically reorganize the array 500 of widgets to place the widget corresponding to the selected icon in the first position in the array 500, e.g., the first widget 502(1). In yet further embodiments, activation of an icon for a widget that is not currently in the array 500 and display of the widget on the display screen 600 upon activation of the corresponding icon may also result in the introduction of an additional circle (not shown) in the widget position indicator 610 to indicate the presence of the additional widget.

For example, with reference to FIGS. 7A and 7B, the CDM widget 740 in FIG. 7A is located in the first widget space 606, and the speedometer widget 750 is located in the second widget space 608. In FIG. 7B, the RHS icon 730A' has been activated, and the corresponding RHS widget 760 has been moved into a locked widget space, e.g., the first widget space 606 at the leftmost side of the display screen 600. The remaining widgets 740, 750 have been shifted to the right, i.e., the CDM widget 740 has been shifted into the second widget space 608 in FIG. 7B and the speedometer widget 750 has been moved off the display screen 600 to the right.

One or more characteristics of a visual appearance of the activated icon may be altered upon activation. For example, as shown in FIG. 7B, the activated RHS icon 730A' is underlined 735. Alternatively, or in addition to the underlining 735, a box (not shown) may appear around the activated icon and/or a color or appearance of one or more portions of the activated icon may change (not shown). For example, the text "RHS" in the activated RHS icon 730A' may be changed to italics and/or may be changed from a default color to another color (e.g., from white to orange upon activation) or a combination thereof to clearly indicate to the operator that the icon has been activated. In addition, a portion of the background of the activated icon may also change color or appearance upon activation (not shown).

In addition, one or more characteristics of the widget position indicator 610 may be altered to indicate that a widget has been locked into place in the locked widget space. For example, as shown in FIG. 7B, the first circle 610(1)' in the widget position indicator 610 is changed, for example, from solid black, as indicated in FIG. 7A, to a different color (e.g., orange) to indicate that the corresponding widget has been locked into place. A background pattern, shape (not shown), or other characteristic of the widget position indicator or combinations thereof may also be changed to indicate that a widget has been locked into place. Where the locked widget space comprises the second widget space 608 or another widget space, one or more characteristics of the corresponding circle 610(2) ... 610(N) in the widget position indicator 610 may also be changed (not shown).

Prior to activation of an icon and locking of the corresponding widget into the locked widget space, the operator may scroll through the widgets using one or more touch gestures and/or one or more physical control elements, as described herein, and the widgets in both widget spaces will change as the operator cycles through the array 500 (FIG. 5). In some embodiments, the operator may change a widget's current position in the array 500 by pressing and holding on the widget and dragging and dropping the widget to the desired location (not shown). After activation of an icon and locking of the corresponding widget into the locked widget space as shown, for example, in FIG. 7B, only the widgets in the remaining widget space(s) may be changed by scrolling. For example, following activation of the RHS icon 730A' and locking of the RHS widget 760 in the locked (first) widget space 606 in FIG. 7B, the operator scrolls to the left through the remaining widgets, which generates the display screen 600 shown in FIG. 7C. The speedometer widget 750, which was previously off the display screen 600 to the right, moves back into the second widget space 608. Because the RHS widget 760 is now locked into place in the first widget space 606, the CDM widget 740 moves off the display screen 600 to the left. In the widget position indicator 610, the first circle 610(1)' corresponding to the RHS widget 760 remains orange. The second circle 610(2), which now corresponds to the CDM widget 740 is open, as the CDM widget 740 has moved off the display screen 600, and the third circle 610(3), which now corresponds to the speedometer widget 750, is solid.

In some embodiments, activation of an icon may move the corresponding widget to a predefined widget space but does not lock the widget in place. For example, activation of the RHS icon 730A may cause the RHS widget 760 to move into a predefined widget space, e.g., the first widget space 606 as shown in FIG. 7B, but the operator may then scroll through the widgets as before, i.e., the RHS widget 760 may be moved off the screen (not shown) in response to an operator command to move the widget. Receipt of an operator command related to a vehicle operation may cause the corresponding widget to immediately move back to the predefined widget space. For example, if the operator has moved the RHS widget 760 off the display screen 600, receipt of a command to activate the traction motor to effect vehicle movement or receipt of a command to lift or lower the carriage assembly 144 (FIG. 1A) or actuation of the trigger switch (not shown) may cause the RHS widget 760 to move back to the first widget space 606. In other embodiments, receipt of an operator command related to a vehicle operation may cause a corresponding widget to move to a predefined widget space. For example, receipt of a command to lift or lower the carriage assembly 144 (FIG. 1A) or actuation of the trigger switch (not shown) may cause the RHS widget 760 to move into the first widget space, as shown in FIG. 7B.

In all embodiments, movement of the corresponding widget to a locked or a predefined widget space on the display screen 600 in response to a particular operator command may save time for the operator and help to increase productivity, as there is no need for the operator to manually search for the appropriate widget and/or move the widget back onto the display screen 600 if the operator has navigated away from the widget. Thus, the processing device 202 disclosed herein, as implemented, for example, in the display unit 151, provides a smart and flexible user interface that ensures that the operator receives the most relevant information at the correct time with the least operator input.

In additional embodiments, upon movement of a widget into a predetermined widget space (by scrolling, by activation of the corresponding icon, etc.), a message (not shown) related to the widget may optionally be displayed. If the predetermined widget space is, for example, the first widget space 606, the message may be temporarily superimposed over the second widget space 608 and may appear only when a predefined condition is met. For example, if a battery condition widget (not shown) is moved into the first widget space 606 and the battery charge is below a certain level, a message, e.g., "Low Battery," may appear to alert the operator that the battery may need to be changed soon. In addition, if the operator moves the speedometer widget 750 into the first widget space 606, a message, e.g., "Speed Too High," may appear if the operator is exceeding a speed limit.

In further embodiments, the control module 226, which is communicably coupled to one or more vehicle system modules via the vehicle network system 236 (FIG. 2B), may extract data related to a current vehicle state, as described herein, and use this data to alter a display of the widgets and/or icons on the display screen 600. For example, display unit 151 (FIG. 3) may be configured to have one or more "home" positions and/or "home" screens that each display one or more widgets that are relevant to a current vehicle state or a current task. These features help to ensure that the vehicle operator has ready access to the information that is most relevant to the current task without the need to search through all of the widgets available on the vehicle 100, which may help to increase operator productivity.

In some particular embodiments, the control module 226 extracts from a traction control module (not shown), directly or via a memory or current vehicle state lookup table, an indication as to whether the traction control is engaged. If the current operating state of the traction control module indicates that the traction controls are engaged, the control module 226 causes the display screen to "snap" back to a designated "home" position, such as the first two widgets in the array 500 (FIG. 5). In addition, when traveling, the display screen 600 may also automatically change to a "motion home screen" that shows relevant travel-related widgets, such as the speedometer widget 750.

In other particular embodiments, the control module 226 extracts from a hydraulic valve control module (not shown) an indication as to whether the forks 156A, 156B (FIG. 1A) are engaged in a lift operation on the vehicle 100. Where the current operating state indicates that the forks 156A, 156B are engaged in a lift operation, the control module 226 causes the display screen 600 to snap to a designated "lift" home position or "lift home screen" having relevant widgets, such as the CDM widget 740 and the RHS widget 760.

In yet further embodiments, the control module 226 may use the extracted data related to the current vehicle state to selectively disable operation of one or more portions of the display unit 151. The display screen 600 may continue to display the current state of one or more vehicle features, functions, or operations, but the touch layer may be fully or partially disabled such that the display screen 600 is unresponsive to touch gesture commands. The control module 226 may also optionally disable one or more of the control elements in the vehicle operator control section 310 (FIG. 3). These features may help to reduce operator distraction and increase operator productivity by ensuring that the vehicle operator remains focused on the current task.

In some particular embodiments, if the current operating state of the traction control module indicates that the traction controls are engaged, as described herein, the control module 226 may lock the display screen 600 so that the operator cannot scroll through other widgets or otherwise leave the home position.

In other particular embodiments, the control module 226 extracts a speed of the vehicle 100 based upon information received from the vehicle network bus, e.g., a vehicle network system 236 (FIG. 2B) and selectively disables one or more portions of the display unit 151. For example, all touch gesture commands may be disabled if the control module 226 determines that the vehicle speed is above a threshold speed. When the control module 226 determines that the speed of the vehicle 100 is below the threshold speed, the control module 226 may enable full operation of the display unit 151, e.g., one or more of the widgets displayed on the display screen 600 may be changed.

In yet further particular embodiments, the display of the icons and/or widgets on the display screen 600 may be customized based on static vehicle information, such as a vehicle type (e.g., forklift vs. stock picker), a vehicle model, etc., and/or one or more operator-based metrics, such as a current level of completion of a task (e.g., percentage of picks per shift), an operator skill or performance level, a level of correct vehicle operation or environmental behaviors, etc. For example, less skilled operators may benefit from the constant display of the icons and/or widgets corresponding to a steer wheel/travel direction 730B and a vehicle speed 750, while more skilled operators may wish to monitor different vehicle operations and systems. These features help to ensure that the display screen 600 presents each individual vehicle operator with the relevant and useful information.

With reference to FIGS. 7A-7I, several features of the widgets will be described in detail. Although reference is made to elements and features of particular icons and widgets, e.g., the RHS icon 730A, 730A' and the CDM and RHS widgets 740, 760, those of skill in the art will appreciate that the described elements and features are not limited to these particular icons and/or widgets. In addition, labeling of some elements in the Figures is omitted for clarity.

As shown in FIG. 7A, the CDM widget 740 may comprise a visual representation 744 corresponding to the forks (e.g., 156A, 156B in FIG. 1A), including a numerical indication 747 of a current position of the carriage assembly (144 in FIG. 1A), e.g., a current fork height ("4 in"), and a current sensed or detected load weight 748 ("0 lbs"). The current fork height may also be indicated by a position of a pointer 749 along a scale 742, which may comprise a plurality of tick marks (not separately labeled) corresponding to height increments from, for example, 0 inches to a maximum lift height for the vehicle 100. The CDM widget 740 may also comprise a fork tilt indicator 745 and a fork centering indicator 746. The fork tilt indicator 745 in FIG. 7A indicates that the forks are currently level, while the fork tilt indicator 745' in FIG. 7G indicates that the tips of the forks are tilted up. The fork tilt indicator 745 may similarly indicate that the tips of the forks are tilted down (not shown). The fork centering indicator 746 may indicate that the forks are positioned to the left or right of a centerline of the vehicle 100 (not shown).

Data related to the detected load weight and the current fork height, tilt, and/or centering may be obtained as described herein and provided to the CDM widget 740 for display. For example, the processor of the control module 226 is in communication with one or more vehicle control modules, sensors, etc. (e.g., 232), across the vehicle network system 236, via the monitoring I/O module 230, or a combination thereof (FIG. 2B). After extraction of the relevant information by the processor of the control module 226, the CDM widget 740 provides visual representations corresponding to each parameter.

As shown in FIG. 7B, the RHS feature of the vehicle 100 has been turned on or activated via the RHS icon 730A', as indicated by the underlining 735 and/or other visual indicator. The RHS icon 730A' may be activated using touch gesture commands, using one or more of the control elements 164A-164F in the vehicle operator control section 310 (FIG. 3), or using one or more of the physical control elements in the control panel 126 (FIG. 1B), such as the rotary control knob 162 (FIG. 1B) or a trigger switch (not shown) as described herein. For example, the operator may use the up, down, right, and left buttons 164A-164D to navigate to the RHS icon 730A (FIG. 7A) and pressing the enter button 164E to activate the RHS icon 730A' (FIG. 7B). The operator may similarly turn the rotary control knob 162 or 164F to the right or left to navigate to the RHS icon 730A and depress the rotary control knob 162, 164F to activate the RHS icon 730A'. When the control elements 164A-164F and/or the rotary control knob 162, 164F are used, the display screen 600 may include a focus area or focus state, such as an outline box or highlighted background (not shown), to visually indicate a current location of a cursor or a current selection, which assists the operator in navigating to the desired portion of the display screen 600. As noted above, after the RHS icon 730A' is activated, the RHS widget 760 is locked into a locked widget space, e.g., the first widget space 606 in FIG. 7B.

The RHS widget 760 may comprise a first menu portion 761, a sub-menu portion 762, and a pallet presence indicator 763, as shown in FIG. 7B. As described herein, the first menu portion 761 displays information related to an option selected from a first menu 764 (FIG. 7D), and the sub-menu portion 762 may be used to display and select additional options corresponding to the option selected in the first menu 764. In some embodiments, as shown in FIG. 7B, activation of the RHS icon 730A' allows the first menu portion 761 to be displayed. In one embodiment, after the RHS icon is activated, the first menu portion is displayed upon activation of the first menu portion by the operator, as noted below. This feature ensures that the operator receives the most relevant information at the correct time with the least operator input. It also prevents the first menu portion 761 from being inadvertently activated when the RHS function has not been activated via activation of the RHS icon.

The operator may access the first menu 764 by activating the first menu portion 761 using one or more touch gestures and/or the one or more control elements in the vehicle operator control section 310 (FIG. 3) or the control panel 126 (FIG. 1B). For example, the operator may activate the first menu portion 761 via a touch gesture, e.g., by touching or tapping within the area encompassed by the box with dashed lines around "Stacker Pallets" at the top of the RHS widget 760 in FIG. 7B, or by performing an equivalent function using one or more physical control elements. An arrow or other visual indication (not labeled) within the first menu portion 761, e.g., to the right of the text "Stacker Pallets," may indicate that additional options are available for selection, e.g., via the first menu 764.

Figure 7E:
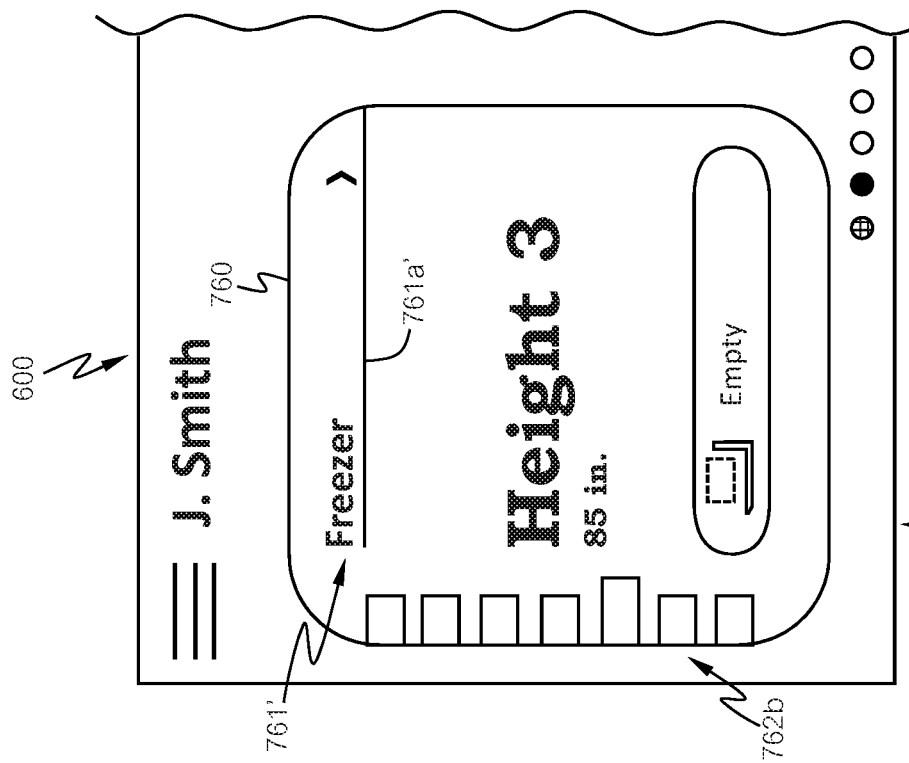
Figure 7D:
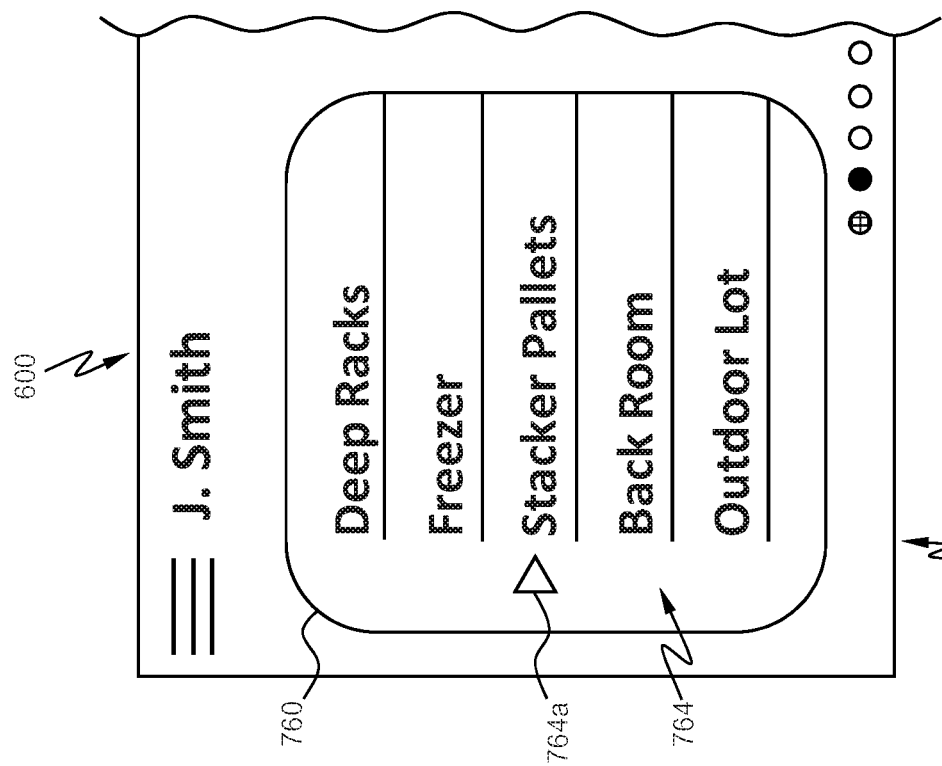

As shown in FIG. 7D, the display screen 600 then displays the first menu 764 comprising one or more options available for selection. The first menu 764 may be displayed in a variety of formats, such as a list, a sidebar (not shown), or a scroll wheel (not shown). An optional indicator 764a may appear adjacent to the currently selected option, e.g., "Stacker Pallets." In some embodiments, the first menu 764 may be displayed within the widget 760, as shown in FIG. 7D. In other embodiments, the first menu 764 may be displayed in a separate window that is temporarily superimposed over one or more of the widget spaces. For example, as shown in FIG. 7C, a window 770 may be displayed over a portion of the first widget space 606.

In some embodiments, the options contained in the first menu 764 (also referred to herein as a workspace zone menu) comprise a list of available workspace zones. As described herein, one or more workspace zones may be stored in a memory of the vehicle 100. Each zone may correspond to, for example, a particular work site, warehouse, room, or other workspace, or area or portion thereof. The zones may be customized by a vehicle owner or other end user based on the various zone(s) in which the vehicle 100 will be used. For example, the number of available zones may be customized, and each zone may be assigned a zone identifier, e.g., a name (e.g., "Stacker Pallets" in FIG. 7B), a number, a color, or other identifying feature or combination thereof, which is displayed in the first menu portion 761 (also referred to herein as a zone selection portion). In one particular embodiment, the operator may only activate the zone selection portion 761 if the RHS icon 730A' has been activated. In this embodiment, if the RHS icon 730A has not been activated, then touching a portion of the zone selection portion 761 does not result in display of the first menu 764.

In other embodiments (not shown), the options listed in the first menu 764 may comprise parameters or categories other than the zone. In one particular embodiment, the options may comprise a listing of racks designated by type, name, and/or number. For example, a first menu may comprise a listing of racks such as: Fixed Rack #1; Portable Rack #1; Fixed Rack #2; Portable Rack #2. Each rack will have corresponding programmed rack heights and may be independent of a zone or location of the rack. In another particular embodiment, the options may comprise a job type, e.g., pickup or put away.

With reference to the embodiment shown in FIG. 7D, the operator may select one of the options displayed in the workspace zone menu 764 or alter the display of the options using one or more touch gestures and/or one or more physical control elements in the vehicle operator control section 310 or the control panel 126 (FIG. 1B). For example, the operator may touch or tap the name of the desired workspace zone, e.g., "Freezer," on the display screen 600 to select the workspace zone. In some embodiments, the workspace zone menu 764 may comprise additional zones located above and/or below the currently displayed zones. By swiping or sliding a finger along the display screen 600 over the names of the zones or near the indicator 764a, the operator may scroll through the available zones. When the operator makes selections using one or more of the physical control elements, the display screen 600 may use the focus area or state (not shown) to visually indicate the current cursor location or current selection. For example, a background of the zone selection portion 761, such as the area encompassed by the box with dashed lines around the text "Stacker Pallets" in FIG. 7B, may become highlighted or shaded (not shown) to indicate that the zone selection portion 761 is the current selection. The focus state may also include, for example, an outline box around the current selection.

Following selection of the desired option in the workspace zone menu 764, the display screen 600 reverts back to a display of the RHS widget 760 with the new selected workspace zone. For example, if the operator selects "Freezer" in the workspace zone menu 764 shown in FIG. 7D, the display screen 600 changes to the display depicted in FIG. 7E, in which the zone selection portion 761' now displays the zone identifier corresponding to the selected "Freezer" zone.

Figure 7F:
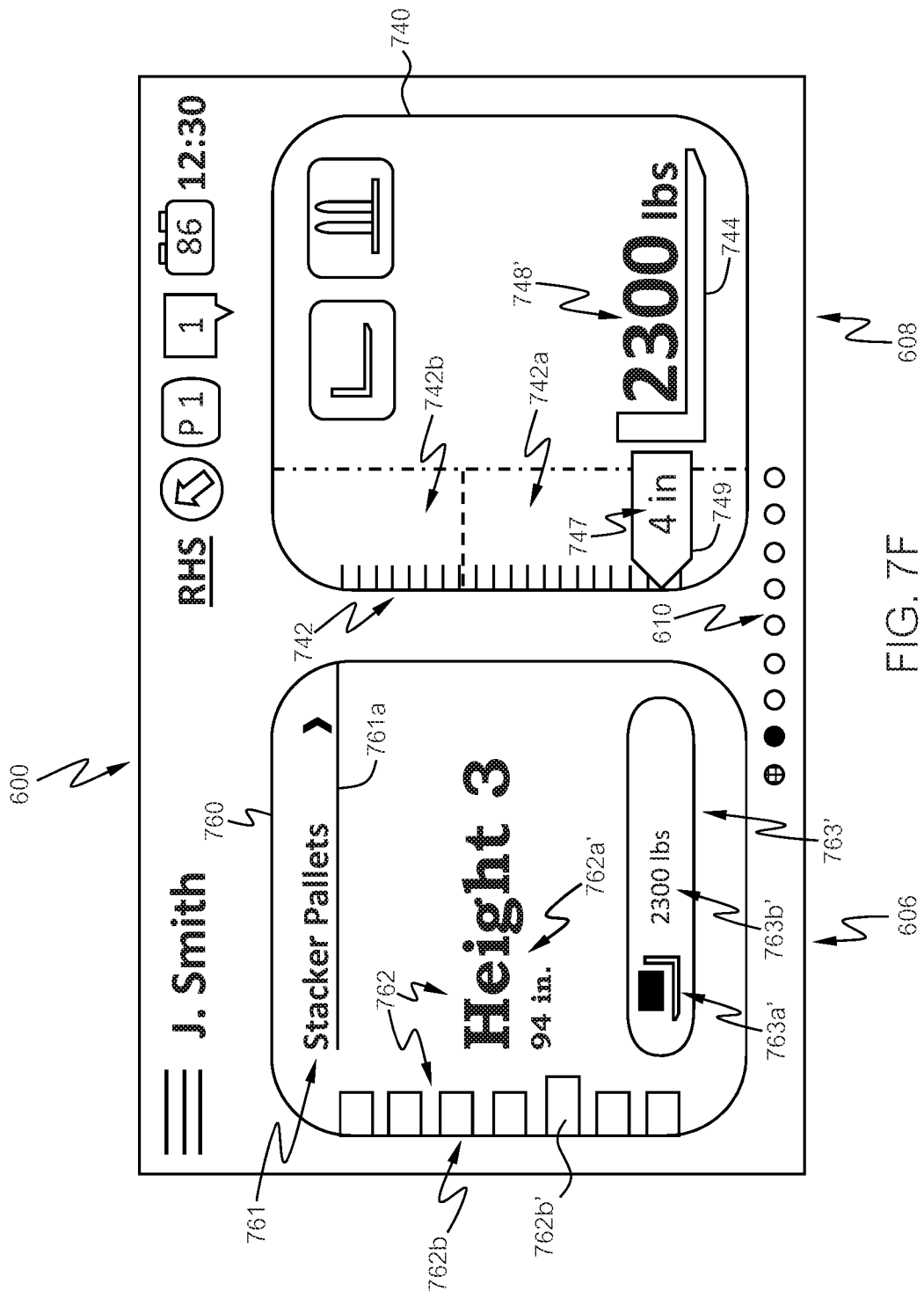
Figure 7G:
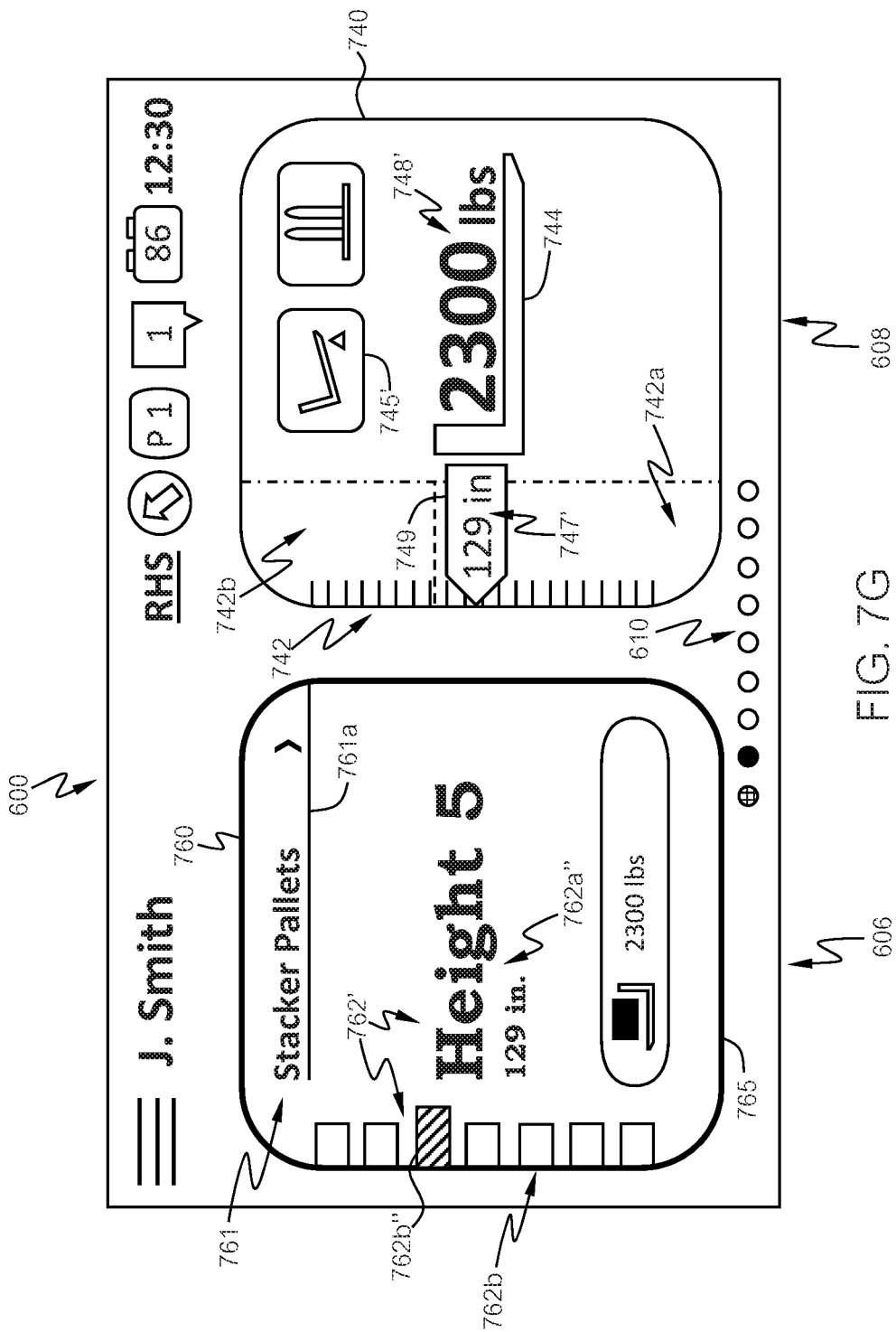
Figure 7I:
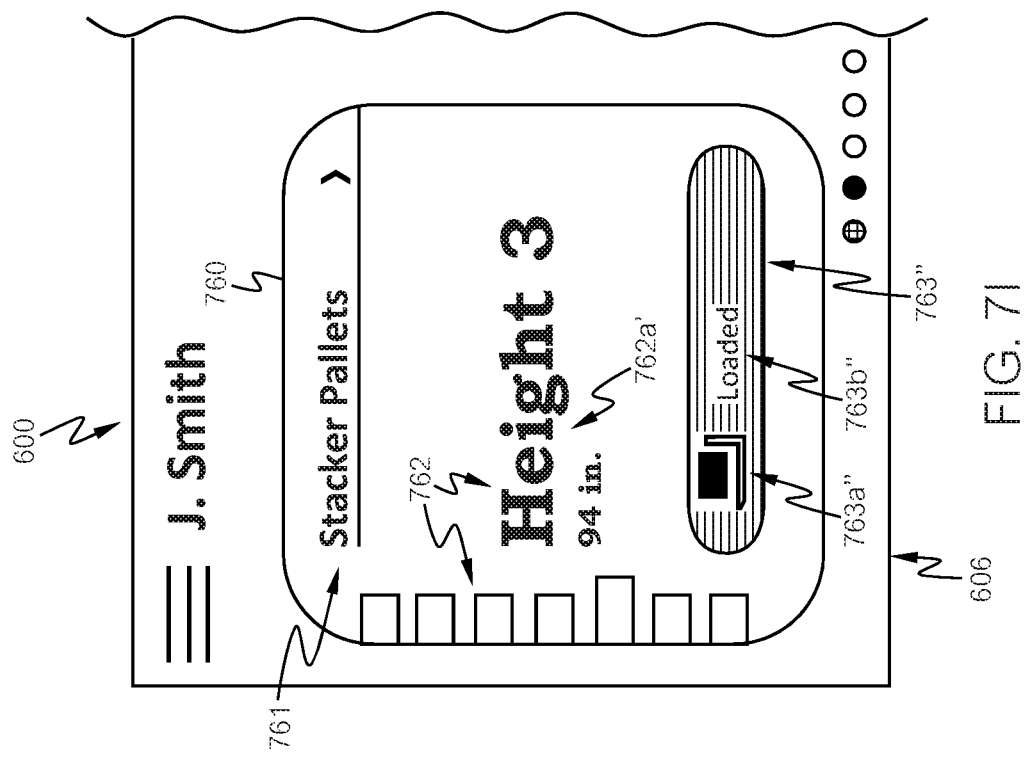
Figure 7H:
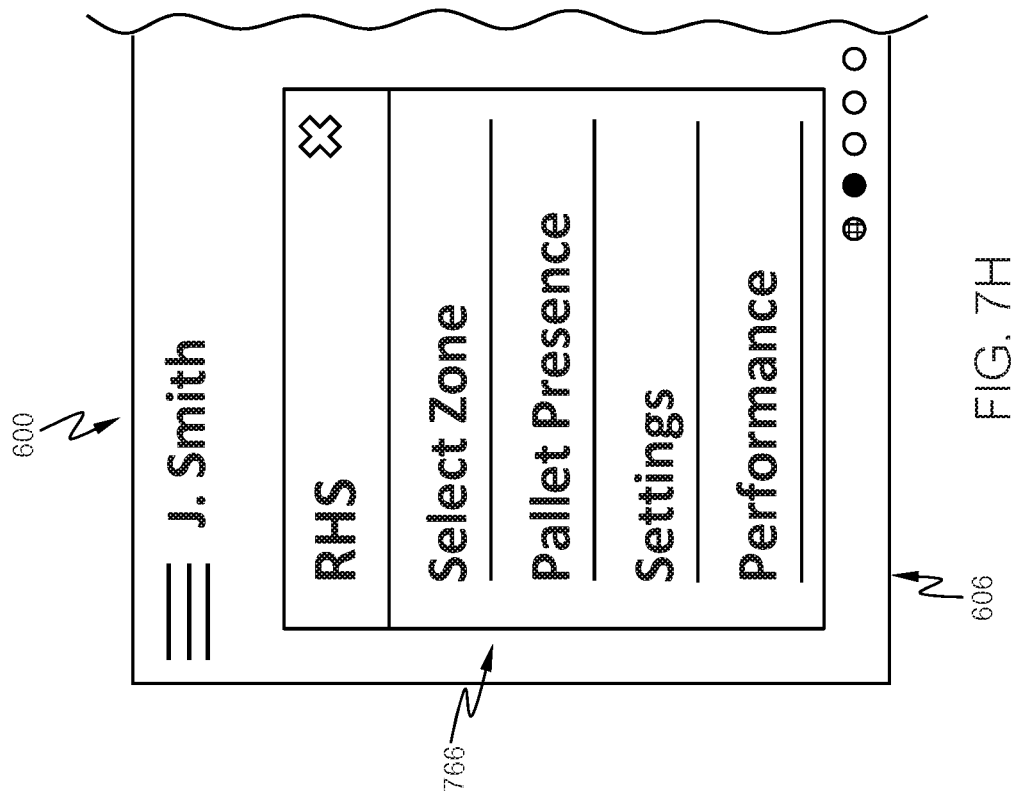

In addition, as shown in FIG. 7H, one or more functions of each widget may also be accessed via a general menu 766, which may be displayed after the operator touches or selects an appropriate portion of the widget (not shown). The general menu 766 may be displayed within the widget or within the same widget space (as shown) or over another portion of the display screen 600, such as over a portion of the second widget space 608 (not shown). The general menu 766 may comprise one or more options related to individual functions in a multi-function widget, e.g., "Select Zone" (accesses the first menu 764) and "Pallet Presence" (accesses the pallet presence indicator 763). In particular, the general menu 766 for the RHS widget 760 may be used to select the desired workspace zone when the operator is using, for example, one or more of the physical control elements in the vehicle operator control section 310 (FIG. 3) or the control panel 126 (FIG. 1B). The operator moves the focus area over the outer periphery of the RHS widget 760 shown in FIG. 7B and presses the enter button 164E or depresses the rotary control knob 162 or 164F to display the general menu 766. The operator selects the "Select Zone" option in the same manner, after which the display screen 600 lists the available zones in the first menu 764, as shown in FIG. 7D. The operator may then select the desired workspace zone as described.

With reference to FIG. 7B, the sub-menu portion 762 may be used to select and display additional options that correspond to the option selected in the first menu 764 (FIG. 7D). In some embodiments, the additional options may comprise a plurality of programmed rack heights, and the sub-menu portion 762 (also referred to herein as a rack height selection portion) may comprise one or more of a rack height identifier 762a and a sidebar 762b comprising a plurality of tabs. The rack height selection portion 762 may comprise, for example, the area encompassed by the box with dashed lines around the text "Height 3, 85 in." and the tabs in FIG. 7B. As described herein, one or more programmed rack heights may be stored in a memory of the vehicle 100 for each workspace zone or rack in the first menu 764. Each programmed rack height corresponds to a desired height of the carriage assembly 144 (FIG. 1A) and may be customized by the end user. For example, the number of available rack heights and height values may be customized.

The rack height identifier 762a may comprise information related to a currently displayed rack height, such as a name ("Height 3"), a number, a color, or other identifying feature or combination thereof. As shown in FIG. 7B, a numerical programmed rack height, e.g., "85 in.," may optionally be displayed in the rack height identifier 762a in addition to or in place of the name of the selected rack height. Each tab in the sidebar 762b corresponds to one programmed rack height. The sidebar 762b is defined by one or more tabs corresponding to one or more programmed rack heights in the workspace zone designated in the first menu portion 761, e.g., the "Stacker Pallets" zone as shown in FIGS. 7B and 7G. The additional options displayed in the rack height selection portion 762 are limited to those available for the particular option selected in the workspace zone menu 764. For example, when the "Stacker Pallets" zone is selected, the additional options available in the rack height selection portion 762 will comprise only the programmed rack heights for the "Stacker Pallets" zone.

When the first menu provides a listing of rack designations, the additional options available for selection in the sub-menu portion may comprise a plurality of programmed rack heights. Each rack designation in the first menu may have a corresponding set of one or more programmed rack heights in the sub-menu portion. For example, Fixed Rack #1 will have a first set of programmed rack heights and Fixed Rack #2 will have a second set of programmed rack heights, wherein the first and second sets may be different.

In some embodiments, the rack height selection portion 762 displays information related to the last rack height selected by the operator. In other embodiments, the rack height select portion 762 displays information related to a default rack height, e.g., a next higher or lower available rack height based on a current position of the fork carriage assembly 144 (FIG. 1A) and/or a previous direction of travel of the fork carriage assembly 144, both of which may be detected as described herein. In some embodiments, a visual appearance of a tab 762b' corresponding to the currently displayed rack height is altered to reflect its selection. For example, as shown in FIG. 7B, the tab 762b' is elongated with respect to the other tabs in the sidebar 762b.

In the illustrated embodiment, the operator may select a programmed rack height via the sidebar 762b using one or more touch gestures and/or one or more physical control elements in the vehicle operator control section 310 (FIG. 3) or the control panel 126 (FIG. 1B). In general, the RHS feature is not available until the RHS icon 730A is activated. When the RHS feature is off, the vehicle may be in "free" or "RHS-inactive" mode in which the operator may lower and lift the carriage assembly 144 (FIG. 1A) to any height upon continuous activation of a lifting or lowering operation, for example, via actuation of a corresponding fingertip lever 172 (FIG. 1B). Thus, when the RHS icon 730A is not activated, an operator may not activate the first menu portion 761, may not access the first menu 764 and may not select a programmed rack height via the sidebar 762b. Following activation of the RHS icon 730A and selection of a rack height using any of the methods described herein, continuous activation of a lifting or lowering operation will cause the carriage assembly 144 to raise or lower to, and automatically stop at, a selected rack height.

In one embodiment, the operator may select the desired rack height using one or more touch gestures. For example, the operator may scroll through the tabs in the sidebar 762b, such that when each tab is touched, information regarding that tab's corresponding rack height is displayed in the rack height identifier 762a. Thus, an operator may touch a tab in the sidebar 762b corresponding to the desired rack height or swipe a finger along the tabs and select the tab corresponding to the desired rack height. Releasing touch of a selected tab in the sidebar 762B causes the corresponding programmed rack height to be selected. As shown in FIG. 7G, the operator has selected the fifth programmed rack height, which is reflected in the sidebar 762b by elongated fifth tab 762b" corresponding to the fifth programmed rack height. Upon selection of the tab 762b" corresponding to the desired rack height, one or more additional characteristic(s) related to the visual appearance of the tab 762b' may be altered. For example, a background color or pattern of the tab 762b" may change, as shown in FIG. 7G. After the desired programmed height is selected, the carriage assembly 144 will lift or lower to the selected rack height upon continuous activation of a lifting or lowering operation via actuation of a corresponding fingertip lever 172 (FIG. 1B) or use of the multi-function control handle (not shown) by the operator.

In other embodiments, the rack height identifier 762a may comprise a scroll wheel that allows the operator to scroll through the available programmed rack heights by swiping or sliding his finger up or down along the text displayed in the rack height identifier 762a. The scroll wheel may wrap around and repeat when the operator reaches the last option at the top or bottom of the list. The scroll wheel defines a sub-menu providing a listing of programmed rack heights corresponding to the workspace zone designated in the first menu portion 761, which, in FIG. 7B, is the "Stacker Pallets" zone. In one embodiment, only a single programmed rack height is visible at any given time in the rack height identifier scroll wheel. In other embodiments, two or more programmed rack heights are visible in the rack height identifier scroll wheel (not shown).

In further embodiments, the operator may use one or more physical control elements located in the vehicle operator control section 310 (FIG. 3) to accomplish the same functions. For example, the operator may use the right or left direction buttons 164B, 164C to navigate to the sidebar 762b and may use the up or down direction buttons 164A, 164D to navigate through the tabs. The operator may press the enter button 164E to select one of the tabs.

In yet further embodiments, the operator may use one or more physical control elements located in the control panel 126 (FIG. 1B) to select a rack height. For example, with "Height 2" displayed in the rack height identifier 762a, and the second tab elongated, the operator may actuate a trigger switch (not shown) provided on the control panel 126 once to select the third tab 762b', after which a visual appearance of the tab 762b' changes to reflect its selection (shown in FIG. 7B as being elongated). The operator may toggle to "Height 4" (not shown) by actuating the trigger a second time, "Height 5" (see FIG. 7G) by actuating the trigger a third time, etc. Upon each actuation of the trigger switch, the rack height identifier 762a displays the next available rack height and that rack height comprises a selected rack height unless the trigger switch is actuated again, and the visual appearance of the corresponding tab 762b' is changed to reflect its selection. To select a programmed rack height that is below the currently displayed height, e.g., "Height 2" (not shown), the operator actuates the trigger until the top of the list of programmed rack heights is reached, after which the list wraps around and the operator may begin toggling up the list from the lowest programmed rack height until the desired height is reached. After the desired programmed height is selected, the carriage assembly 144 will lift or lower to the selected rack height upon continuous activation of a lifting or lowering operation by the operator.

In yet further embodiments, a trigger switch is provided on a multifunction control handle and when the RHS icon 730A is activated but no programmed height is selected, the display screen 600 may display the RHS widget 760. During lifting or lowering of the carriage assembly 144 via the multifunction control handle, the height shown on the display screen will automatically change to a next available programmed rack height. As the carriage assembly 144 is moving, the operator may select the next available programmed rack height, and the carriage assembly 144 will stop at the selected rack height. For example, following activation of the RHS icon 730A' and selection of the "Stacker Pallets" zone, the operator begins a lifting operation without first choosing a programmed rack height. During the continuous lifting operation and while the carriage assembly 144 is between racks, the operator actuates the trigger switch (not shown) when the operator wishes for the carriage assembly 144 to stop at the next available programmed rack height, and the carriage assembly 144 will stop at that next available programmed rack height, e.g., the fifth programmed height in FIG. 7G.

In all embodiments, a visual appearance of one or more portions of the visual depiction of the first menu 764, the first menu portion 761 and the options contained therein, and/or the sub-menu portion 762 (including one or more of the rack height identifier 762a and the sidebar 762b) may be altered to indicate selection of a particular option, e.g., a workspace zone, and/or a particular additional option, e.g., a rack height. In some embodiments, each option within the first menu 764 may be color-coded with a different color, and one or more of the items displayed in the first menu portion 761 and/or the sub-menu menu portion 762 may comprise a same color associated with the corresponding option in the first menu 764.

For example, as shown in FIGS. 7B and 7E, a color of the zone selection portion 761, e.g., a line 761a, 761a' beneath the zone identifier and the arrow (not labeled) to the right of the text in the zone selection portion, may correspond to a color assigned to the currently selected workspace zone. One or more additional characteristics of the zone selection portion 761, e.g., the text of the zone identifier, a background area, etc. (not shown), may also be color-coded. Each zone may be associated with a different color to allow the operator to quickly and easily identify and select the desired workspace zone. These assigned colors may also be reflected in the visual appearance of the options, e.g., the names of the zones, the lines beneath each zone (not labeled), etc., contained in the workspace zone menu 764 (FIG. 7D). In addition, a color of one or more portions of the visual depiction of the rack height selection portion 762, including the rack height identifier 762a and/or the sidebar 762b, may correspond to a color assigned to the selected zone. For example, the color of the text displayed in the rack height identifier 762, 762a' and the color of the elongated tab 762b' may correspond to the assigned color of the selected zone.

In some embodiments, the visual appearance of one or more portions of the CDM widget 750 and/or the RHS widget 760 may also change to indicate that the carriage assembly 144 (FIG. 1A) has arrived at the selected rack height. For example, one or more of a color, a thickness, etc. of an outline 765 (FIG. 7G) of the RHS widget 760 may change to provide a visual confirmation to the operator that the carriage assembly 144 has reached the desired/selected programmed rack height. In FIG. 7G, outline 765 is shown darker and having an increased thickness or width to indicate to the operator that the carriage assembly 144 has reached the selected height of 129 inches, Height 5. In other embodiments, an audible tone may sound as the carriage assembly 144 passes each programmed rack height, and an audible tone or message may sound to indicate that the carriage assembly 144 has arrived at the selected rack height. These features provide confirmation to the operator that the selected function has been successfully executed and that the vehicle 100 is ready for the next operation, e.g., the carriage assembly 144 is at the expected position. In addition to the audible confirmation, the change in the outline 765 of the RHS widget 760 provides a confirmation that may be observed with a quick glance, which reduces operator distraction and provides enhanced usability.

In addition, in some embodiments, a display of a portion of the CDM widget 740 and/or the RHS widget 760 may change in real time as the carriage assembly 144 raises or lowers. Movement of the carriage assembly 144 may be indicated by a corresponding upward or downward movement of the forks 744 and the pointer 749 along the scale 742 and by a corresponding increase or decrease in the numerical indication 747 of the rack height in the CDM widget 740. In addition, if a programmed rack height has not been selected by a user prior to movement of the carriage assembly 144, the information displayed in the rack height selection portion 762 may change as the forks approach each programmed rack height. With reference to FIG. 7G, following selection of "Height 5" the operator activates a continuous lifting operation causing the carriage assembly 144 to raise upwardly toward the corresponding programmed rack height of 129 inches. This movement of the carriage assembly 144 may be indicated, in real time with the actual movement of the carriage assembly 144, by an upward movement of the forks 744 and the pointer 749 along the scale 742 in the CDM widget 740 to a new position corresponding to the programmed height of "129 in." and by the updated numerical indication 747' of the rack height, as shown in FIG. 7G. In the case where a programmed rack height is not selected prior to movement of the carriage assembly 144, but instead, will be selected via a trigger switch on a multifunction control handle during movement of the carriage assembly 144, the name of the rack height (e.g., "Height 3," "Height 4," etc.) and the numerical rack height (e.g., "94 in.," "109 in.," etc.) displayed in the rack height identifier 762a may change as the carriage assembly 144 approaches each programmed rack height. The location of the elongated tab 762b', 762b" may also change as the carriage assembly approaches each programmed rack height.

The real-time display feature may be particularly helpful in embodiments in which the operator selects a programmed rack height during a lifting or lowering operation. For example, during lifting and lowering operations, the information displayed in the rack height selection portion 762 of the RHS widget 760 indicates the next available programmed rack height so that the operator may, for example, actuate the trigger switch (not shown) to select the upcoming programmed rack height. The operator may also use the location of the forks 744 along the scale 742 and the numerical indication 747 shown in the CDM widget 740 to gauge the current position of the carriage assembly 144 and the proximity to the next programmed rack height.

As illustrated herein, the rack height selection feature may be used in conjunction with the zone selection feature, but those of skill in the art will appreciate that the two features may be used independently. Combined use of the two features helps to eliminate confusion between similar, but slightly different, programmed rack heights that may exist in different workspace zones. For example, different zones in a large warehouse may comprise rack heights that are only inches apart. In the absence of zones, it may be difficult for the operator to easily determine whether the forks have been raised to the correct height. Combined use of the two features also reduces the number of programmed rack heights through which the operator must search. For example, a vehicle 100 that is used in several locations may store a large number of programmed rack heights. Without zones, the operator must search through all of the available rack heights, which adds time and difficulty to the selection process and decreases operator productivity, particularly in environments required gloved operation. For embodiments where a trigger switch is provided and used, having corresponding programmed heights defined for separate workspace zones makes use of the trigger switch during a lifting operation more usable as the operator is presented only with corresponding programmed heights in the selected workspace zone in which the operator is working.

The pallet presence indicator 763 will now be described in more detail. As shown in FIG. 7B, the pallet presence indicator 763 comprises a load presence indicator 763a and a load weight indicator 763b and provides a visual indication of a presence or an absence of a detected load on, for example, the forks 156A (FIG. 1A). The pallet presence indicator 763 may be displayed within the RHS widget 760, as shown in FIG. 7B. Alternatively, the pallet presence indicator 763 may be implemented as a separate widget and/or icon (not shown). One or more sensors 232 (FIG. 2B), such as a pressure transducer in a hydraulic cylinder (not shown) of the load handling assembly 140 (FIG. 1A), may sense a weight of a load 116 on the forks 156A. The control module 226 extracts from the monitoring input/output (I/O) module 230 (FIG. 2B) information received from the sensor(s) and provides this information for display on the display screen 600 via the pallet presence indicator 763.

As shown in FIG. 7B, when no load is detected, the load presence indicator 763a contains a dashed outline of a box, and the load weight indicator 763b displays a notification, such as displaying the text "Empty." In addition, when no load is detected, the current detected load weight 748 in the CDM widget 740 may also display "0 lbs."

In FIGS. 7F and 7G, a load of 2,300 pounds is detected, as reflected in the pallet presence indicator 763'. The load presence indicator 763a' comprises a solid box and the load weight indicator 763b' comprises a display of "2300" to reflect the presence of a detected load weighing 2,300 pounds. The current load weight 748' in the CDM widget 740 has also been changed to display "2300 lbs." Also as shown in FIGS. 7F and 7G, the RHS feature may be used in conjunction with a load offset feature. For example, upon detection of a load on the forks, the load offset feature causes the fork carriage to stop at a slightly higher point (as compared to unloaded forks). This height difference may be reflected in the programmed height displayed in the rack height identifier 762. For example, the numerical programmed rack height displayed in the rack height identifier 762a for "Height 3" is increased from "85 in." in FIG. 7B (no load) to "94 in." in the rack height identifier 762a' in FIG. 7F (a detected load of 2,300 pounds) to reflect the increased height needed to ensure that the load, e.g., a pallet, and the loaded forks will clear the rack. In addition, a numerical programmed rack height for "Height 5" may be "120 in." for unloaded forks (not shown), but because a 2,300 pound load is detected, the rack height identifier 762a" displays a programmed rack height of "129 in.," as shown in FIG. 7G.

However, some loads (typically <500 pounds) may be too light for automatic detection by the one or more pressure sensors, causing the control module 226 (FIG. 2B) to incorrectly indicate the absence of a detected load. As discussed herein, when the load is not properly sensed, the programmed rack height is not adjusted to accommodate the loaded forks, and one or more of the vehicle's features may not function properly. In these situations, the pallet presence indicator 763 comprises an override function that permits the operator to manually indicate the presence of a load by activating a portion of the pallet presence indicator 763. For example, when the operator knows that a load 116 is present on the forks 156A (FIG. 1A) but the pallet present indicator 763 incorrectly indicates the absence of a load (FIG. 7B), the operator may activate the override function by touching, tapping, clicking, or otherwise activating the pallet presence indicator 763. In some embodiments, a portion of the display screen 600 corresponding to the pallet presence indicator 763, e.g., an area enclosed by the oval shape, may comprise a touch-sensitive region or "button."

As shown in FIG. 7I, the override function has been activated by the operator, for example, by touching and releasing the area on the screen defining or otherwise activating the pallet presence indicator 763 in FIG. 7B. One or more characteristics of the pallet presence indicator 763" may change to reflect activation of the override function. For example, a background color and/or pattern within the pallet presence indicator may change, as shown in FIG. 7I. In addition, the load presence indicator 763a" comprises a solid box and the load weight indicator 763b" displays a notification, such as "Loaded," to reflect that the override function has been activated. The programmed rack height displayed in the rack height identifier 762a' is also updated to 94 in. to ensure that the loaded forks clear the rack. In some embodiments, the pallet presence indicator 763" will reset to "Empty" (FIG. 7B) when the fork carriage reaches the programmed rack height, unless a load is sensed. When a load is sensed, (e.g., as shown in FIGS. 7F and 7G), the override function may be disabled, and the pallet presence indicator 763" will reset to "Empty" (FIG. 7B) only when no weight is detected.

With reference to FIGS. 7F and 7G, several additional features of the CDM widget 740 will be described in detail. In addition to providing information about the detected load weight and current fork height, tilt, and centering, the CDM widget 740 may also provide a visual indicator of a maximum lift height based on a detected load. When a load 116 is present on the forks 156A, 156B (FIG. 1A), the vehicle 100 typically has a maximum lift height to which the carriage assembly 144 (FIG. 1A) should be raised for the weight of that particular load. The control module 226 (FIG. 2B) may determine a maximum lift height for the load based on a variety of parameters, such as the maximum lift height of the vehicle, a maximum lift weight capability of the vehicle, a current fork tilt, etc. A portion of the scale 742, e.g., areas 742a, 742b, as shown with dashed lines, may be color-coded to provide a visual indication of lift restrictions.

When no load is detected or the detected load requires no lift height restrictions, both areas 742a, 742b of the scale 742 may comprise a uniform, default color, e.g., green (not shown), to provide a highly visible indication to the operator that all lift heights are within the lift capacity of the vehicle 100. In some embodiments, the CDM widget 740 may comprise an indicator (not shown) representing a percentage of capacity, e.g., an indication that the carriage assembly 144 has been raised to 80% of the determined maximum lift height.

Upon detection of a load requiring a lift height restriction, the control module 226 (FIG. 2B) may change a color of one or more portions of the CDM widget 740, in which the color(s) provide the operator with a visual indicator of the maximum lift height for that load. For example, as shown in FIGS. 7F and 7G, a load of 2,300 pounds is detected, which, in the illustrated embodiment, requires a lift height restriction. A portion, e.g., area 742a, of the scale 742 may remain, for example, green, to indicate that lift heights within this area are within the lift capacity of the vehicle 100. Another portion, e.g., area 742b, of the scale 742 may be changed to another color, such as yellow or red (not shown), to provide a highly visible indication to the operator that lift heights within area 742b of the scale 742 exceed the lift capacity of the vehicle 100. In some embodiments (not shown), a color of one or more portions of the visual representation corresponding to the forks 744 and/or the pointer 749 may also change based on whether the forks 156A are at a lift height that is within the lift capacity of the vehicle 100 or that has exceeded the lift capacity of the vehicle 100. In other embodiments, the control module 226 (FIG. 2B) may limit or restrict operation of the vehicle 100, e.g., vehicle speed and acceleration, etc. In further embodiments, a numerical indication of the maximum lift height (not shown) may be placed on the scale 742, e.g., at the junction between areas 742a, 742b.

When the detected load weight exceeds a maximum lift capacity of the vehicle 100, the entire scale 742, including areas 742a and 742b, may comprise a different uniform color, e.g., red (not shown), to provide a highly visible indication to the operator that the current load should not be lifted to any height. In this situation, the control module 226 may allow very limited movement of the vehicle 100, e.g., operation at a speed below a certain threshold or over a predetermined distance, and may optionally completely disable operation of the vehicle 100. In some embodiments, a color-coded message (not shown) may be displayed on the display screen 600 to notify or warn the operator that, for example, a determined maximum lift height for the detected load has been exceeded, the detected load exceeds a determined maximum lift capacity of the vehicle, and/or that the forks 156A (FIG. 1A) are nearing the determined maximum lift height. In other embodiments, the control module 226 may trigger one or more audible and/or visual warnings, such as a spoken warning, audible tones, flashing lights on the display screen 600 or the vehicle 100, etc., upon detection of one or more of the above conditions. In all embodiments, when lift height restrictions exist, an audible tone or message may sound when the carriage assembly 144 approaches a maximum height and/or when the height of the carriage assembly 144 exceeds the maximum height.

FIGS. 8-11 are flowcharts illustrating computer-implemented processes to define and control display of one or more items on a screen display of a display and processing device, e.g., the display and processing unit 151. The computer-implemented processes can be carried out using, for example, computer-readable hardware (e.g., computer-readable hardware memory, computer readable storage media, etc.) comprising computer instructions (e.g., in the form of program code) that instruct a processor to implement the described computer-implemented process. For example, the processes illustrated in FIGS. 8-11 can be carried out by the control module 226 (FIG. 2B). In this regard, the flowcharts depicted in FIGS. 8-11 each outline an algorithm that is executed by the processor.

Figure 8:
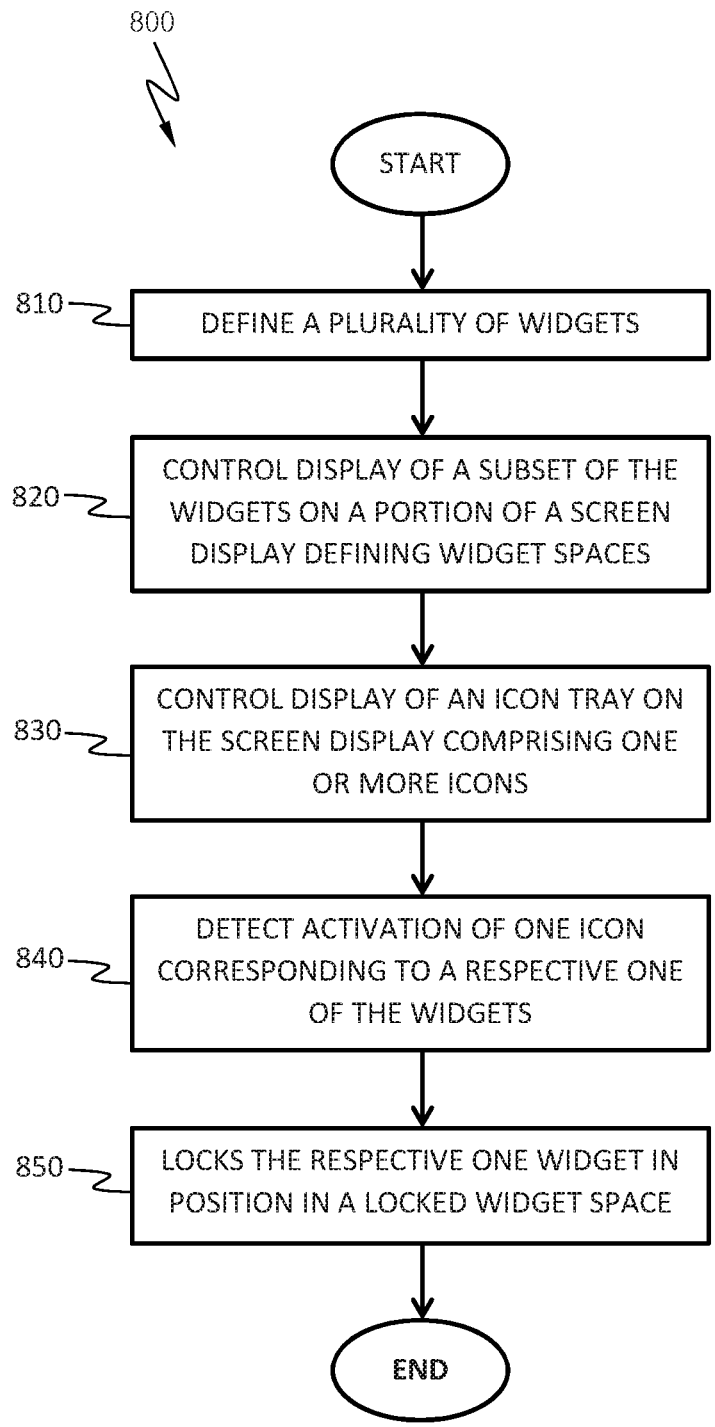
FIGS. 8-11 are flowcharts of exemplary computer-implemented processes for defining and controlling display of one or more items on a display screen of a display and processing device, in accordance with principles of the present disclosure.

FIG. 8 is a flowchart illustrating a computer-implemented process 800 to define and control display of a plurality of items, e.g., widgets, on a screen display. The process begins at Step 810 in which the processor defines a plurality of widgets via execution of an application program corresponding to each widget. Each widget comprises a visual representation of a current state of an associated function of an industrial vehicle. In Step 820, the processor controls display of a subset of the plurality of widgets on a portion of the screen display defining a plurality of widget spaces, and at Step 830, the processor controls display of an icon tray on the screen display comprising one or more icons, wherein each of the one or more icons may be defined via execution of a corresponding application program. At least one of the icons corresponds to a respective one of the plurality of widgets. As shown in FIG. 8, the process may continue to Step 840 in which the processor detects activation of the one icon corresponding to the one widget, and in response to detecting the activation of the one icon, locks the respective one widget in position in a locked widget space in Step 850.

Figure 9:
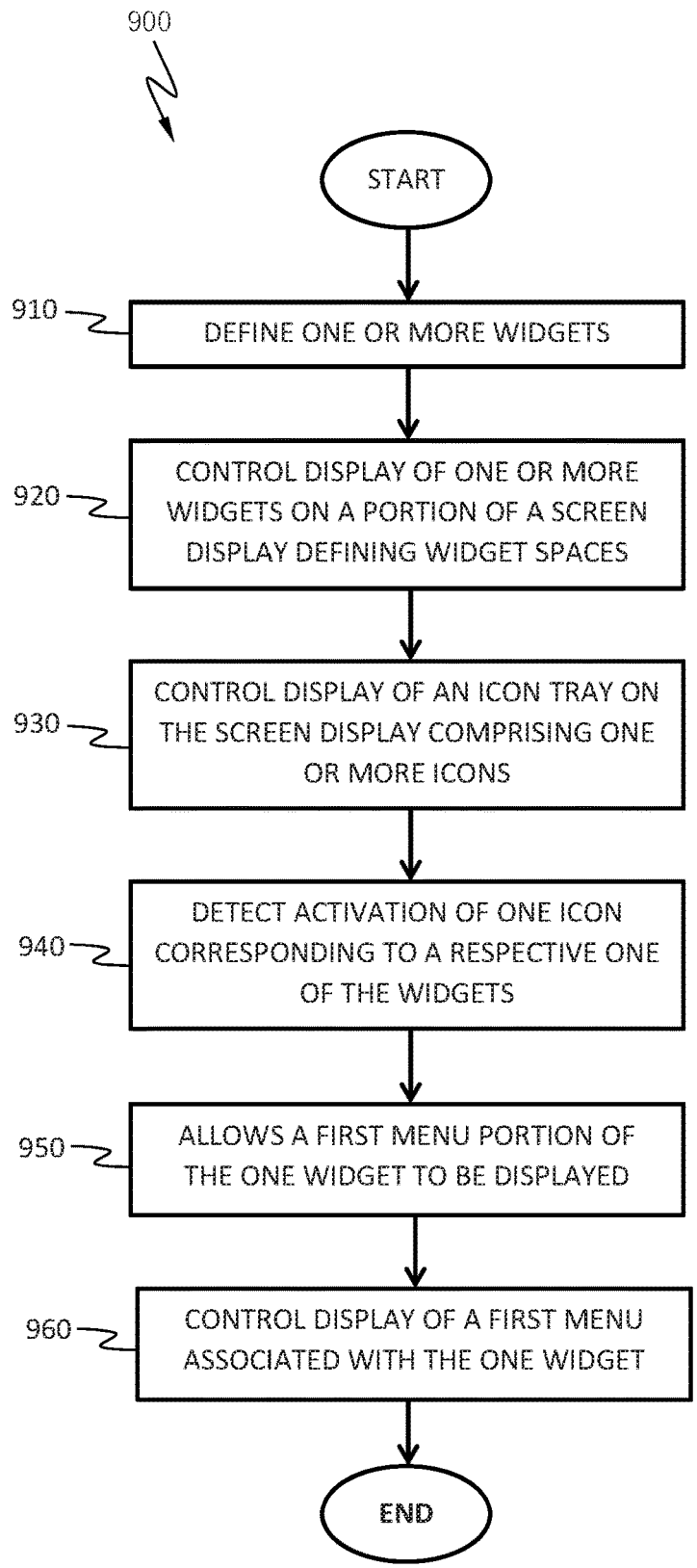

FIG. 9 is a flowchart illustrating a computer-implemented process 900 to define and control display of one or more items, e.g., widgets, on a screen display. The process begins at Step 910 in which the processor defines one or more widgets. Each widget comprises a visual representation of a current state of an associated function of an industrial vehicle. At Step 920, the processor controls display of at least one of the one or more widgets on a portion of the screen display defining one or more widget spaces, and at Step 930, the processor controls display of an icon tray on the screen display comprising one or more icons. At least one of the icons corresponds to a respective one of the one or more widgets. The processor detects activation of the one icon corresponding to the one widget at Step 940, and in response to detecting the activation of the one icon, allows a first menu portion of the one widget to be displayed in Step 950. At Step 960, the processor controls display of a first menu associated with the one widget.

Figure 10:
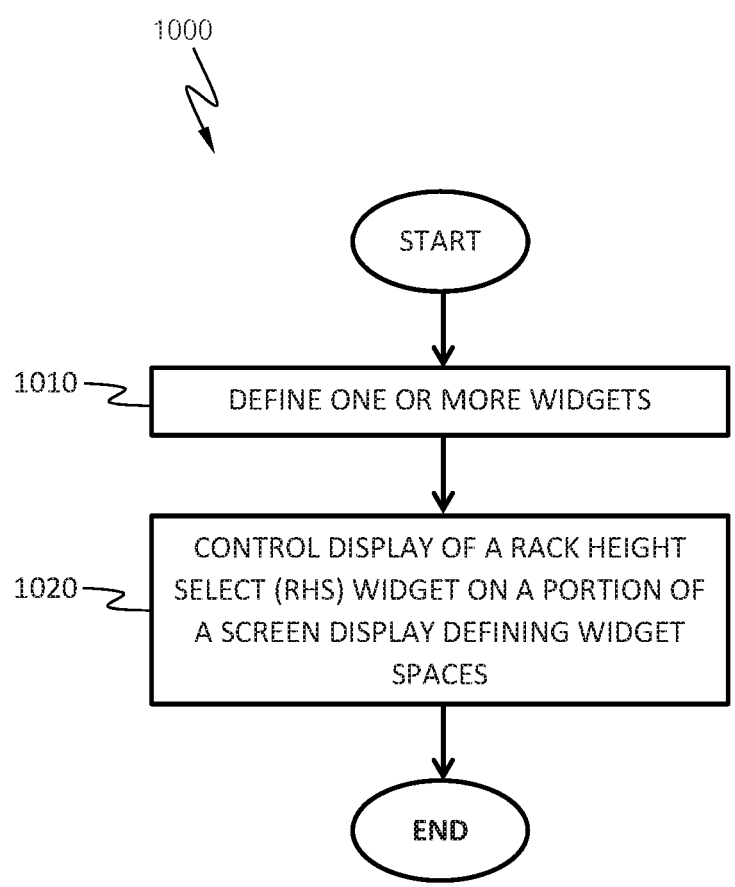

FIG. 10 is a flowchart illustrating a computer-implemented process 1000 to define and control display of one or more items on a screen display. The process begins at Step 1010 in which the processor defines one or more widgets. Each widget comprises a visual representation of a current state of an associated function of an industrial vehicle. At Step 1020, the processor controls display of a rack height select (RHS) widget on a portion of the screen display defining one or more widget spaces. The RHS widget comprises a portion, e.g., an outline, that changes state upon a related vehicle function being completed, e.g., a carriage assembly of the industrial vehicle reaching a desired height.

Figure 11:
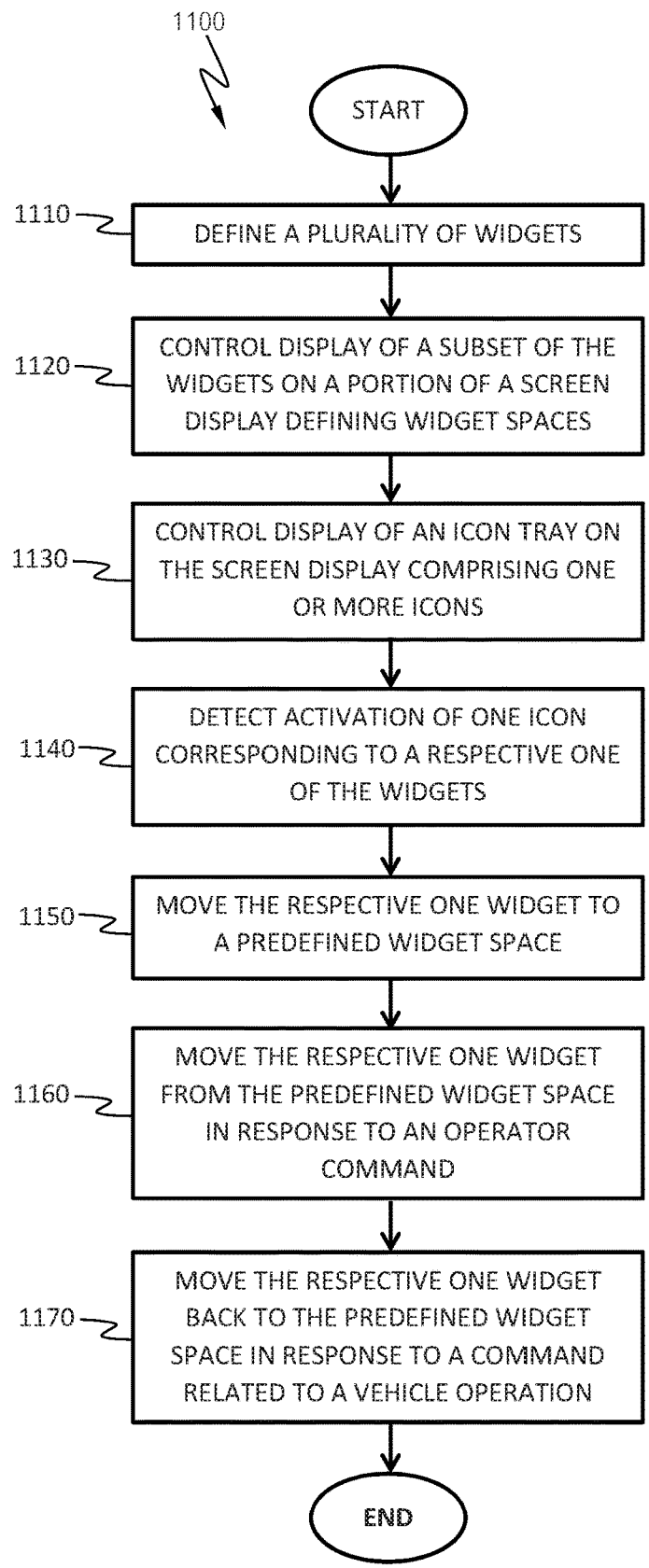

FIG. 11 is a flowchart illustrating a computer-implemented process 1100 to define and control display of a plurality of items on a screen display. The process begins at Step 1110 in which the processor defines a plurality of widgets. Each widget comprises a visual representation of a current state of an associated function of an industrial vehicle. At Step 1120, the processor controls display of a subset of the plurality of widgets on a portion of the screen display defining a plurality of widget spaces, and at Step 1130, the processor controls display of an icon tray on the screen display comprising one or more icons. At least one of the icons corresponds to a respective one of the plurality of widgets. The processor detects activation of the one icon corresponding to the one widget at Step 1140, and in response to detecting the activation of the one icon, moves the respective one widget to a predefined widget space in Step 1150. At Step 1160, the processor moves the respective one widget from the predefined widget space in response to an operator command to move the widget away from the predefined widget space, and at Step 1170, the processor moves the one widget back to the predefined widget space in response to a command related to a vehicle operation.

In addition to, or in place of, the use of one or more touch gestures or physical control elements in the vehicle operator control section 310 (FIG. 3) or the control panel 126 (FIG. 1B), the operator may make one or more selections using a voice control system (not shown), examples of which are described more fully in U.S. Pat. No. 7,017,689, the entirety of which is hereby incorporated by reference herein. The operator may be equipped with a headset (not shown), and/or the display unit 151 or a portion of the control panel 126 may comprise a microphone (not shown). The voice control system is programmed to receive and recognize one or more predetermined verbal commands from the operator. The vehicle control system then translates each verbal command into a signal for processing by, for example, the control module 226 and/or one or more control modules or controllers 238 (FIG. 2B), which transmits an appropriate output command to control operation of the display unit 151 (FIG. 3) and/or the vehicle 100.

For example, receipt of the verbal command ACTIVATE RHS ICON or ACTIVATE RHS WIDGET may activate the RHS icon 730A and move the RHS widget 760 (FIG. 7B) to a predefined widget space in a manner similar to the movement of the RHS widget 760 upon activation of the RHS icon 730A using one or more touch gestures or physical control elements, as described herein. Receipt of the verbal commands SELECT ZONE or SELECT RACK HEIGHT may activate or cause the display of the zone selection portion 761 or the rack height selection portion 762, respectively, of the RHS widget 760 in a manner similar to the activation or display following the use of one or more touch gestures or physical control elements, as described herein.

Referring now to FIG. 12, a schematic block diagram illustrates an exemplary computer system 800 for implementing the control module 226 of FIG. 2B. The exemplary computer system 800 comprises one or more (hardware) microprocessors 810 and corresponding (hardware) memory 820 (e.g., random access memory and/or read only memory) that are connected to a system bus 830. Information may be passed between the system bus 830 and an optional data bus 850 by a suitable bridge 840. The data bus 850 is used to interface peripherals with the one or more microprocessors 810, such as storage 860 (e.g., solid state hard disk drive); removable media storage device(s) 870 (e.g., flash drives, etc.); I/O devices 880 (e.g., the graphical user interface module of the service module 220 of FIG. 2B, a universal serial bus (USB) interface, etc.); and one or more adapters 890. The adapters 890, where provided, allow the microprocessor 810 to communicate across one or more of the vehicle network systems (e.g., 236 of FIG. 2B). In this regard, example adapters 890 may comprise Bluetooth®, Ethernet, CAN bus, RS422, LIN Bus, WiFi, cellular, etc.

This list of peripherals is presented by way of illustration, and is not intended to be limiting. Other peripheral devices may be suitably integrated into the computer system 800. The memory 820, storage 860, removable media insertable into the removable media storage 870, or combinations thereof may be used to implement the methods, configurations, interfaces and other aspects set out and described herein.

The microprocessor(s) 810 control operation of the exemplary computer system 800. Moreover, one or more of the microprocessor(s) 810 execute computer readable code that instructs the microprocessor(s) 810 to implement the methods and processes herein. The computer readable code may be stored for instance, in the memory 820, storage 860, removable media storage device(s) 870, or other suitable tangible storage medium accessible by the microprocessor(s) 810. The memory 820 may also function as a working memory, e.g., to store data, an operating system, etc.

The methods and processes herein may be implemented as a machine-executable method executed on a computer system, e.g., one or more general or particular computing devices such as the processing devices 202 of FIGS. 2A and 2B, on a system 800 of FIG. 12, or combinations thereof. In this regard, the methods and processes herein may be implemented on a computer-readable storage device (e.g., computer-readable storage hardware) that stores machine-executable program code, where the program code instructs a processor to implement the described method/process. The methods and processes herein may also be executed by a processor coupled to memory, where the processor is programmed by program code stored in the memory, to perform the described method.

Computer program code for carrying out operations for any aspect or embodiment of the present disclosure may be written in any combination of one or more programming languages. The program code may execute fully or partially on the computer system 800. In the latter scenario, the remote computer may be connected to the computer system 800 through any type of network connection, e.g., using the network adapter 890 of the computer system 800. In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable storage medium is a tangible device/hardware that may retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media. Specific examples of the computer-readable storage medium may include, but are not limited to, the following: a hard disk, a random access memory (RAM), a read-only memory (ROM), an erasable programmable read-only memory (EPROM), Flash memory, or any suitable combination of the foregoing. In particular, a computer-readable storage medium comprises computer-readable hardware such as a computer-readable storage device, e.g., memory. As used herein, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc. Moreover, since hardware comprises physical element(s) or component(s) of a corresponding computer system, hardware does not encompass software, per se. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited only to the embodiments in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A processing device comprising a graphical user interface in an industrial vehicle, the processing device comprising:
  a touch screen display that receives touch gesture commands from a vehicle operator;
  memory storing executable instructions; and
  a processor in communication with the memory, wherein the processor when executing the executable instructions:
    defines a plurality of widgets, wherein each widget comprises a visual representation of a current state of an associated function of the industrial vehicle;
    controls display of a subset of the plurality of widgets on a portion of the touch screen display defining a plurality of widget spaces;
    controls display of an icon tray on the touch screen display comprising one or more icons, wherein at least one of the one or more icons corresponds to a respective one of the plurality of widgets;
    controls display of a first menu associated with one of the plurality of widgets when the one widget is displayed in one of the plurality of widget spaces on the screen display and a first menu portion of the one widget is activated by a vehicle operator;
    defines a plurality of sub-menus, each sub-menu corresponding to a particular option within the first menu associated with the one widget, wherein one sub-menu is displayed on the screen display after the corresponding option within the first menu has been selected; and
    color codes at least a portion of the one sub-menu using a same color associated with the corresponding option within the first menu.

2. The processing device of claim 1, wherein the processor when executing the executable instructions:
  defines the icon tray as a separate portion of the screen display from the plurality of widget spaces, the icon tray being spaced apart from the plurality of widget spaces.

3. The processing device of claim 1, wherein the processor when executing the executable instructions:
  locks one of the plurality of widgets in position in a locked widget space upon activation of one of the one or more icons corresponding to the respective one widget.

4. The processing device of claim 3, wherein the processor when executing the executable instructions:
  detects the activation of the one icon corresponding to the respective one widget; and
  in response to detecting the activation:
    automatically moves the respective one widget to the locked widget space; and
    shifts the remaining one or more widgets in the subset to the one or more remaining widget spaces.

5. The processing device of claim 1, wherein the processor when executing the executable instructions:
  shifts a position of one or more of the widgets of the subset on the touch screen display following detection of a touch gesture on the touch screen display.

6. The processing device of claim 1, wherein:
  the first menu associated with the one widget comprises a list, a sidebar, or a scroll wheel; and
  a display of options in the first menu associated with the one widget is altered by one of a tap gesture, a swipe gesture, or a slide gesture on the touch screen display, the options within the first menu being color-coded with a different color.

7. The processing device of claim 1, wherein the first menu portion of the one widget is activated by the vehicle operator touching or selecting the first menu portion.

8. The processing device of claim 1, wherein one or more of the first menu associated with the one widget or the sub-menus corresponding to particular options within the first menu are displayed within the one widget.

9. The processing device of claim 1, wherein one or more of the first menu or the sub-menus are displayed in a separate window that is temporarily superimposed over one or more of the widget spaces.

10. The processing device of claim 1, wherein the processor when executing the executable instructions:
  defines the one widget as a rack height select (RHS) widget, the RHS widget comprising a workspace zone menu defining the first menu, the workspace zone menu comprising a plurality of workspace zones, each workspace zone having a corresponding sub-menu comprising a plurality of stored rack heights associated with the workspace zone.

11. The processing device of claim 10, wherein:
at least a portion of a visual depiction of each workspace zone comprises a different color; and
at least a portion of a visual depiction of each corresponding sub-menu comprises a same color as the associated workspace zone.

12. The processing device of claim 1, wherein the processor when executing the executable instructions:
defines one of the plurality of widgets as a rack height select (RHS) widget, the RHS widget comprising:
a workspace zone selection portion defining a first menu portion;
a rack height selection portion defining a sub-menu portion; and
a load presence indicator.

13. The processing device of claim 12, wherein the processor when executing the executable instructions:
controls display of the RHS widget in one of the widget spaces;
detects a selection of a particular workspace zone and a particular stored rack height related to the particular workspace zone, wherein after the selection of the particular workspace zone and the particular stored rack height:
the workspace zone selection portion comprises an identifier of the particular workspace zone selected,
the rack height selection portion comprises an identifier of the particular stored rack height selected, and
the load presence indicator comprises a visual indication of a presence or an absence of a detected load.

14. The processing device of claim 13, wherein the processor when executing the executable instructions:
overrides the indication of the absence of a detected load upon activation of the load presence indicator by a vehicle operator.

15. The processing device of claim 1, further comprising:
a vehicle network system connecting the processor to at least one vehicle network bus, wherein the processor extracts a current position of a carriage assembly and a current sensed load weight,
wherein the processor when executing the executable instructions:
defines one of the plurality of widgets as a capacity data monitoring (CDM) widget, the CDM widget comprising a visual representation of the current position of the carriage assembly and the current sensed load weight.

16. The processing device of claim 1, further comprising a vehicle operator control section comprising one or more physical input control elements, wherein the one or more physical input control elements are used to make selections on the screen display.

17. The processing device of claim 16, wherein the one or more physical input control elements comprise at least one of a five-button control, a trigger switch, or a rotary control knob.

18. The processing device of claim 1, wherein the processor when executing the executable instructions:
moves one of the plurality of widgets to a predefined widget space upon activation of one of the one or more icons corresponding to the respective one widget.

19. The processing device of claim 1, wherein:
determines a speed of the industrial vehicle; and
when the speed of the industrial vehicle is below a threshold speed, changes one or more of the widgets of the subset on the touch screen display following detection of a touch gesture on the touch screen display; and
when the speed of the industrial vehicle is above the threshold speed, selectively disables one or more portions of the touch screen display.

20. A processing device comprising a graphical user interface in an industrial vehicle, the processing device comprising:
a screen display;
memory storing executable instructions; and
a processor in communication with the memory, wherein the processor when executing the executable instructions:
defines a plurality of widgets, wherein each widget comprises a visual representation of a current state of an associated function of the industrial vehicle;
controls display of a subset of the plurality of widgets on a portion of the screen display defining a plurality of widget spaces;
controls display of an icon tray on the screen display comprising one or more icons, wherein at least one of the one or more icons corresponds to a respective one of the plurality of widgets;
controls display of a first menu associated with one of the plurality of widgets when the one widget is displayed in one of the plurality of widget spaces on the screen display and a first menu portion of the one widget is activated by a vehicle operator; and
defines a plurality of sub-menus, each sub-menu corresponding to a particular option within the first menu, wherein one sub-menu is displayed on the screen display after the corresponding option within the first menu has been selected,
wherein one or more of the first menu or the sub-menus are displayed in a separate window that is temporarily superimposed over one or more of the widget spaces.

* * * * *